(12) United States Patent
Nishikawa et al.

(10) Patent No.: US 9,956,991 B1
(45) Date of Patent: May 1, 2018

(54) VEHICLE STRUCTURE

(71) Applicant: Nissan North America, Inc., Franklin, TN (US)

(72) Inventors: Takemi Nishikawa, Kanagawa (JP); Kazunori Iimi, Kanagawa (JP); Takao Tani, Tokyo (JP); Hideo Aimoto, Kanagawa (JP); Naoki Kamizawa, Saitama (JP); Patrick Dean Grattan, Wixom, MI (US); Perry McConnell, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 25 days.

(21) Appl. No.: 15/338,808

(22) Filed: Oct. 31, 2016

(51) Int. Cl.
| | | |
|---|---|---|
| *B62D 21/15* | (2006.01) | |
| *B62D 25/08* | (2006.01) | |
| *B62D 21/11* | (2006.01) | |
| *B62D 21/03* | (2006.01) | |
| *B62D 21/05* | (2006.01) | |
| *B62D 21/06* | (2006.01) | |

(52) U.S. Cl.
CPC ........... *B62D 21/152* (2013.01); *B62D 21/03* (2013.01); *B62D 21/05* (2013.01); *B62D 21/06* (2013.01); *B62D 21/11* (2013.01); *B62D 25/082* (2013.01)

(58) Field of Classification Search
CPC ........ B62D 21/03; B62D 21/05; B62D 21/06; B62D 21/152; B62D 25/082
USPC ......................................... 296/187.09, 187.1
See application file for complete search history.

(56) References Cited

U.S. PATENT DOCUMENTS

| | | | |
|---|---|---|---|
| 6,120,060 A | 9/2000 | Kocer et al. | |
| 6,460,889 B2 | 10/2002 | Iyanagi et al. | |
| 7,461,850 B2 | 12/2008 | Kurth | |
| 8,007,032 B1 | 8/2011 | Craig | |
| 8,596,711 B2 * | 12/2013 | Yasui | B60R 19/34 296/187.09 |
| 8,646,793 B1 | 2/2014 | Lam et al. | |
| 8,870,205 B2 | 10/2014 | Corby et al. | |
| 8,870,267 B2 | 10/2014 | Zischke et al. | |
| 8,876,194 B2 | 11/2014 | Dix et al. | |

(Continued)

FOREIGN PATENT DOCUMENTS

| | | |
|---|---|---|
| DE | 2853965 A1 | 7/1980 |
| DE | 102012007889 A1 | 10/2013 |

(Continued)

*Primary Examiner* — Jason S Daniels

(57) ABSTRACT

A push arm is coupled to a vehicle frame proximate an intersection of a first side member and a first cross-member. A rear surface of the push arm is located adjacent to a front suspension structure with a gap defined therebetween. The push arm extends forward and laterally outward such that a front surface of the push arm is located outboard of and spaced apart from a front end of the first side member. A energy absorbing structure is positioned within the gap and is attached to the rear surface of the push arm. The energy absorbing structure is spaced apart from the front suspension structure in a non-impacted state. The energy absorbing structure is configured such that in response to an off-center impact event, impact force to the energy absorbing structure pushes the energy absorbing structure into contact with the front suspension structure, such that the energy absorbing structure deforms and absorbs impact energy.

19 Claims, 35 Drawing Sheets

(56) References Cited

U.S. PATENT DOCUMENTS

| | | |
|---|---|---|
| 9,016,768 B2 | 4/2015 | Makino et al. |
| 9,022,403 B2 | 5/2015 | Lam et al. |
| 9,079,619 B2 | 7/2015 | Gupta et al. |
| 9,120,507 B1 | 9/2015 | Alwan et al. |
| 9,174,679 B2 | 11/2015 | Klamser et al. |
| 9,180,913 B2 | 11/2015 | Ameloot et al. |
| 9,199,669 B2 | 12/2015 | Jones et al. |
| 9,254,724 B2 | 2/2016 | Corby et al. |
| 9,457,746 B1 | 10/2016 | Baccouche et al. |
| 9,517,799 B2 * | 12/2016 | Matsumoto ............ B62D 25/08 |
| 9,783,245 B1 | 10/2017 | Marchlewski et al. |
| 2010/0194145 A1 | 8/2010 | Akaki et al. |
| 2013/0081897 A1 | 4/2013 | Dandekar et al. |
| 2013/0175826 A1 | 7/2013 | Bisror et al. |
| 2014/0117717 A1 | 5/2014 | Parkila et al. |
| 2014/0292031 A1 | 10/2014 | Nydam et al. |
| 2015/0246691 A1 | 9/2015 | Volz et al. |
| 2015/0251702 A1 | 9/2015 | Volz et al. |
| 2015/0274209 A1 | 10/2015 | Basappa et al. |
| 2015/0321700 A1 | 11/2015 | Onoda et al. |
| 2015/0336525 A1 | 11/2015 | Nam et al. |
| 2016/0039467 A1 | 2/2016 | Takenaka |
| 2016/0207568 A1 | 7/2016 | Natsume et al. |
| 2016/0264178 A1 * | 9/2016 | Ito ....................... B62D 21/152 |
| 2017/0073019 A1 | 3/2017 | Kabayama |

FOREIGN PATENT DOCUMENTS

| | | |
|---|---|---|
| EP | 1612126 B1 | 9/2009 |
| FR | 2924396 A1 | 6/2009 |

* cited by examiner

VEHICLE STRUCTURE

BACKGROUND

Field of the Invention

The present invention generally relates to a vehicle structure. More specifically, the present invention relates to an off-center support structure attached to portions of a vehicle frame that responds to and absorbs impact force during an off-center impact test.

Background Information

Vehicle structures are routinely being redesigned to include structural features that absorb impact forces in response to impact events. Recently introduced impact event tests include an off-center impact test (also referred to as a small overlap test) where a vehicle is provided with velocity in a vehicle longitudinal direction (forward momentum) such that a front corner of the vehicle (approximately 25 percent of the overall width of the vehicle) impacts a fixed, rigid barrier. FIGS. 1, 2 and 3 schematically show an example of a conventional vehicle V undergoing an impact event with a fixed barrier B in accordance with the off-center impact test.

FIG. 1 shows the conventional vehicle V approaching the rigid barrier B in the off-center impact test. FIG. 2 shows the conventional vehicle V just after initial impact with the rigid barrier B showing initial deformation and forward momentum being transformed into rotational displacement about the rigid barrier B. FIG. 3 shows the conventional vehicle V undergoing further deformation and rotation as a result of the impact event.

SUMMARY

One object of the disclosure is to provide a vehicle frame with additional structural elements that absorb and redirect impact energy during an off-center impact test.

In view of the state of the known technology, one aspect of the present disclosure is to provide a vehicle structure with a vehicle frame, a front suspension structure, a push arm and an energy absorbing structure. The vehicle frame has a first side member, a second side member and a first cross-member. The first side member and the second side member have respective front ends. The first side member and the second side member extend rearward from the front ends. The first cross-member extends in a vehicle lateral direction from the first side member to the second side member at a location rearward of the front ends. The first cross-member is further rigidly fixed to each of the first side member and the second side member. The front suspension structure is coupled to the first side member adjacent to an intersection of the first side member and the first cross-member. The push arm is coupled to the first side member proximate the intersection of the first side member and the first cross-member. The push arm has a rear surface and a front surface. The rear surface of the push arm is located adjacent to the front suspension structure and is spaced apart from the front suspension structure defining a gap therebetween. The push arm extends forward and laterally outward such that the front surface of the push arm is located laterally outboard of and spaced apart from the front end of the first side member. The energy absorbing structure is positioned within the gap and is rigidly attached to the rear surface of the push arm. The energy absorbing structure is spaced apart from the front suspension structure in a non-impacted state. The energy absorbing structure is configured such that in response to an off-center impact event against the front surface of the push arm, the push arm imparts impact force to the energy absorbing structure pushing the energy absorbing structure into contact with the front suspension structure such that the energy absorbing structure deforms absorbing impact energy.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIG. 4-9, a vehicle 10 is illustrated in accordance with a first embodiment. The vehicle 10 is provided with an off-center impact reinforcement structure 12 (shown in FIG. 9) that is configured to absorb and re-direct forces during an impact event such as an off-center impact test (also referred to as a small overlap test) described further below.

Figure 1:
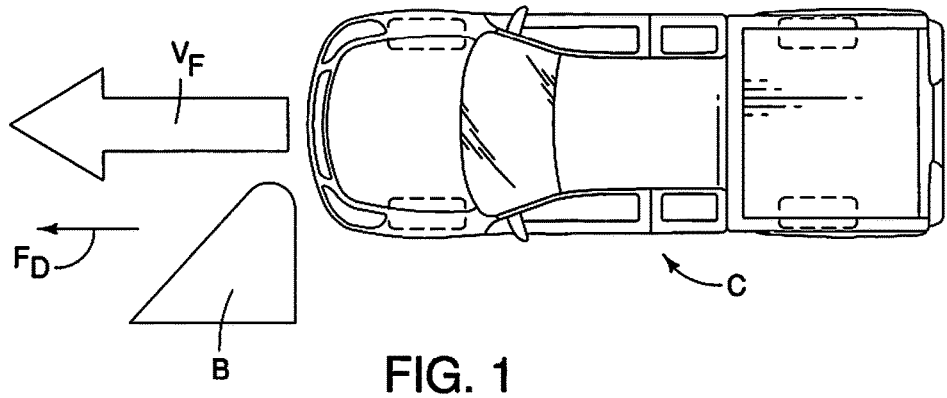
FIG. 1 is a schematic view of a conventional moving vehicle showing its response to a small overlap test where a front corner of the vehicle is aligned with a fixed, rigid barrier for eventual impact with the barrier.
Figure 2:
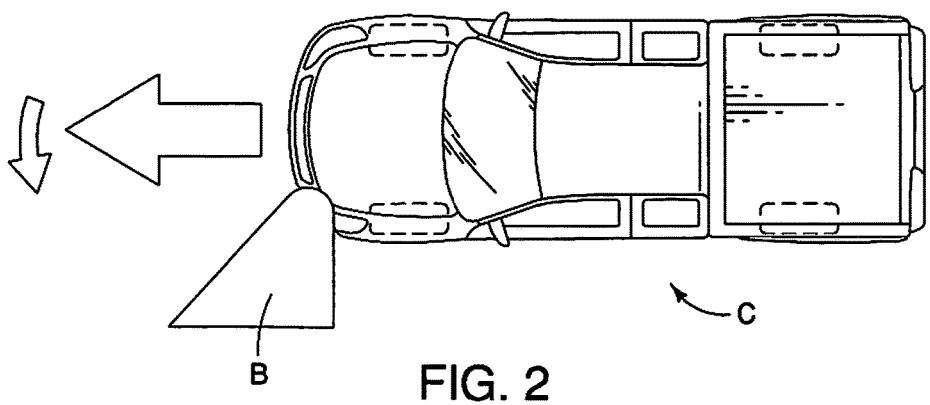
FIG. 2 is another schematic view of the conventional vehicle showing its response to the small overlap test at the beginning of an impact event with the front corner of the conventional vehicle impacting the barrier and beginning to undergo deformation.
Figure 3:
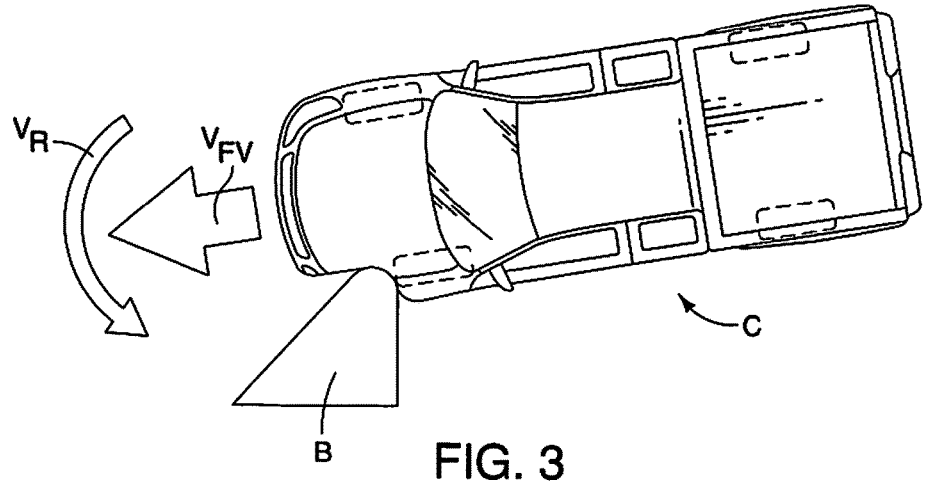
FIG. 3 is still another schematic view of the conventional vehicle showing its response to the small overlap test with the conventional vehicle undergoing further deformation during the impact event.

The Insurance Institute for Highway Safety (IIHS) has developed various tests where vehicles are provided with forward velocity and impacted against fixed, rigid barriers, like the rigid barrier B depicted in FIGS. 1-3. In the IIHS offset tests, the conventional vehicle C is aimed at the rigid barrier B such that approximately 25 percent of the front area of the conventional vehicle C impacts the rigid barrier B. In other words, as indicated in FIGS. 1-3, only a front corner of the conventional vehicle C impacts the rigid barrier B. This IIHS test is also known as a frontal offset, narrow offset, or small overlap test. In such tests, a front bumper assembly of the conventional vehicle C is either not impacted, or undergoes only limited contact with the rigid barrier B during the impact event. Therefore, other structures at the front of the conventional vehicle C impact the rigid barrier B and absorb at least some of the kinetic energy associated with the rapid deceleration of the vehicle C that results from the impact event. When the vehicle C is provided with velocity and impacts the rigid barrier B, the rapid deceleration of the vehicle C transforms the kinetic energy associated with the mass and velocity of the vehicle C into deformation of the vehicle C and counter movement of the vehicle C. As is well known, kinetic energy is a function of mass times velocity. During the small offset test, the kinetic energy of the vehicle C is partially absorbed and partially transformed into other forms of kinetic energy, such as rotary motion. It should be understood that the kinetic energy associated with the forward velocity of the vehicle C (and in the description below) is transformed into an impacting force upon impact due to the rapid deceleration of the vehicle C. Consequently, hereinbelow, the terms impact force and impacting force as used herein correspond to the kinetic energy applied to the vehicle 10 during the small overlap test (the impact event), as described below with respect to the various embodiments.

The test developed by the IIHS is represented schematically in FIGS. 1-3. During the impact event, a variety of structures undergo deformation. This deformation is not explicitly depicted in FIGS. 2 and 3 with any degree of accuracy because such deformation varies from conventional vehicle to conventional vehicle, depending upon the overall design of the front structure of the conventional vehicle C. Instead, in FIG. 3, the conventional vehicle C is depicted with a generic degree of deformation as a result of the impact event. However, the conventional vehicles tested by the IIHS using the small overlap test have a relatively consistent response in that during the impact event with the rigid barrier B, the rear end R of the conventional vehicle C undergoes some rotation and swings laterally away from the rigid barrier B, as indicated in FIG. 3.

In other words, the forward velocity $F_F$ of the conventional vehicle C as it moves is transformed upon impact with the rigid barrier B. The velocity $F_F$ results in an equal and opposite reaction force acting on the vehicle C as the vehicle C suddenly decelerates. It is desirable to move the vehicle laterally outward from the barrier and avoid unnecessary loading of the dash-wall and/or A-pillar.

Figure 4:
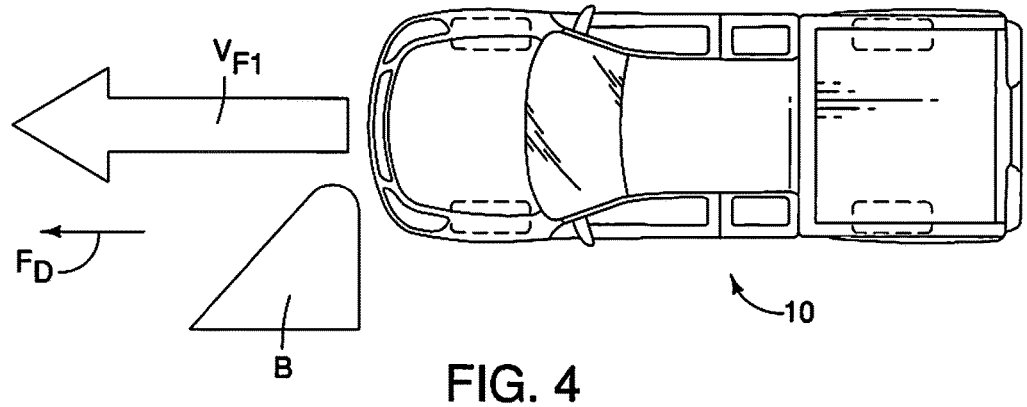
FIG. 4 is a schematic view of a moving vehicle being subjected to a small overlap test where approximately 25 percent of the front of the vehicle aligned with a fixed, rigid barrier for eventual impact with the barrier in accordance with an embodiment.
Figure 5:
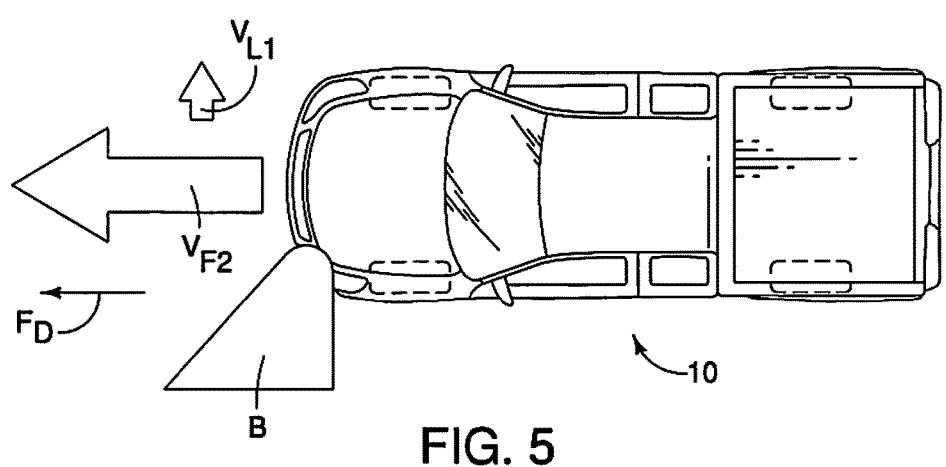
FIG. 5 is another schematic view of the vehicle depicted in FIG. 4 showing an initial response to the impact event of the small overlap test with a front corner of the vehicle impacting the barrier and beginning to undergo deformation in accordance with the embodiment.
Figure 6:
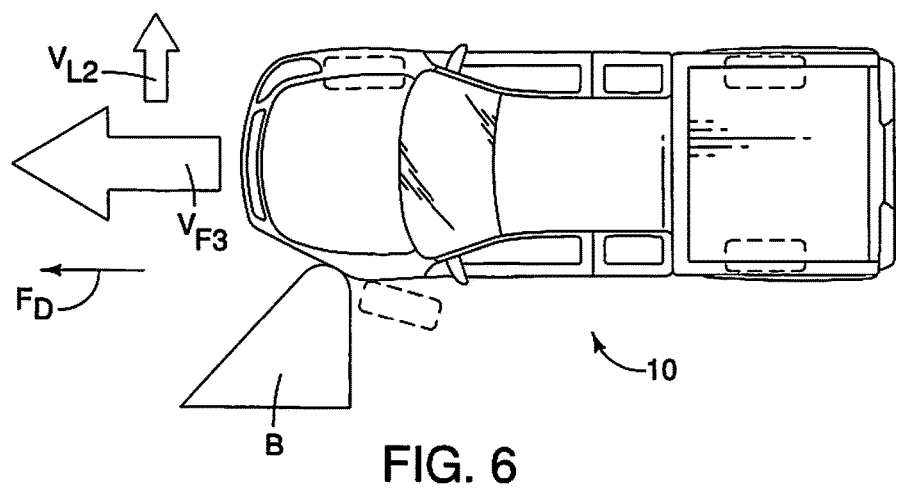
FIG. 6 is still another schematic view of the vehicle depicted in FIGS. 4 and 5 showing a subsequent response to the impact event of the small overlap test with the moving vehicle undergoing further deformation during the impact event in accordance with the embodiment.

The force directing features of the off-center impact reinforcement structure 12 of the vehicle 10 as described hereinbelow are such that during an impact event (such as a small overlap test), the impact forces are absorbed and transmitted to various structures within the vehicle 10, as shown in FIGS. 4, 5 and 6. Specifically, in FIG. 4 the vehicle 10 is provided with a forward velocity $V_{F1}$ and is subjected to a small overlap test where approximately 25 percent of the front of the vehicle is aligned with the rigid barrier B. In FIG. 5 the vehicle 10 undergoes an initial response to the impact event of the small overlap test with a front corner of the vehicle impacting the barrier and beginning to undergo deformation. Hence, the forward velocity $V_{F1}$ is reduced to a velocity $V_{F2}$ with some of the impact energy causing the vehicle 10 to move laterally with a velocity $V_{L1}$, as shown in FIG. 5. In FIG. 6, the vehicle 10 undergoes a subsequent response to the impact event in that one or more of the features of the off-center impact reinforcement structure 12 has functioned properly and caused the vehicle 10 to move laterally with the forward velocity $V_{F2}$ is reduced to a velocity $V_{F3}$ and a lateral velocity $V_{L2}$ that is greater than the $V_{L1}$. In other words, the off-center impact reinforcement structure 12 is configured to absorb impact energy and direct that force to various portions of the vehicle, and the off-center impact reinforcement structure 12 is also configured to move the vehicle 10 in a lateral direction away from the barrier B.

It should be understood from the drawings and the description herein, that during an impact event, such as the small overlap test, the reaction forces experienced by the vehicle 10 as it impacts the rigid barrier B are significant. These significant reaction forces are exponentially greater than the forces the structures of the vehicle 10 undergo during normal operating usage of the vehicle 10. In other words, the impact events referred to herein are intended as destructive tests. Further, the impact events of the small overlap tests are configured such that the vehicle 10 impacts the rigid barrier B at portions of the vehicle 10 outboard of some of the vehicle's structures (not a central area of the vehicle 10), as described in greater detail below.

In the various embodiments described below, the vehicle 10 includes combinations of features of the off-center impact reinforcement structure 12 shown in FIG. 9 and described further below.

Figure 7:
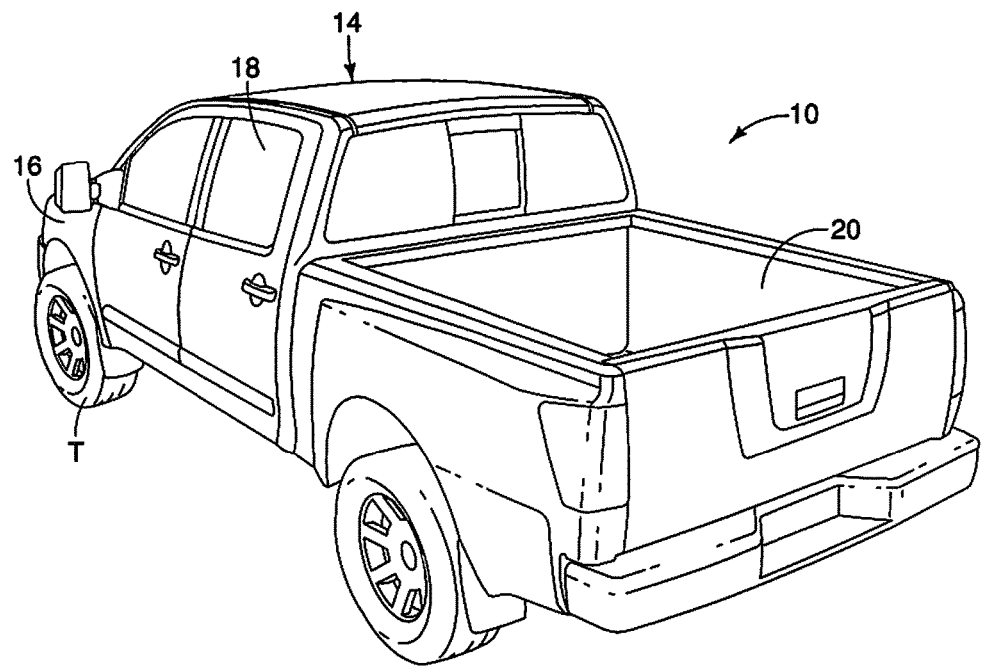
FIG. 7 is a perspective view of the vehicle having an off-center impact reinforcement structure 12 in accordance with the embodiment.

FIG. 7 shows one embodiment of the vehicle 10. In FIG. 7, the vehicle 10 is depicted as a pickup truck that includes a body structure 14 that defines, for example, an engine compartment 16, a passenger compartment 18 and a cargo area 20. The body structure 14 is installed to and rests on a frame 22. The frame 22 is shown removed from the vehicle 10 in FIGS. 8 and 9. Specifically, FIG. 8 shows only the frame 22 with the off-center impact reinforcement structure 12 removed, and FIG. 9 shows the frame 22 with the off-center impact reinforcement structure 12 installed thereto.

In FIG. 7, the depicted pickup truck that defines the vehicle 10 is a heavy duty vehicle intended to haul large and/or heavy materials. The frame 22 is therefore a rigid, strong structure able to withstand heavy duty usage. However, it should be understood from the drawings and the description herein, that the frame 22 and the off-center impact reinforcement structure 12 described below can be configured for smaller vehicles or larger vehicles and is not limited to usage in a heavy duty vehicle such as the vehicle 10. In other words, the off-center impact reinforcement structure 12 can be used on any size vehicle that includes a frame such as the frame 22 where the body structure 14 attaches to and is supported by the frame 22. It should also be understood from the drawings and description, that the off-center impact reinforcement structure 12 can also be employed with a unibody vehicle. A unibody vehicle is a vehicle that does not typically includes a separate frame such as the frame 22. Rather, the unibody vehicle includes various structural elements welded together. Elements of the unibody vehicle serve as frame elements functionally equivalent to the elements of the frame 22. For example, U.S. Pat. No. 8,870,267 assigned to Nissan North America, discloses a unibody vehicle body structure. The front structural support portions (30) disclosed in U.S. Pat. No. 8,870,267 are basically vehicle side members, such as those of the frame 22 (described in greater detail below). U.S. Pat. No. 9,180,913, also assigned to Nissan North America, also discloses a unibody vehicle body structure and further discloses an engine cradle. The elements of the off-center impact reinforcement structure 12 can be installed to portions of the unibody vehicle disclosed in U.S. Pat. No. 8,870,267 and portions of the engine cradle of U.S. Pat. No. 8,870,267. Both U.S. Pat. No. 8,870,267 and U.S. Pat. No. 9,180,913 are incorporated herein by reference in their entirety. Since unibody vehicles are conventional structures, further description is omitted for the sake of brevity.

Figure 8:
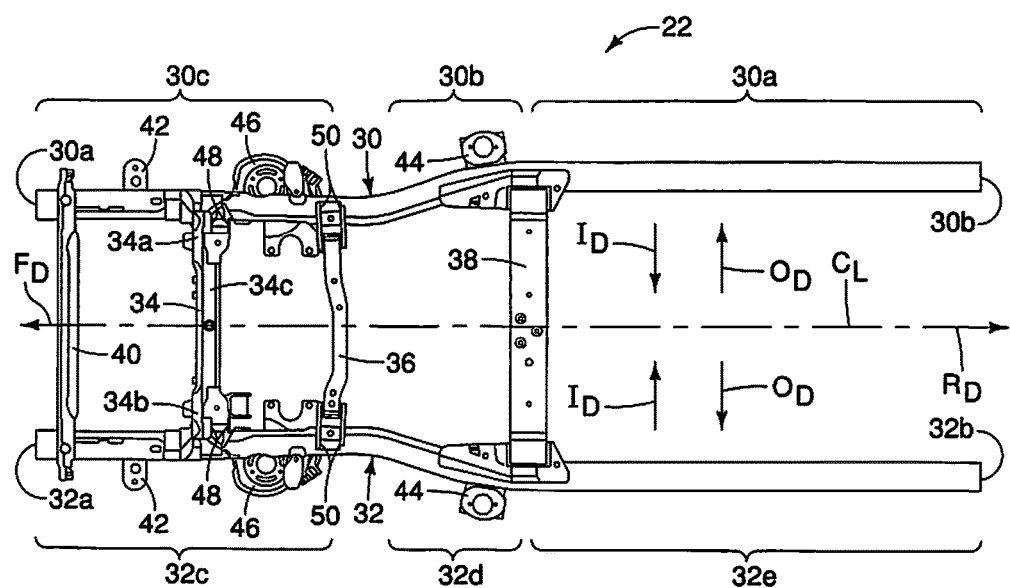
FIG. 8 is a bottom view (looking upward) of a frame from the vehicle depicted in FIG. 7, but with the off-center impact reinforcement structure removed, showing a first side member, a second side member, a first cross-member and a second cross-member of the frame in accordance with the embodiment.

For clarity, the off-center impact reinforcement structure 12 has also been removed from the frame 22 in FIG. 8. The off-center impact reinforcement structure 12 is shown in FIG. 9 installed to specific portions of the frame 22.

In FIG. 8 several directions relative to the frame 22 (and the vehicle 10) are shown in order to define orientations of the various features of the vehicle 10 and the off-center impact reinforcement structure 12. Specifically, the vehicle 10 and the frame 22 define a longitudinal center line $C_L$ that extends in a lengthwise direction of the vehicle 10 along a central portion of the vehicle 10. At a left-hand side of FIG. 8, a forward direction $F_D$ is indicated by the depicted arrow, and at a right-hand side of FIG. 8 a rearward direction $R_D$ is indicated by the depicted arrow. As well, inboard directions $I_D$ and outboard directions $O_D$ relative to the longitudinal center line $C_L$ are also shown in FIG. 8.

As shown in FIG. 8, the frame 22 includes a first side member 30, a second side member 32, a first cross-member 34, a second cross-member 36 and a third cross-member 38 and an optional front cross-member 40. FIG. 8 shows an underside of the frame 22. In other words, the depiction of the frame 22 is taken from below the frame 22 looking upward. The frame 22 is made of heavy gauge steel, but can alternatively be made of other materials depending upon the overall design of the vehicle 10. It should therefore be understood that the first side member 30 extends along and under a driver's side of the vehicle 10, and the second side member 32 extends along and under a passenger's side of the vehicle 10.

The first side member 30 is an elongated beam (a first side member) that has multiple contours and shapes. Specifically, the first side member 30 has a front end 30a and a rear end 30b. The first side member 30 also has a first portion 30c, a second portion 30d and a third portion 30e. The first portion 30c extends in the rearward direction $R_D$ from the front end 30a to a location proximate the second cross-member 36. The first portion 30c is generally straight. The second portion 30d has a curved shape such that just rearward of the first portion 30c, the second portion 30d gradually curves in the outboard direction $O_D$. The third portion 30e is generally straight, but can include contours and curves, depending upon the overall design of the vehicle 10.

Similarly, the second side member 32 is an elongated beam (a second side member) that has multiple contours and shapes that are symmetrical to the first side member 30. Specifically, the second side member 32 has a front end 32a and a rear end 32b. The second side member 32 also has a first portion 32c, a second portion 32d and a third portion 32e. The first portion 32c extends in the rearward direction $R_D$ from the front end 32a to a location proximate the second cross-member 36. The first portion 32c is generally straight. The second portion 32d has a curved shape such that just rearward of the first portion 32c, the second portion 32d gradually curves in the outboard direction $O_D$.

The first portions 30c and 32c of the first and second side members 30 and 32 are a first distance away from one another, and the third portions 30e and 32e are a second distance away from one another, with the second distance being greater than the first distance.

The first and second side members 30 and 32 each include vehicle body attachment flanges 42 and 44 (cabin attachment flanges). The attachment flanges 42 and 44 are welded to the first and second side members 30 and 32 and are dimensioned and shaped to attach to the body structure 14 of the vehicle 10. The attachment flanges 42 extend from outboard sides of the first portions 30c and 32c of the first and second side members 30 and 32 forward of the first cross-member 34. The attachment flanges 44 extend from outboard sides of the second portions 30d and 32d of the first and second side members 30 and 32 rearward of the second cross-member 36.

Although not shown in FIG. 8, the third portions 30e and 32e of the first and second side members 30 and 32 can also include body attachment flanges configured for attachment to structures that define the cargo area 20 of the vehicle 10. Further, the third portions 30e and 32e can be at the same level above the ground as the first portions 30c and 32c, or can be raised above the ground at a level higher that the first portions 30c and 32c, with the second portions 30d and 32d including an upward curvature.

As shown in FIG. 8, each of the first portions 30c and 32c of the first and second side members 30 and 32 further include front suspension structures such as coil spring supports 46, first suspension structures 48 and second suspension structures 50.

The coil spring supports 46 are rigidly fixed (i.e. welded) to respective ones of the first and second side members 30 and 32. The coil spring supports 46 are dimensioned and shaped to support lower ends of front suspension coil springs in a conventional manner. Since front suspension coil springs are conventional structures, further description is omitted for the sake of brevity.

The first suspension structures 48 are defined by pairs of flanges welded to lower surfaces of the first and second side members 30 and 32. Similarly, the second suspension structures 50 are defined by pairs of flanges welded to lower surfaces of the first and second side members 30 and 32 rearward and spaced apart from the first suspension structures 48. The first suspension structures 48 are adjacent to or aligned with the first cross-member 34. The second suspension structures 50 are adjacent to or aligned with the second cross-member 36.

The first suspension structures 48 and the second suspension structures 50 are configured to support a lower control arm 52 for pivotal movement about pivot bolts 54. The lower control arm 52 is part of the steering and suspension structure of the vehicle 10. Since steering and suspension structures (and, in particular, control arm structures) are conventional vehicle components, further description is omitted for the sake of brevity.

The engine compartment 16 of the body structure 14 is approximately located in the space above and between the first portions 30c and 32c of the first and second side members 30 and 32. A front portion of the passenger compartment 18 is located in the space above and between the second portions 30d and 32d of the first and second side member rearward of the engine compartment 16. The remainder of the passenger compartment 18 and the cargo area 20 of the body structure 14 are located above the third portions 30e and 32e of the first and second side members 30 and 32.

As shown in FIGS. 9, 10, 13, 14 and 16, the first cross-member 34 is rigidly attached to the first side member 30 and rigidly attached to the second side member 32. The first cross-member 34 can be co-planar with the first and second side members 30 and 32, or can be located above or below the first and second side members 30 and 32. However, in the depicted embodiment the first cross-member 34 is located below the first and second side members 30 and 32.

The first cross-member 34 has a first end 34a, a second end 34b and mid-section 34c that extends from the first end 34a to the second end 34b. The first end 34a of the first cross-member is fixed to the first side member 30 via a plurality of reinforcement brackets 60, 62 and 64 shown in FIGS. 10, 13, 14 and 16. The reinforcement brackets 60, 62 and 64 have differing surfaces, with some of those surfaces being welded to the first side member 30 and some of those surfaces, such as surfaces 60a, 60b and 60c, extending downward with the reinforcement brackets 60, 62 and 64 being welded to the first end 34a of the first cross-member 34 along or below the surfaces 60a, 62a and 64a. The reinforcement brackets 60, 62 and 64 are considered to be part of the first cross-member 34, but can also be considered part of the first side member 30. The reinforcement brackets 60, 62 and 64, along with the first side member 30 and the first cross-member 34 define an intersection 66 of the first side member 30 and the first cross-member 34.

In the depicted embodiment, the first cross-member 34 extends in a vehicle lateral direction from the first portion 30c of the first side member 30 to the first portion 32c of the second side member 30 at a location rearward of the front ends 30a and 32a. The first cross-member is further rigidly fixed to each of the first side member 30 and the second side member 32. As shown in FIGS. 8 and 9, the first cross-member 34 extends perpendicular to the first portion 30c of the first side member 30 and the first portion 32c of the second side member 32.

Figure 13:
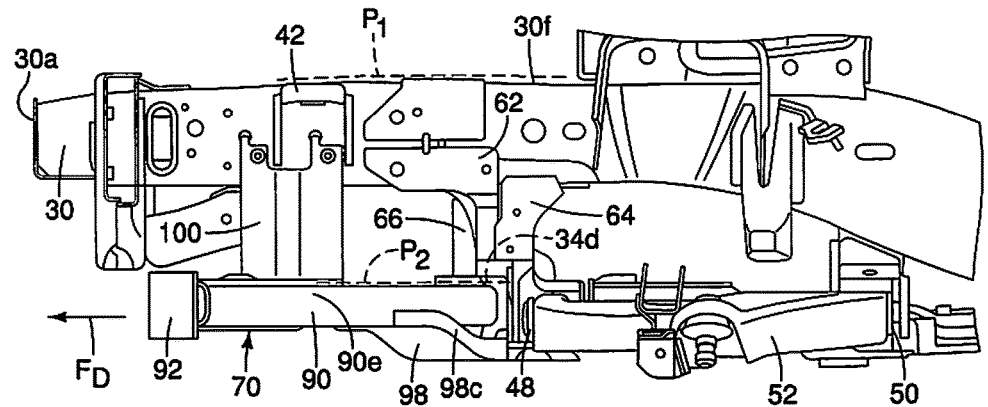
FIG. 13 is a side view the driver's front side of the frame and the off-center impact reinforcement structure, showing details of the push arm assembly in accordance with the embodiment.
Figure 14:
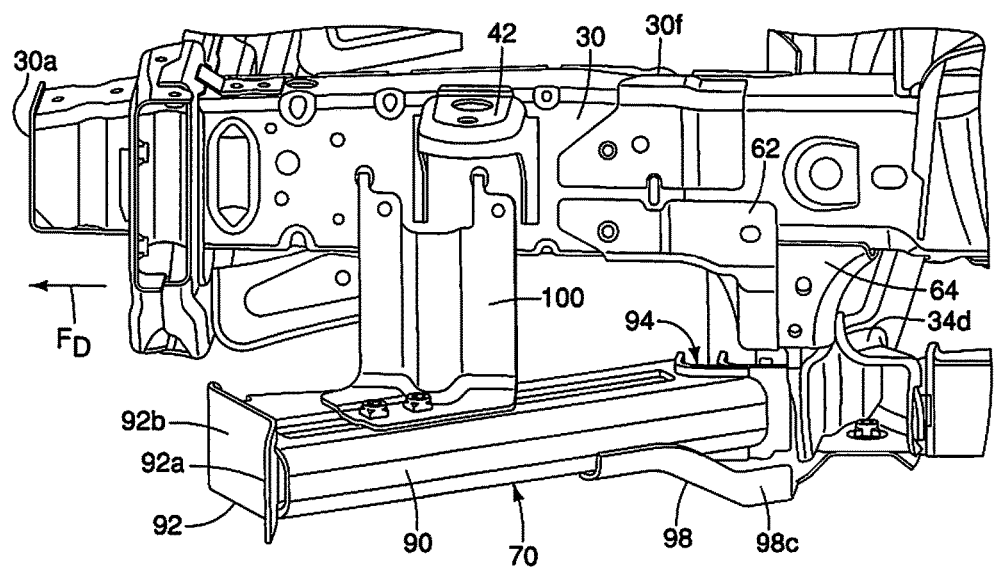
FIG. 14 is another perspective view showing an upper side of the frame and the off-center impact reinforcement structure, showing details of the push arm assembly in accordance with the embodiment.
Figure 15:
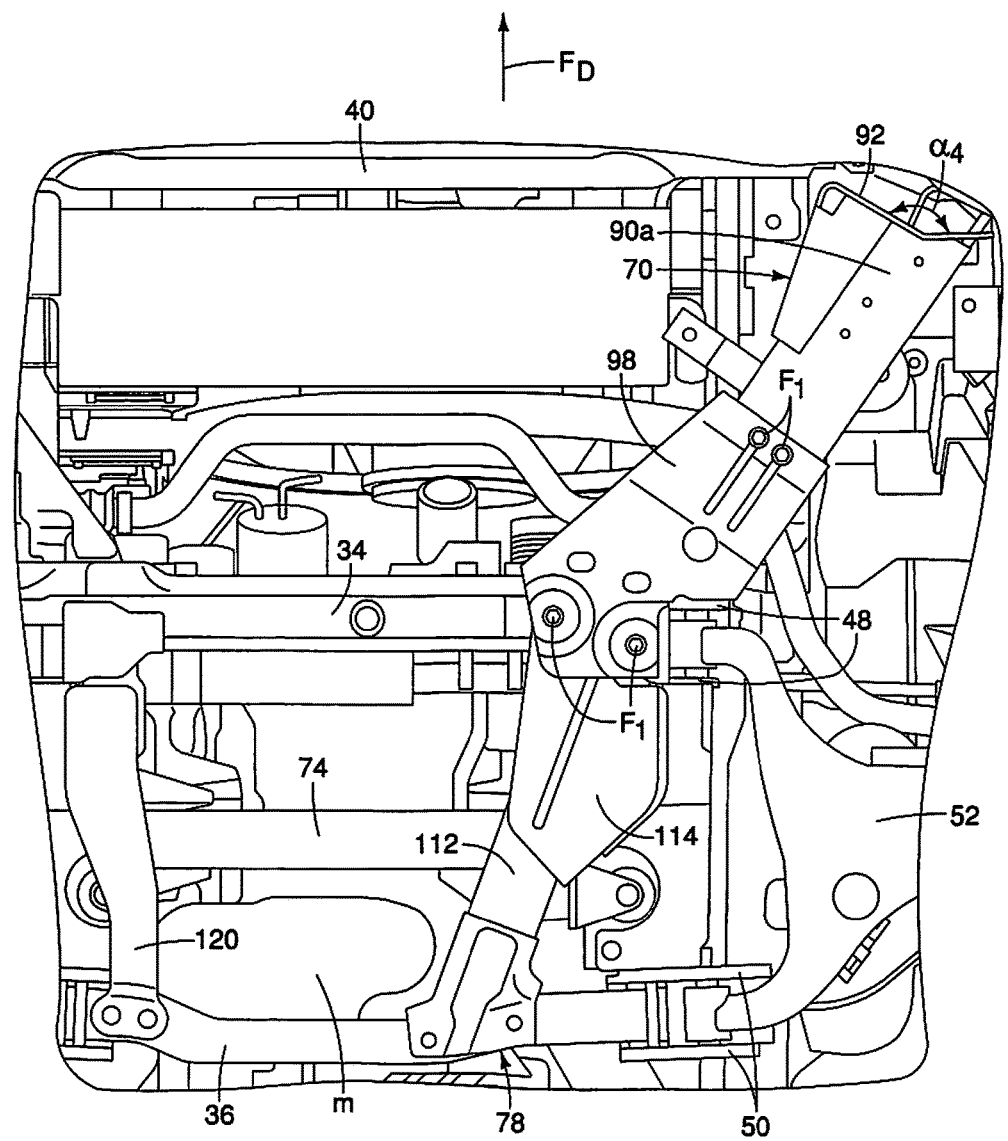
FIG. 15 is a bottom view of a front portion of the frame and portions of the off-center impact reinforcement structure, showing the push arm assembly, the first structure and the secondary reinforcement cross-member in accordance with the embodiment.
Figure 16:
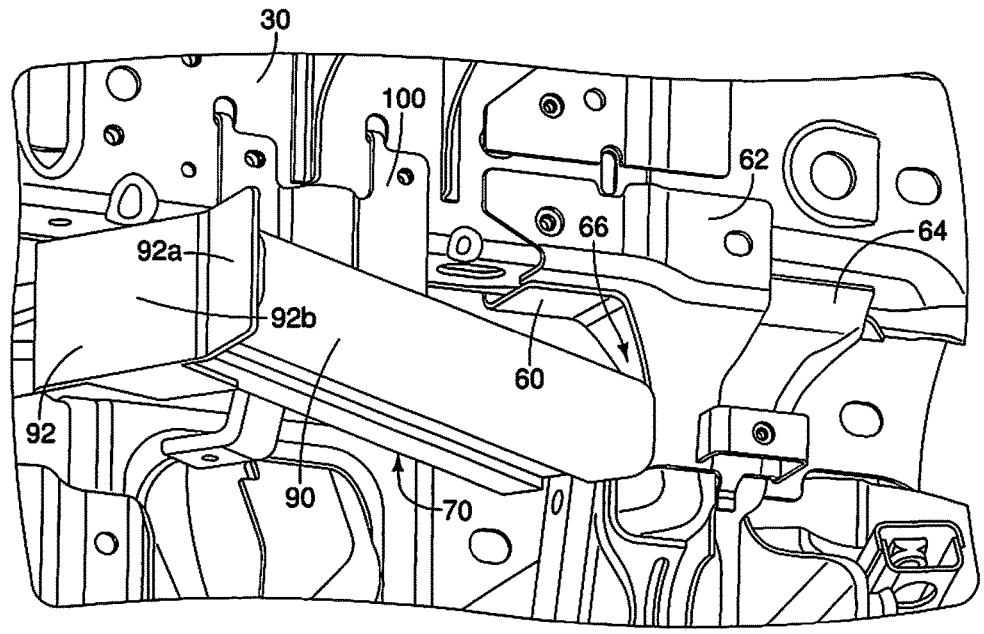
FIG. 16 is a perspective view of a portion the driver's front side of the frame and the off-center impact reinforcement structure, showing details of the push arm assembly and an intersection of the first side member and the first cross-member in accordance with the embodiment.
Figure 17:
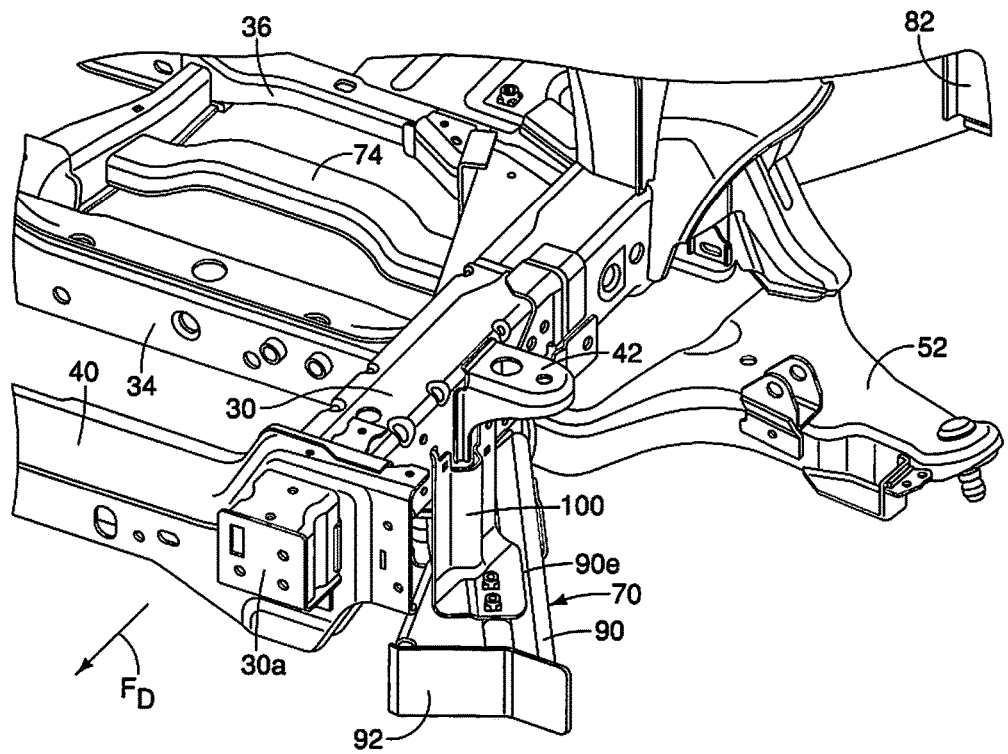
FIG. 17 is a perspective view showing an upper side of the frame and the off-center impact reinforcement structure, showing details of the push arm assembly and the secondary reinforcement cross-member 74 in accordance with the embodiment.
Figure 18:
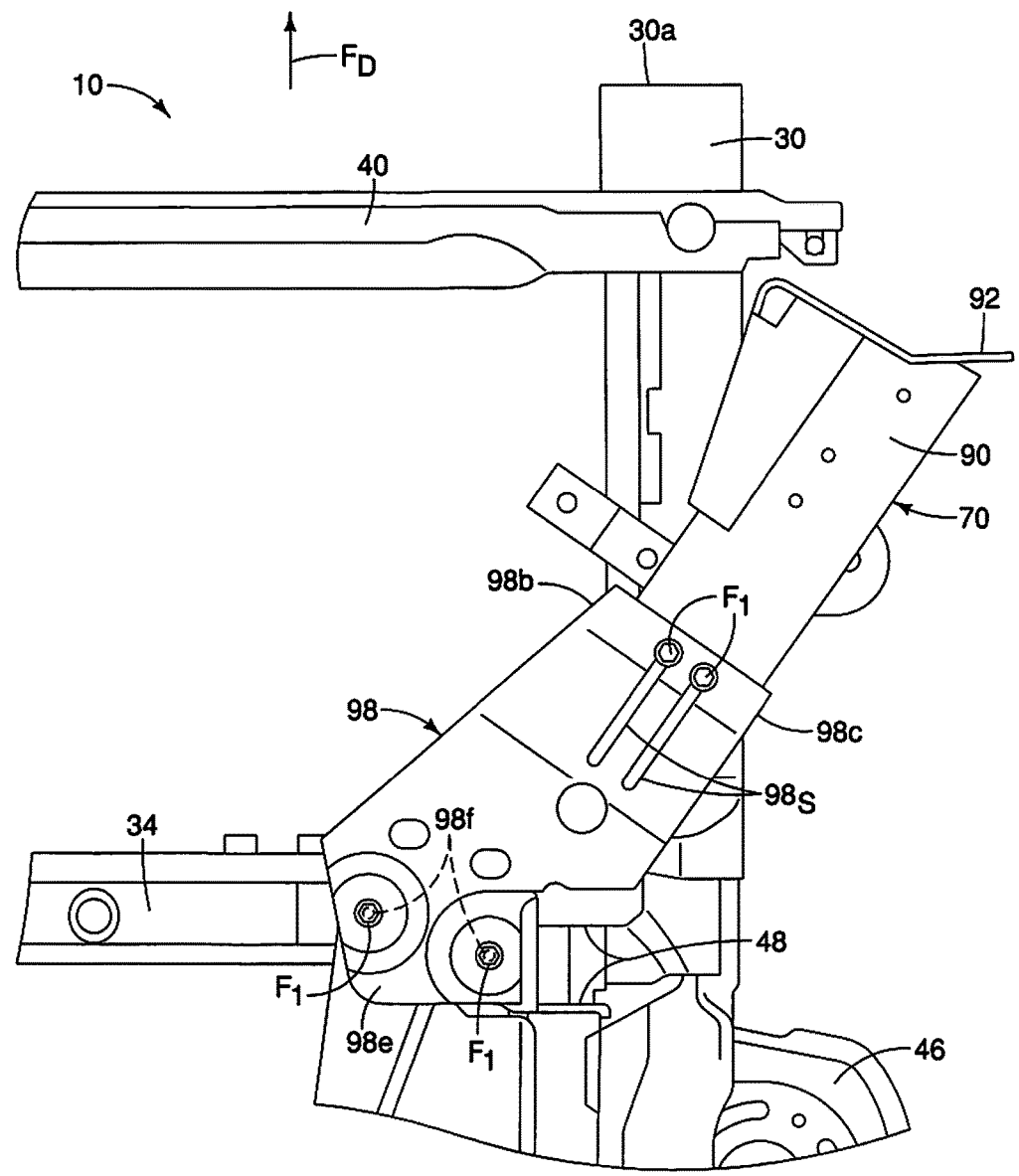
FIG. 18 is a bottom view of a front portion of driver's side of the frame and portions of the off-center impact reinforcement structure, showing details of the push arm assembly in accordance with the embodiment.
Figure 19:
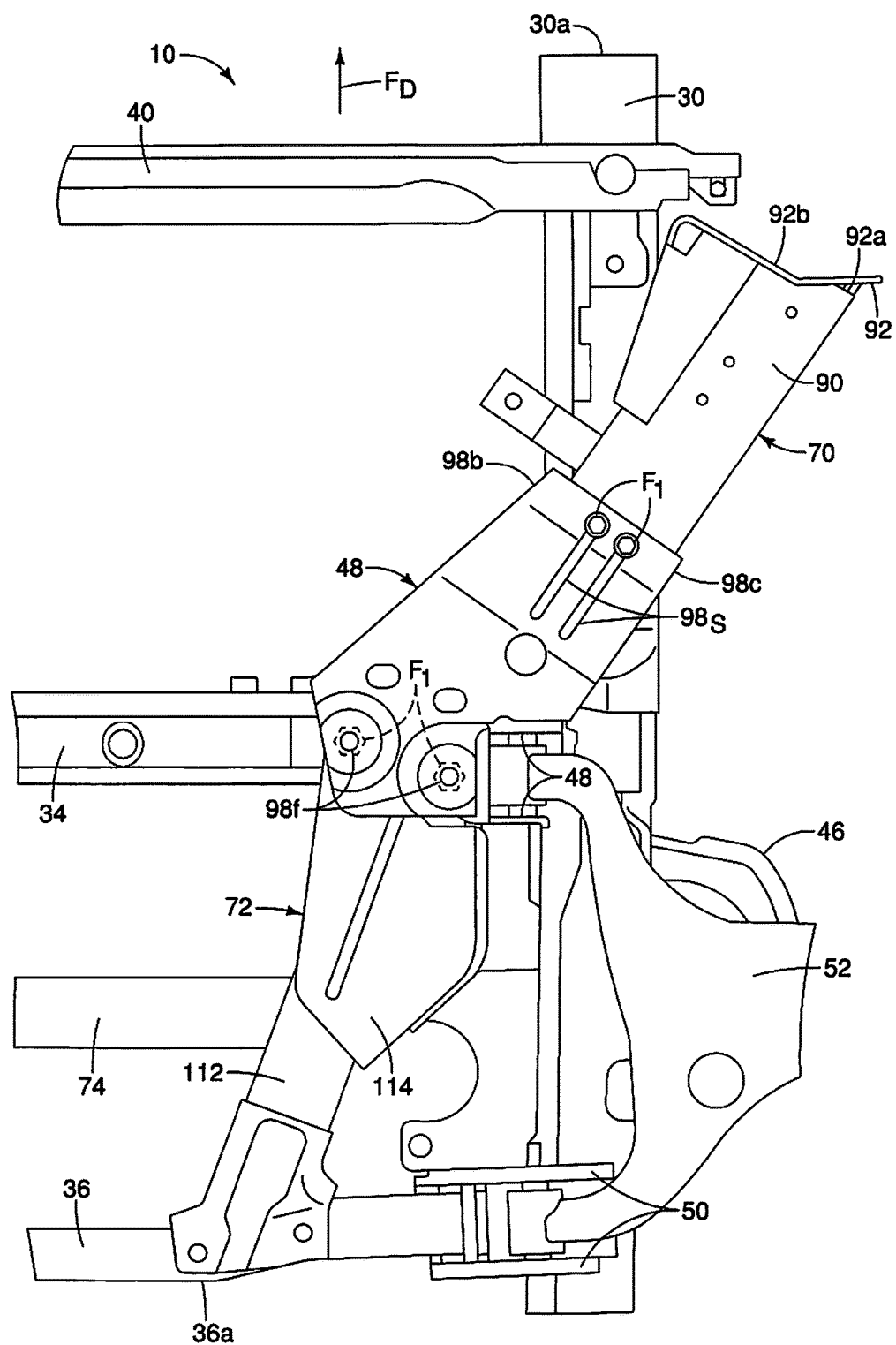
FIG. 19 is another bottom view of the front portion of the frame and portions of the off-center impact reinforcement structure, showing the push arm assembly and the first structure with the support bracket installed to the push arm assembly in accordance with the embodiment.

As shown in FIGS. 13 and 14, an upper surface 34d of the mid-section 34c of the first cross-member 34 is vertically spaced apart from an upper surface 30f of the first side member 30 (the first side member) in the area of the first portion 30c. Specifically, the upper surface 34d of the mid-section 34c of the first cross-member 34 is below the upper surface 30f of the first side member 30 in the area of the first portion 30c. As shown in FIG. 13, the upper surface of the first side member 30 defines a plane $P_1$. The upper surface 34d of the mid-section 34c of the first cross-member 34 extends along a plane $P_2$. As shown in FIG. 13, the plane $P_1$ is vertically above the plane $P_2$.

The second end 34b of the first cross-member 34 is also fixed to the second side member 32 in a manner consistent with the attachment of the first end 34a to the first side member 30. Since the attachment of the second end 34b to the second side member 32 is basically the same as the attachment of the first end 34a to the first side member 30, further description of the attachment of the first cross-member 34 to the second side member 32 is omitted for the sake of brevity.

The second cross-member 36 extends in the vehicle lateral direction and is rigidly fixed to areas of each of the first side member 30 and the second side member 32 rearward of the first cross-member 34. The second cross-member 36 can be welded to each of the first portions 30c and 32c of the first and second side members 30 and 32. However, as is described below with reference to FIGS. 37, 39 and 42, the second cross-member 36 can be attached to the first and second side members 30 and 32 via mechanical fasteners (not shown). Further, the second cross-member 36 is vertically aligned with the first portions 30c and 32c of the first and second side members 30 and 32 and extends in a direction perpendicular to each of the first and second side members 30 and 32. The second cross-member 36 is also parallel to the first cross-member 34.

An engine receiving space is defined in the area confined between the first and second cross-members 30 and 32, and between the first and second side members 34 and 36.

The third cross-member 38 extends between forward ends of each of the third portions 30e and 32e of the first and second side members 30 and 32. The third cross-member 38 is welded to each of the first and second side members 30 and 32 and can serve as an attachment structure for a rear portion of the body structure 14 (at a mid-portion of the passenger compartment 18), and/or can serve as an attachment structure for the structure that defines the cargo area 20.

The optional front cross-member 40 is welded or otherwise rigidly fixed to the front ends 30a and 32a of the first and second side members 30 and 32. A bumper structure (not shown) can be attached to the optional front cross-member 40. Alternatively, the bumper structure (not shown) can be attached to the front ends 30a and 32a of the first and second side members 30 and 32 replacing the optional front cross-member 40.

Figure 9:
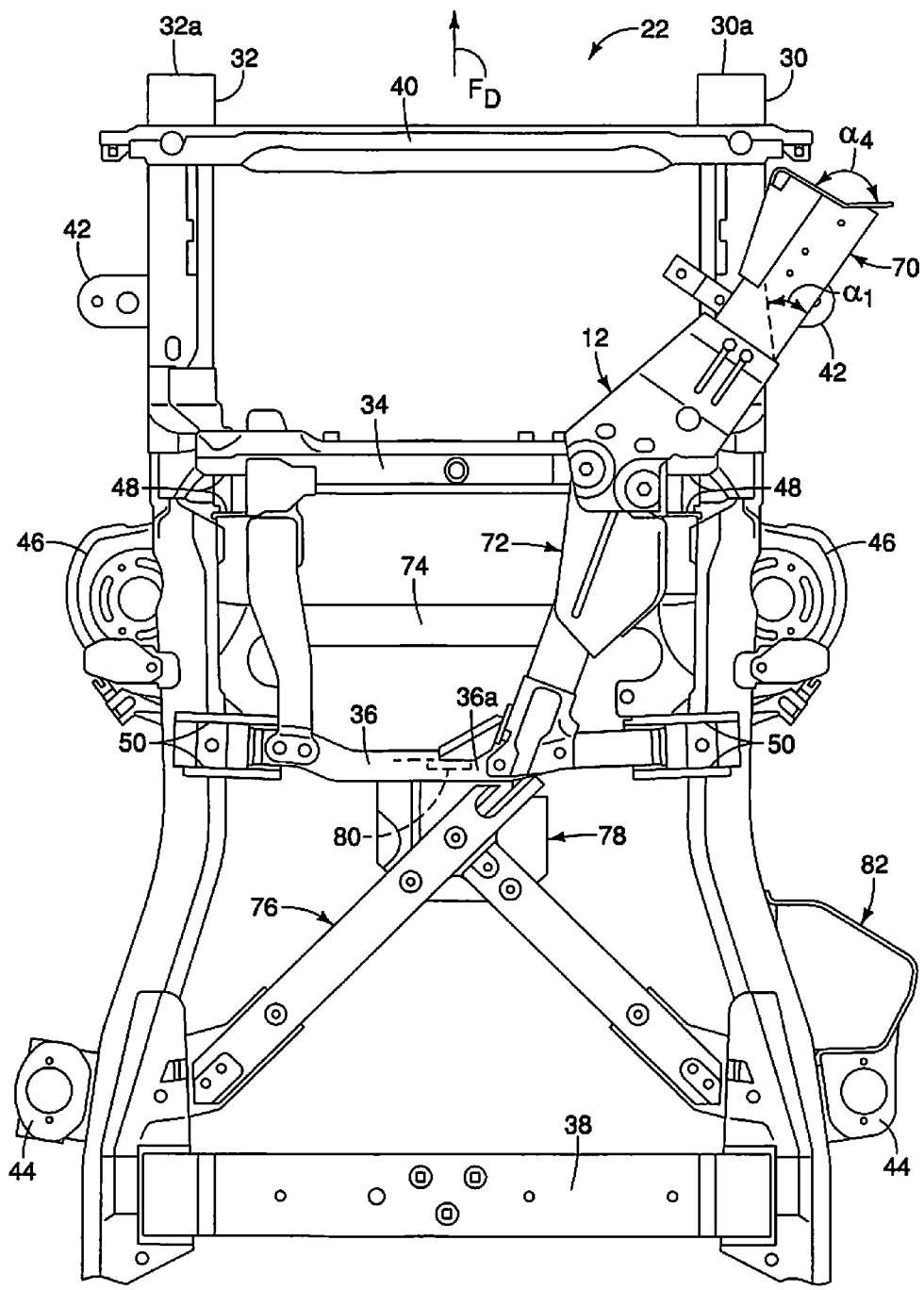
FIG. 9 is another bottom view (looking upward) of a portion of the frame depicted in FIG. 8, but with the off-center impact reinforcement structure installed to the frame, showing a push arm assembly, a first structure (a first diagonal structure), a secondary reinforcement cross-member, a second structure (a second diagonal structure), a gap maintaining structure, a bulkhead structure and a stop structure of the off-center impact reinforcement structure in accordance with the embodiment.

A description of the off-center impact reinforcement structure 12 is now provided with specific reference to FIGS. 9-60.

With initial reference to FIG. 9, the off-center impact reinforcement structure 12 basically includes a push arm assembly 70, a first structure 72 (a first diagonal structure), a secondary reinforcement cross-member 74, a second structure 76 (a second diagonal structure), a gap maintaining structure 78, a bulkhead structure 80 (shown in FIGS. 36 and 42-44) and a stop structure 82 (a tire catching structure). Each of the push arm assembly 70, the first structure 72, the secondary reinforcement cross-member 74, the second structure 76, the gap maintaining structure 78, the bulkhead structure 80 and the stop structure 82 is described separately below. In the depicted embodiment, the off-center reinforcement structure 12 is installed to the vehicle 10 with the push arm assembly 70 installed to a driver's side of the vehicle 10 with the first and second structures 70 and 72 extending rearward and laterally toward the passenger's side of the vehicle 10. However, it should be understood from the drawings and the description herein that the off-center reinforcement structure 12 can be installed with the push arm assembly 70 installed to the passenger's side of the vehicle 10, or, alternatively two of the off-center reinforcement structures 12 can be incorporated into the vehicle 10 with one the push arm assembly 70 being installed at each of the driver's side and the passenger's side of the vehicle 10.

Figure 10:
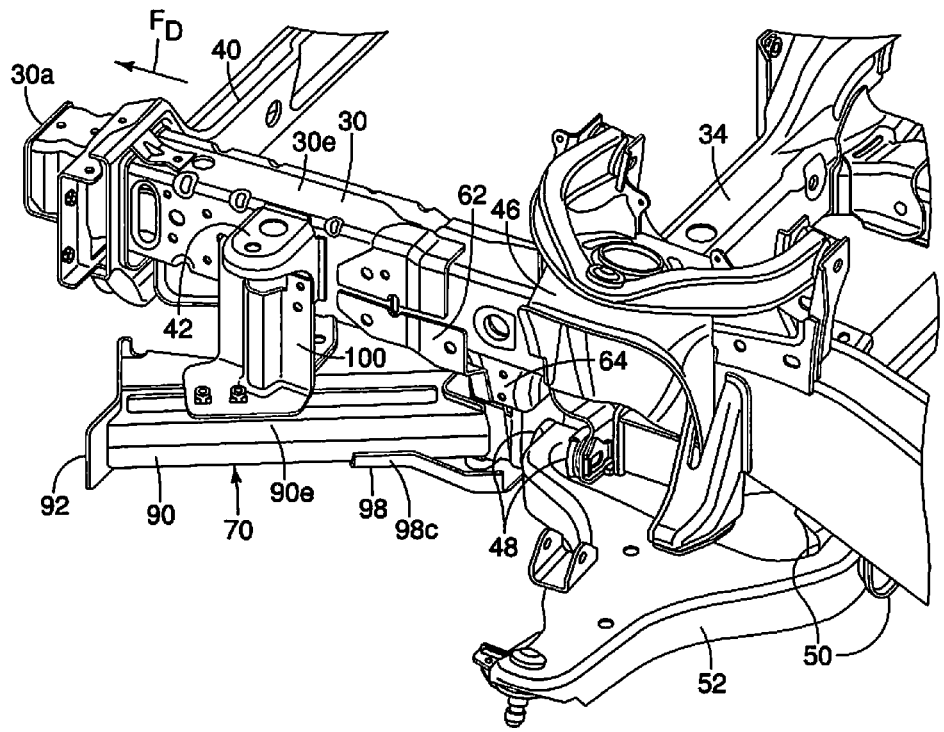
FIG. 10 is a perspective view of a driver's front side of the frame and the off-center impact reinforcement structure, showing details of the push arm assembly in accordance with the embodiment.
Figure 11:
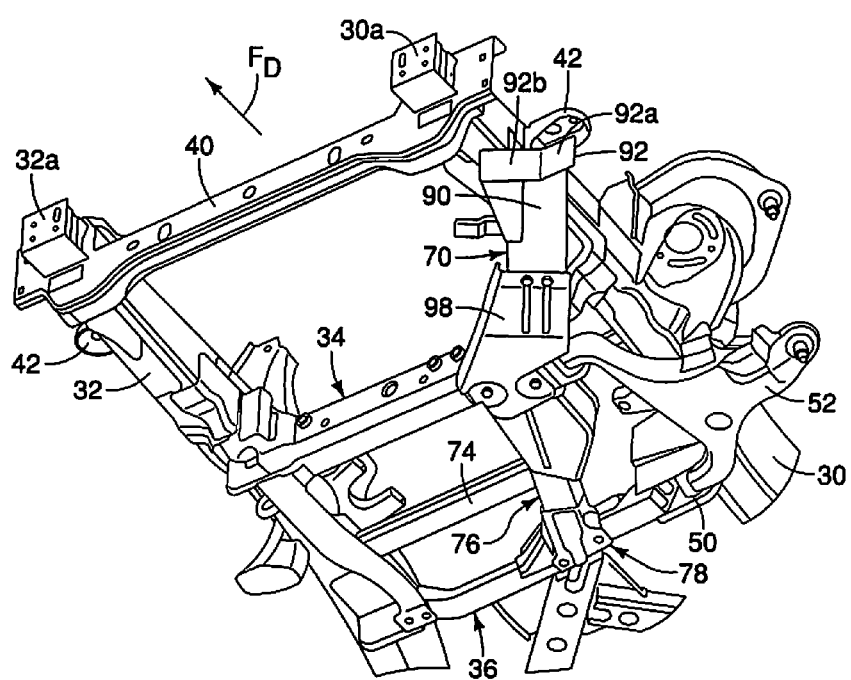
FIG. 11 is another perspective view showing an underside of the frame and the off-center impact reinforcement structure, showing details of the push arm assembly, the first structure and the second structure in accordance with the embodiment.

As shown in FIGS. 9-34, the push arm assembly 70 is coupled to the frame 22 (the vehicle frame) proximate the intersection 66 of the first side member 30 and the first cross-member 34. The push arm assembly 70 extends in a forward and laterally outboard direction from the intersection 66 of the first side member 30 and the first cross-member 34. The push arm assembly 70 defines an angle at relative to the first portion 32c of the first side member 30, as shown in FIGS. 9 and 10. The angle $\alpha_1$ is between 25 and 45 degrees. In the depicted embodiment, the angle at is approximately 35 degrees.

Figure 12:
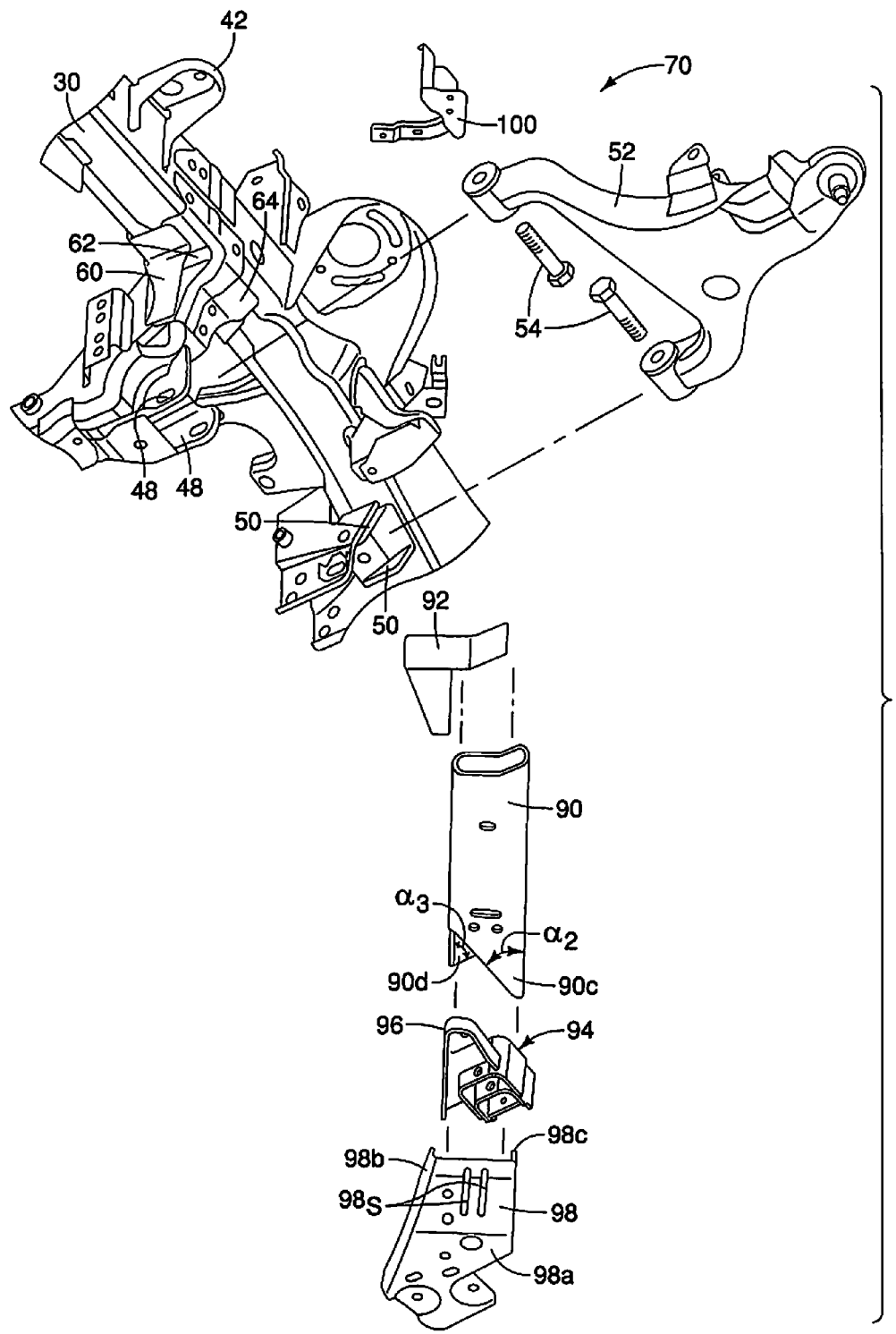
FIG. 12 is an exploded view of a portion of the frame and the off-center impact reinforcement structure, showing the various elements of the push arm assembly as depicted in FIG. 11, including a front plate, a main body, a pivot bracket, a energy absorbing structure and a support bracket in accordance with the embodiment.

As shown in an exploded view in FIG. 12, the push arm assembly 70 basically includes a main body 90, a front end plate 92, a energy absorbing structure 94, a pivot bracket 96, a support bracket 98 and an attachment bracket 100.

The main body 90 is a hollow elongated beam element having a front end 90a and a rear end 90b. The front end 90a is shaped to conform the front end plate 92 (described in greater detail below). Specifically, the front end 90a has two portions that are angularly offset from one another in correspondence with the shape of the front end plate 92. The rear end 90b of the main body 90 has offset end surfaces. Specifically, a lower portion 90c of the rear end 90b of the main body 90 extends rearward and is formed with an angle $\alpha_2$ relative to a lengthwise direction of the main body 90 and an upper portion 90d is formed with an angle as relative to a lengthwise direction of the main body 90. The purpose of the lower portion 90c and the upper portion 90d is further understood in the description of the pivot bracket 98, described below.

The front end plate 92 of the push arm assembly 70 is fixedly attached (for example, welded) to the front end 90a. The front end plate 92 defines a front surface having a first section 92a and a second section 92b. In other words, the first and second sections 92a and 92b together define the front surface of the front end plate 92. The front end plate 92 (and the front end 90a of the main body 90 of the push arm assembly 70) extends forward and laterally outward such that the front surface (both the first portion 92a and the second portion 92b) of the push arm assembly 70 is located laterally outboard of and spaced apart from the front end 30a of the first side member 30.

The second section 92b of the front end plate 92 is located between the first section 92a and the first side member 30. Further, the second section 92b of the front end plate 92 is located inboard of the first section 92a and extends forward of the first section 92a. As shown in FIG. 9, the first section 92a of the front end plate 92 extends in a direction perpendicular to a lengthwise direction of the vehicle frame 22 in a non-impacted state, where the lengthwise direction is parallel the longitudinal center line $C_L$ of the vehicle 10. An obtuse angle $\alpha_4$ is defined between the first section 92a and the second section 92b of the push arm assembly 70 is between 110 and 135 degrees. As shown in the FIG. 9, the obtuse angle $\alpha_4$ is defined between the first section 92a and the second section 92b of the front surface of the push arm is 125 degrees.

Figure 20:
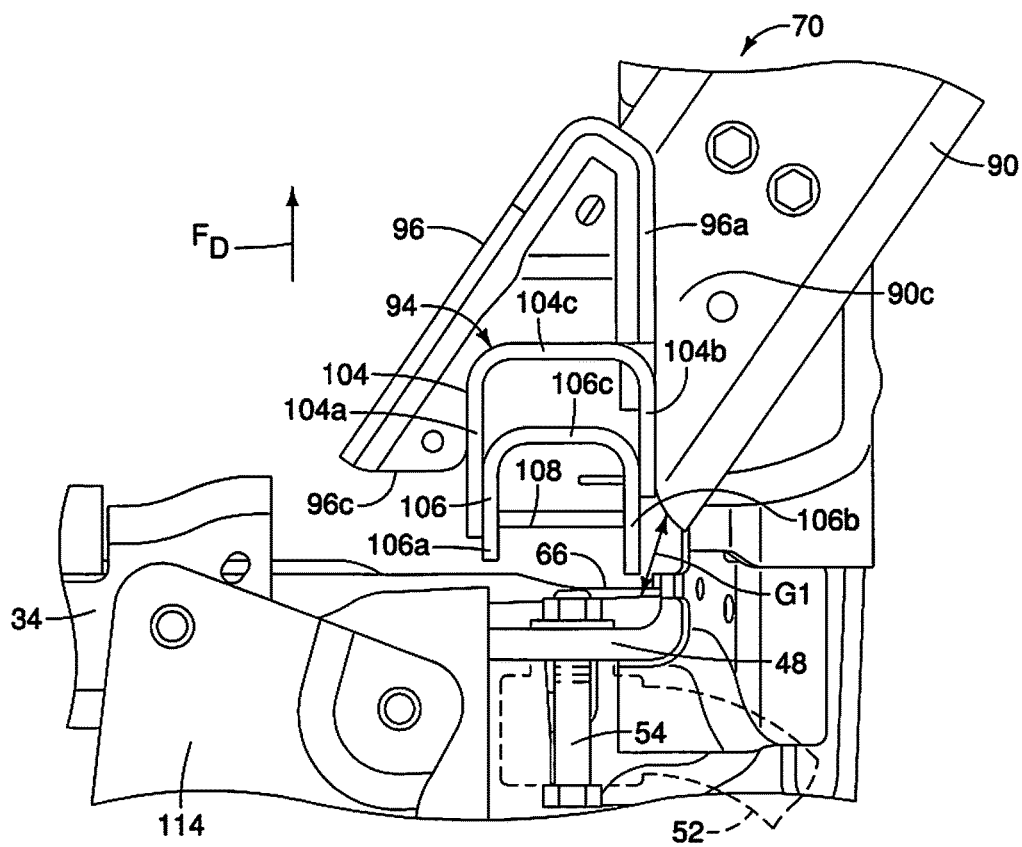
FIG. 20 is another bottom view of the front portion of the frame and portions of the off-center impact reinforcement structure, showing the push arm assembly with the support bracket removed showing the pivot bracket and the energy absorbing structure in accordance with the embodiment.

As shown in FIG. 20, the rear end 90a of the main body 90 is spaced apart from the intersection 66 of first side member 30 and the first cross-member 34 defining a gap $G_1$ therebetween. More specifically, the main body 90, the energy absorbing structure 94 and the pivot bracket 96 are all spaced apart (non-contacting) from the intersection 66 of the first side member 30 and the first cross-member 34.

Figure 24:
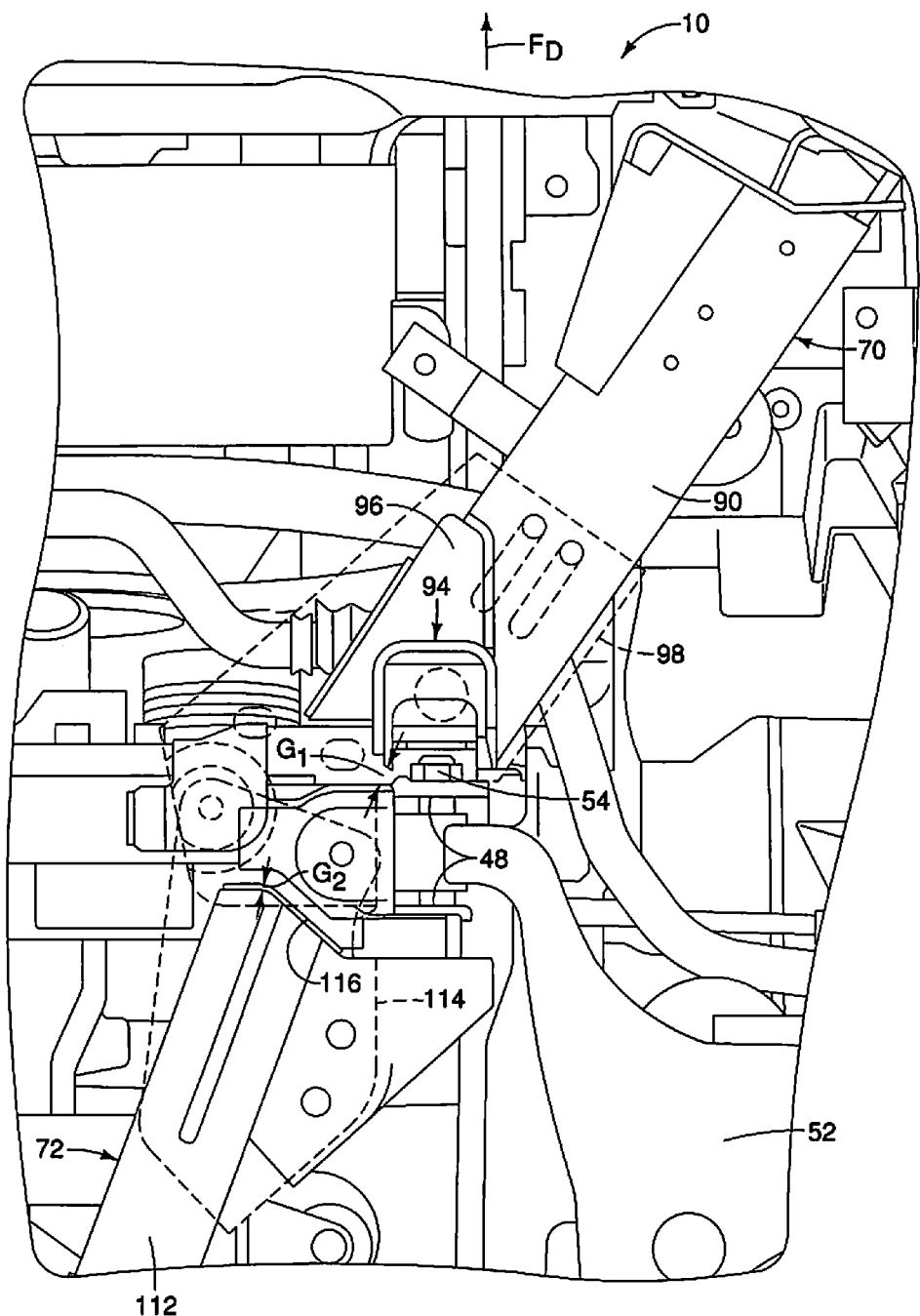
FIG. 24 is a bottom view of the front portion of the frame and portions of the off-center impact reinforcement structure, showing the push arm assembly and the first structure with the support bracket and a bracket of the first structure in phantom showing the pivot bracket, the energy absorbing structure and a gap defined between the first cross-member and a beam of the first structure in accordance with the embodiment.

As shown by comparing FIG. 20 (with the energy absorbing structure 94 and the pivot bracket 96 removed) and FIG. 24 (with the energy absorbing structure 94 and the pivot bracket 96 installed), the rear end 90a of the main body 90 is shaped to receive the energy absorbing structure 94 and the pivot bracket 96. More specifically, the energy absorbing structure 94 and the pivot bracket 96 are located within the gap $G_1$ with the vehicle 10 in a non-impacted state, and are spaced apart from the intersection 66.

As shown in FIGS. 12, 20-22 and 34, the energy absorbing structure 94 includes a plurality of cup-shaped members including a first cup-shaped member 104, a second cup-shaped member 106 and a third cup-shaped member 108. The first, second and third cup-shaped members 104, 106 and 108 can also be U-shaped members that are nested within one another in a manner described below.

Specifically, at least the first and second cup-shaped members 104 and 106 have similar conforming shapes. For instance, the first cup-shaped member 104 has two side walls 104a and 104b, and an end wall 104c that extends between the two side walls 104a and 104b, thereby defining an overall U-shape as viewed in cross-section in FIGS. 20 and 21. The second cup-shaped member 106 has two side walls 106a and 106b, and an end wall 106c that extends between the two side walls 106a and 106b, thereby also defining an overall U-shape. The third cup-shaped member 108 is shown as a flat plate member in cross-section but can also have side walls (not shown).

Figure 21:
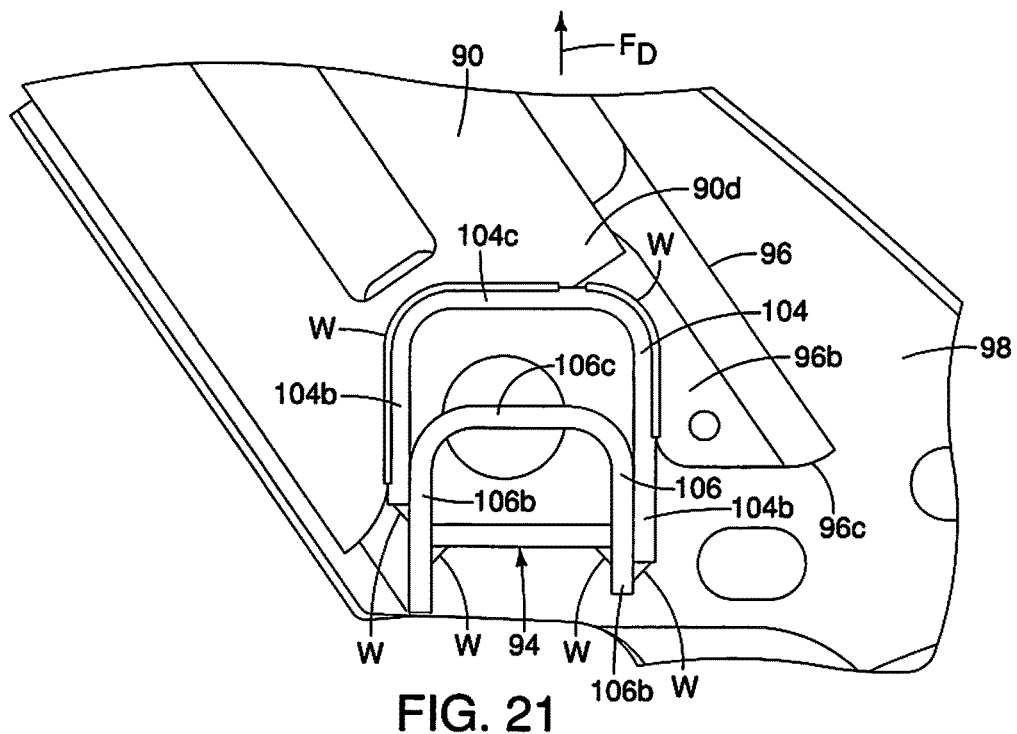
FIG. 21 is a top view of the front portion of the off-center impact reinforcement structure, showing the pivot bracket and the energy absorbing structure of the push arm assembly in accordance with the embodiment.
Figure 22:
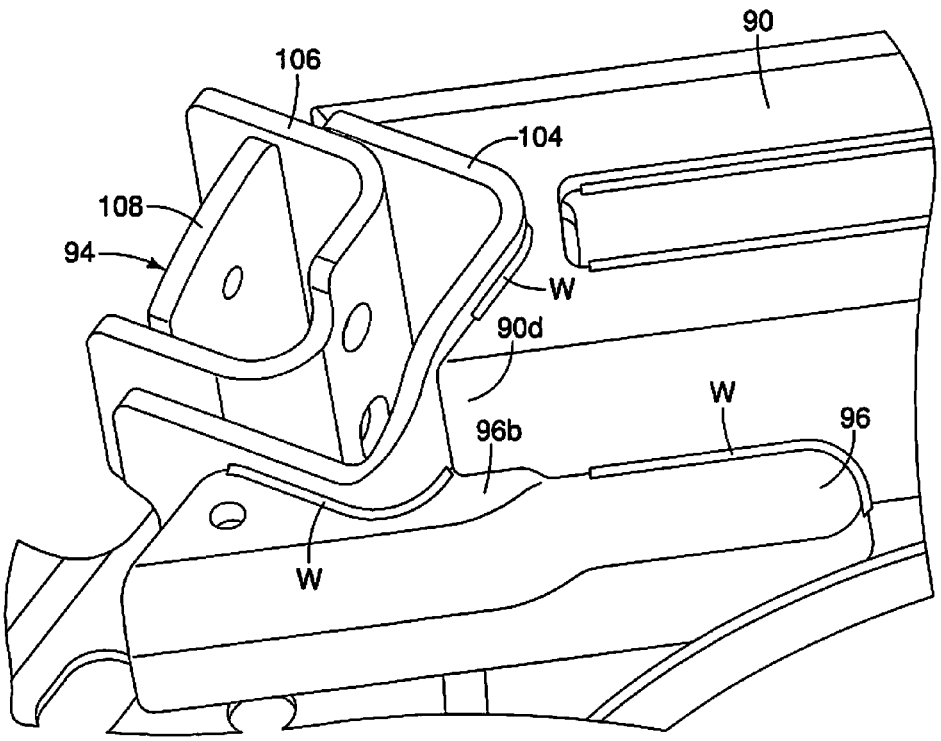
FIG. 22 is a top perspective view of the front portion of the off-center impact reinforcement structure, showing the pivot bracket and the energy absorbing structure of the push arm assembly in accordance with the embodiment.
Figure 23:
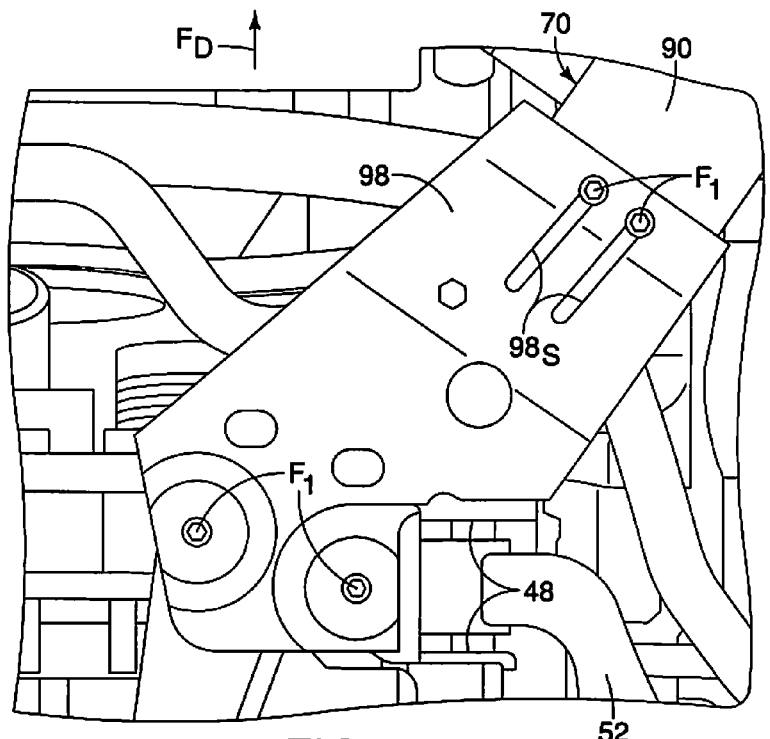
FIG. 23 is a bottom view of a portion of the push arm assembly showing the support bracket in accordance with the embodiment.

The first, second and third cup-shaped members 104, 106 and 108 are attached to one another such that the end wall 104c is spaced apart from the end wall 106c, and the third cup-shaped member 108 is further spaced apart from the end walls 104c and 106c, as shown in FIGS. 20, 21 and 22. Specifically, the side walls 104a and 104b of the first cup-shaped member 104 are fixedly attached to the side walls 106a and 106b of the second cup-shaped member 106 via welds W such the end walls 104c and 106c are spaced apart from one another in the non-impacted state. The third cup-shaped member 108 is fixed via welds W to inner surfaces of the side walls 106a and 106b within the second cup-shaped member 106 such that the third cup-shaped member 108 being spaced apart from the end wall 106c.

The pivot bracket 96 is attached to both the energy absorbing structure 94 and the rear end 90b of the main body 90 via welds W, as shown in FIG. 22. The pivot bracket 96 has an overall triangular shape and is dimensioned to contact the lower portion 90c of the rear end 90b of the main body 90 of the push arm assembly 70, and contact a lower surface of the upper portion 90d of the rear end 90b of the main body 90 of the push arm assembly 70. Specifically, as shown in FIG. 20, a first edge 96a of the pivot bracket 96 contacts an edge of the lower portion 90c of the rear end 90b of the main body 90 of the push arm assembly 70. As shown in FIG. 22, an upper surface 96b of the pivot bracket 96 contacts the upper portion 90d of the rear end 90b of the main body 90 of the push arm assembly 70 and is welded thereto. The upper surface 96b also abuts the first cup-shaped member 104 of the energy absorbing structure 94. The pivot bracket 96 also has a rear surface 96c within the gap $G_1$ that is spaced apart from the intersection 66 and from the first cross-member 34 in the non-impacted state. However, as is explained in greater detail below, in response to an impact event, the rear surface 96c can move into contact with the first cross-member 34.

As shown in FIG. 20 with the support bracket 98 removed, the rear end 90b of the main body 90, the energy absorbing structure 94 and the pivot bracket 96 are all spaced apart from the pivot bolt 54 and the first suspension structure 48 in the non-impacted state. As described in greater detail below, the support bracket 98 is designed to be removable from the vehicle 10 in order to gain access to the pivot bolt 54 in the event that steering adjustments or repairs are need to the front suspension structures of the vehicle 10.

Further, the pivot arm assembly 70, including the main body 90, the front end plate 92, the energy absorbing structure 94 and the pivot bracket 96 can also be removed from the vehicle 10 for servicing and easy access to mechanical components of the vehicle 10 that may be covered or partially covered by the pivot arm assembly 70.

As shown in FIGS. 9, 11, 13-15 and 18-19, the support bracket 98 is attached to the main body 90 of the push arm assembly 70 and first cross-member 34 via removable mechanical fasteners $F_1$. The support bracket 98 has a contoured shape. For example, an underside surface 98a as viewed in FIGS. 10, 15, 18-19 and 23 gives the appearance that the support bracket 98 is generally flat. However, as shown in perspective views in FIGS. 12-14, the support bracket 98 has a truncated U-shape with side portions 98b and 98c that extend upward from the underside surface 98a and extend along opposite sides of the rear end 90b of the main body 90. The support bracket 98 has a front portion 98d and a rear portion 98e. The support bracket 98 is formed with two parallel elongated slots 98s that extend from proximate the front portion 98d rearward toward the rear portion 98e. The slots 98s are angularly offset from the center line $C_L$ of the vehicle 10. Specifically, the slots 98s extend in directions that are parallel (or in alignment with) a lengthwise direction of the main body 90 of the push arm assembly 70. The support bracket 98 also includes two apertures 98f.

Figure 25:
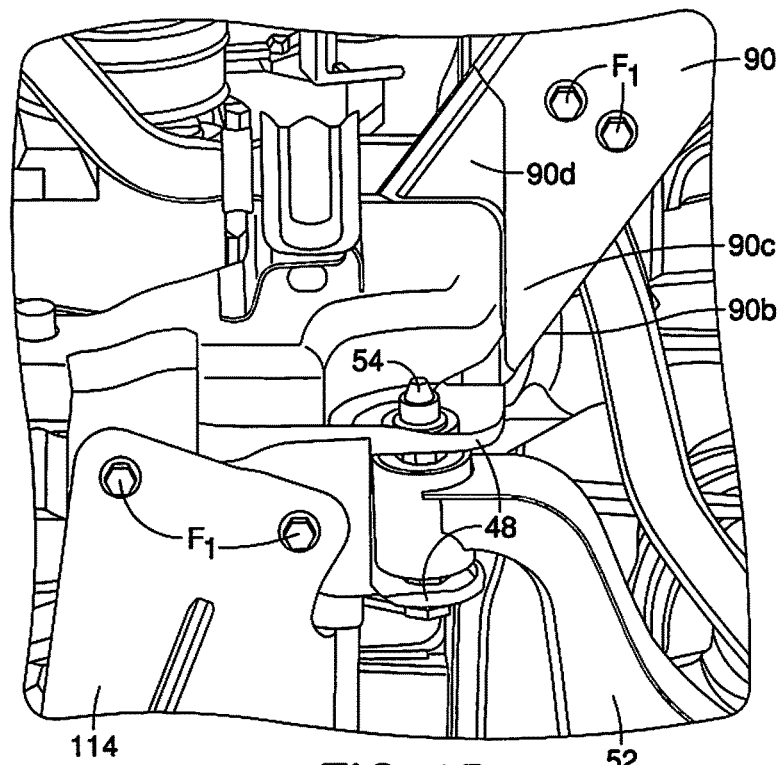
FIG. 25 is another bottom view of the front portion of the frame and portions of the off-center impact reinforcement structure, showing the push arm assembly with the support bracket, the pivot bracket and the energy absorbing structure removed showing vehicle suspension structures otherwise concealed by the push arm assembly in accordance with the embodiment.

The mechanical fasteners $F_1$ inserted through the slots 98s and the apertures 98f rigidly attach the support bracket 98 to the frame 22 and the off-center impact reinforcement structure 12. Specifically, the mechanical fasteners $F_1$ in the slots 98s thread into a nut or threaded aperture formed in the main body 90 of the push arm assembly 70. The mechanical fasteners $F_1$ inserted through the apertures 98f are threaded into nuts or threaded apertures of the first cross-member 34 and/or threaded apertures in a forward portion of the first structure 72. By removing the mechanical fasteners $F_1$, the support bracket 98 is held in place covering the pivot bolt 54 of the first suspension structure 48, the energy absorbing structure 94 and the pivot bracket 96 of the push arm assembly 70, as shown in FIGS. 9, 11, 15, and 23. However, with the support bracket 98 removed from the off-center impact reinforcement structure 12, the pivot bolt 54 of the first suspension structure 48, the energy absorbing structure 94 and the pivot bracket 96 of the push arm assembly 70 are exposed, as shown in FIGS. 20, 24 and 25.

As is described in greater detail below, in response to an off-center impact event the push arm assembly 70 can undergo limited rearward movement that is initially guided by movement of the mechanical fasteners $F_1$ which are configured to slide along the length of the elongated slots 98s. In other words, impact force pushing on the push arm assembly 70 causes the main body 90 to move relative to the support bracket 98 during initial stages of an impact event. The slots 98s are specifically configured to allow movement of the main body 90 with respect to the support bracket 98, thereby absorbing impact energy, and causing deformation of the energy absorbing structure 94, as described in greater detail below. Further, since the connection between the main body 90 and the support bracket 98 allows for limited movement due to the slots 98s, the attachment of the support bracket 98 to the first cross-member 34 has greater strength than the connection between the support bracket 98 and the push arm assembly 70.

As shown in FIGS. 10, 12-14, 16-17 and 60, the attachment bracket 100 extends upward from a mid-section 90e of main body 90 of the push arm assembly 70 to the first side member 30 at a location forward of the intersection 66 of the first side member 30 and the first cross-member 34. In other words, the attachment bracket 100 extends downward from the first side member 30 to the upper surface of the main body 90 of the push arm assembly 70.

Upper ends of the attachment bracket 100 can include hooks that are inserted into apertures of the first side member 30 during installation. Mechanical fasteners are then installed through separate apertures for fixedly attaching the attachment bracket 100 to the first side member 30.

The attachment bracket 100 is also fixedly attached to the upper surface of the main body 90 of the push arm assembly 70. Consequently, the push arm assembly 70 is supported such that the push arm assembly 70 is located below the first side member 30. The attachment bracket 100 does not need to be a structural element of the off-center impact reinforcement structure 12. Rather, the attachment bracket 100 can be made of a thin sheet metal material that supports the main body 90 of the push arm assembly 70 in a non-impacted state. However, in response to an impact event, the attachment bracket 100 releases the push arm assembly 70 in a manner described in greater detail below.

A description of the first structure 72 (a first diagonal structure) is now provided with specific reference to FIGS. 9, 15, 19, 24 and 37-38. The first structure 72 extends from the first cross-member 34 rearward to a mid-portion 36a of the second cross-member located forward of the second structure 76. More specifically, the first structure 72 is coupled to the first cross-member 34 at a location that is rearward of and adjacent to, but inboard relative to the intersection 66 of the first cross-member 34 and the first side member 30. The first structure 72 (also referred to as a diagonal structure) is neither parallel to nor perpendicular to either the first cross-member 34 or the first side member 30. Rather, the first structure 72 extends at an oblique angle rearward from the first cross-member 34 to the mid-portion 36a of the second cross-member 36.

The first structure 72 basically includes a hollow beam 112, and a bracket 114. The hollow beam 112 has a front end 112a with an end plate 116 shaped to conform to an adjacent surface of the first cross-member 34. However, the end plate 116 is spaced apart from the adjacent surface of the first cross-member 34 defining a gap $G_2$ therebetween, as shown in FIG. 24. The hollow beam 112 also has a rear end 112b that is described in greater detail below along with the second structure 76 and the gap maintaining structure 78.

Figure 38:
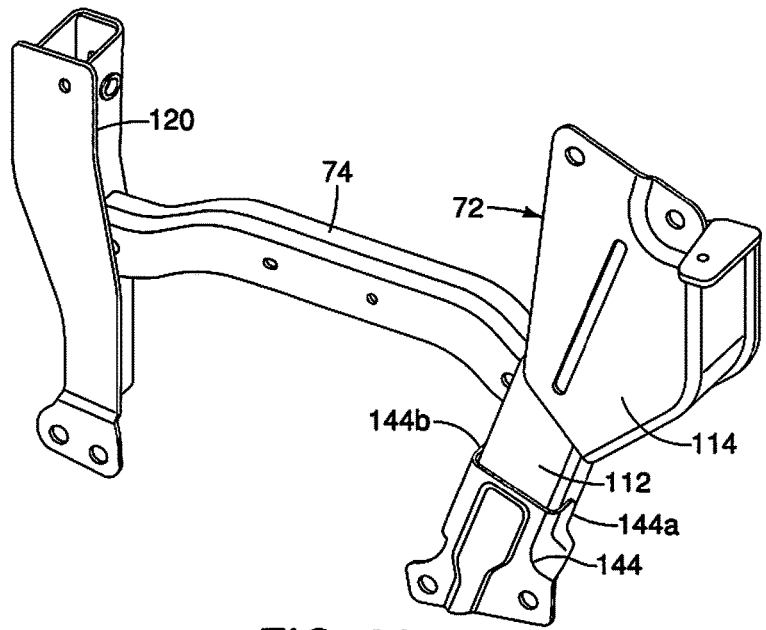
FIG. 38 is a perspective view of the first structure and the secondary reinforcement cross-member shown removed from the frame and the off-center impact reinforcement structure in accordance with the embodiment.

As shown in FIG. 38, associated with the first structure 72 are two secondary members, the secondary reinforcement cross-member 74 and a bracket 120.

Figure 34:
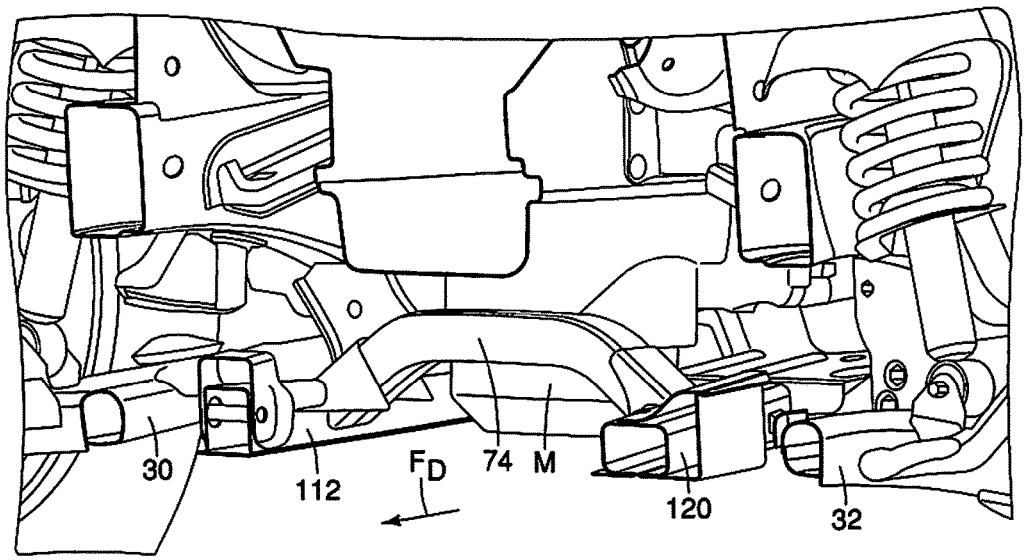
FIG. 34 is a front perspective view of the frame and the off-center impact reinforcement structure with portions thereof cut away showing the secondary reinforcement cross-member in accordance with the embodiment.

As shown in FIGS. 9, 11, 34, 35, 37 and 38, the bracket 120 extends from the first cross-member 30 to the second cross-member 32. The bracket 120 is positioned adjacent to the second side member 32. The secondary reinforcement cross-member 74 extends from the hollow beam 112 to the bracket 120. The secondary reinforcement cross-member 74 is an optional feature that is parallel to the first cross-member 34. The secondary reinforcement cross-member 74 is shaped to extend upward to a level that is higher above the ground than both the first cross-member 34 and the second cross-member 36, as shown in FIG. 34. The secondary reinforcement cross-member 74 is positioned such that it extends immediately in front of a power plant M of the vehicle 10. The power plant M can be an internal combustion engine, such as a diesel or gasoline powered engine, a hybrid engine or an electric motor, depending upon the vehicle design. The secondary reinforcement cross-member 74 extends upward from bracket 120 and the hollow beam 112 such that a central portion of the secondary reinforcement cross-member 74 extends in front of the power plant M. During an impact event, the mass of the power plant M, due to the laws of physics, will continue with forward momentum while the vehicle 10 impacts the barrier B and forward movement of the vehicle 10 is reduced or stopped. The secondary reinforcement cross-member 74 can be contacted by the power plant M during the impact event, thereby limiting forward movement of the power plant M.

A description of the effects of an off-center impact event (a small overlap test) on the push arm assembly 70 of the off-center impact reinforcement structure 12 is now provided with specific reference to FIGS. 4-6 and 26-33. As described above, in an off-center impact event, for instance, during a small overlap test, the vehicle 10 is provided with velocity and aimed to impact the fixed barrier B, as shown in FIG. 4. In FIG. 5 as the vehicle 10 impacts the fixed barrier B and the vehicle 10 absorbs impact energy. The absorption of impact energy includes distribution of the impact energy to various portions of the frame 22 via the features of the off-center impact reinforcement structure 12. As the impact event progress, as shown in FIGS. 5 and 6, the off-center impact reinforcement structure 12 absorbs a portion of the impact energy and distributes the impact energy in a manner described below.

Figure 26:
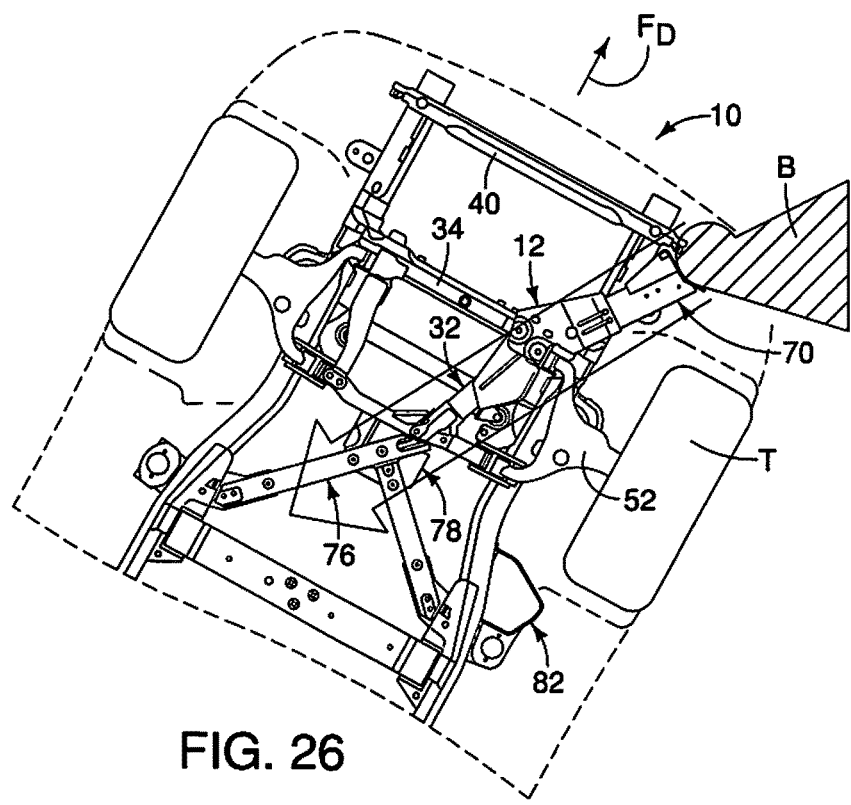
FIG. 26 is a bottom view of a front portion of the vehicle including the frame and off-center impact reinforcement structure during an initial stage of an impact event where the push arm assembly initially makes contact with a fixed barrier in accordance with the embodiment.
Figure 27:
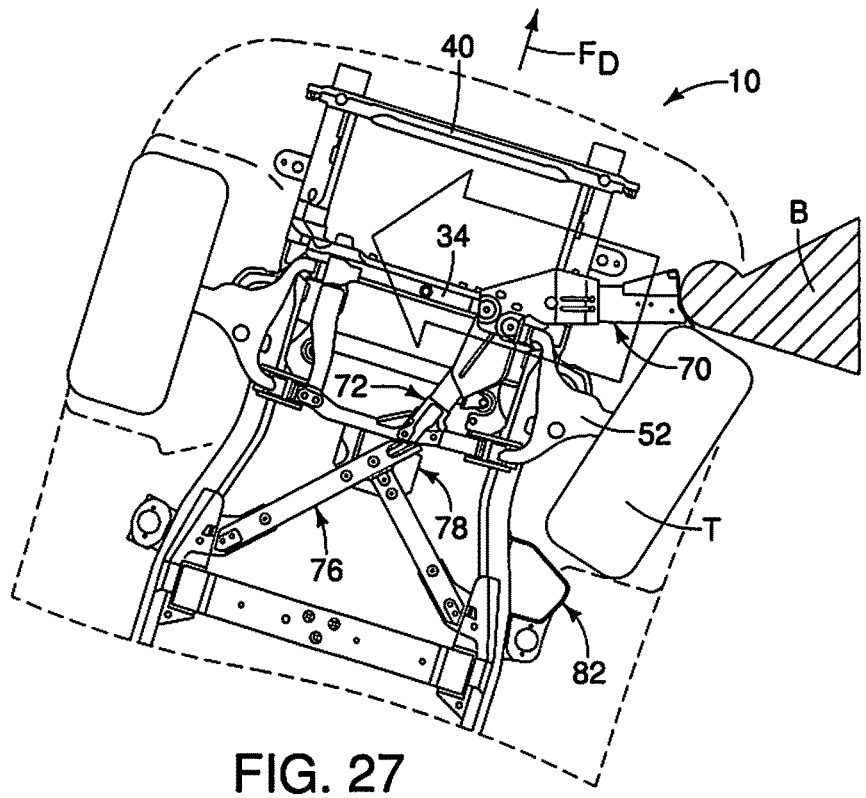
FIG. 27 is another bottom view of the front portion of the vehicle similar to FIG. 26 showing the frame and off-center impact reinforcement structure during a second stage of the impact event where the push arm assembly begins to deform and undergo pivoting movement in accordance with the embodiment.
Figure 28:
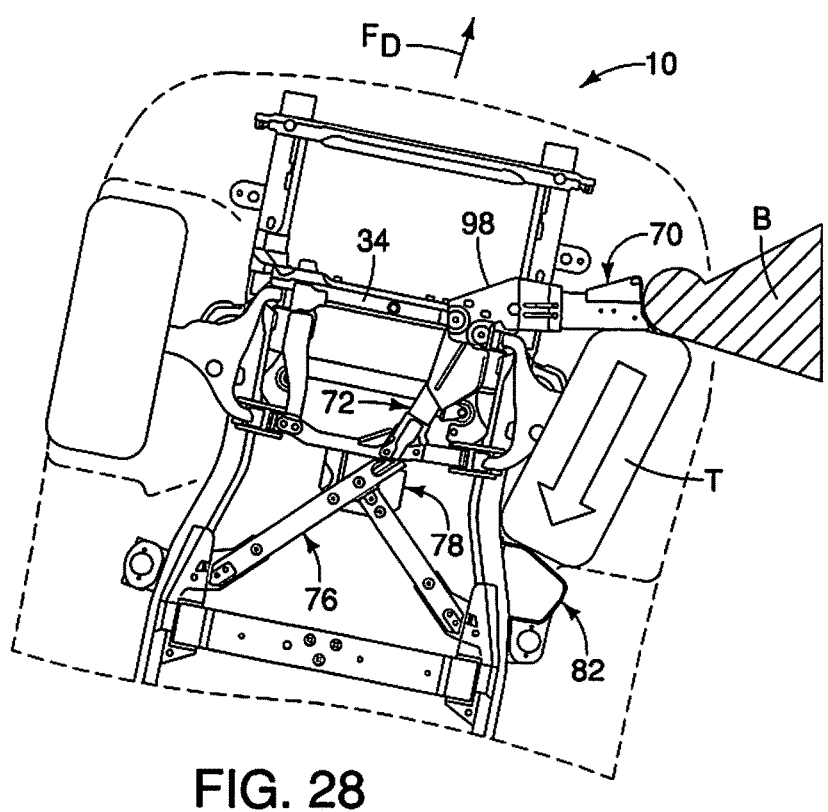
FIG. 28 is another bottom view of the front portion of the vehicle similar to FIGS. 26 and 27 showing the frame and off-center impact reinforcement structure during a third stage of the impact event where the push arm assembly continues to deform and undergo pivoting movement in accordance with the embodiment.
Figure 29:
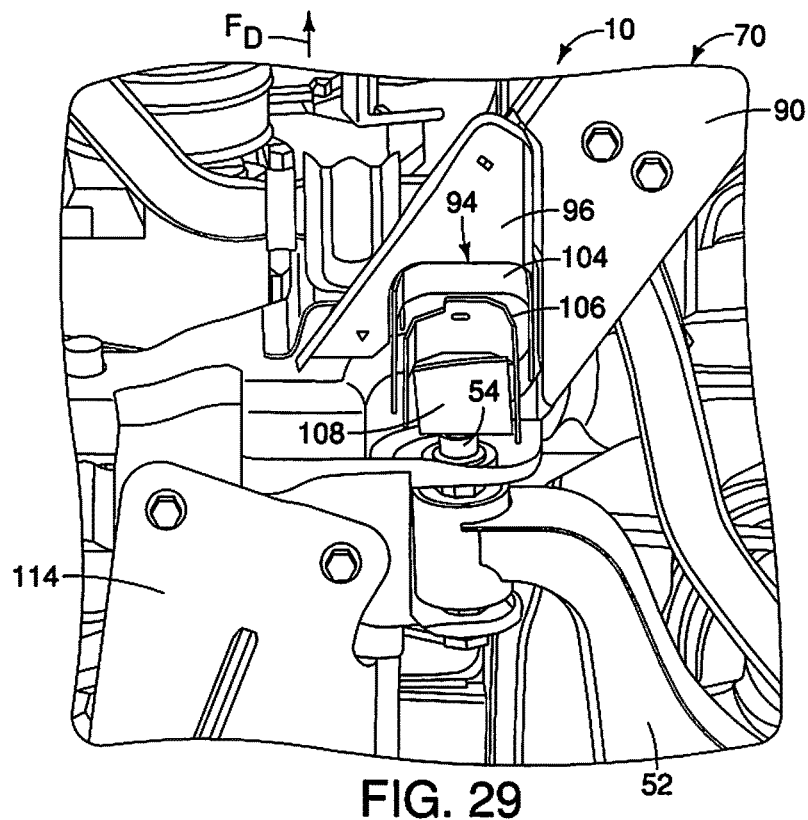
FIG. 29 is a bottom view of a front portion of the push arm assembly of the off-center impact reinforcement structure with the support bracket removed showing the energy absorbing structure and pivot bracket prior to the impact event depicted in FIGS. 26-28, in accordance with the embodiment.
Figure 30:
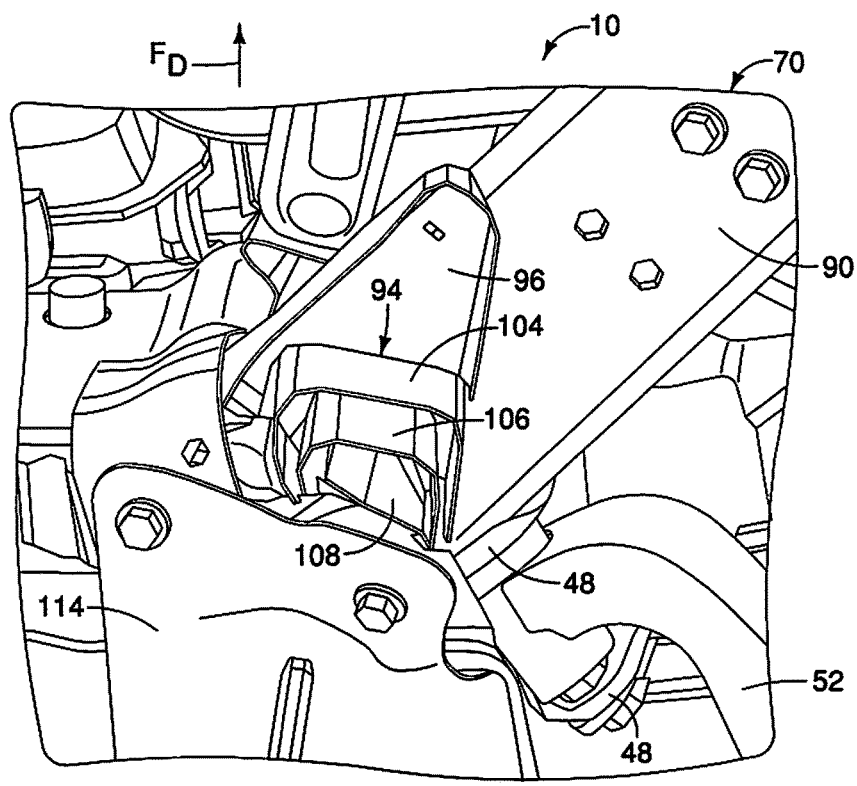
FIG. 30 is another bottom view of the front portion of the push arm assembly with the support bracket removed showing the energy absorbing structure and pivot bracket during an initial stage of the impact event depicted in FIGS. 26-28, in accordance with the embodiment.
Figure 31:
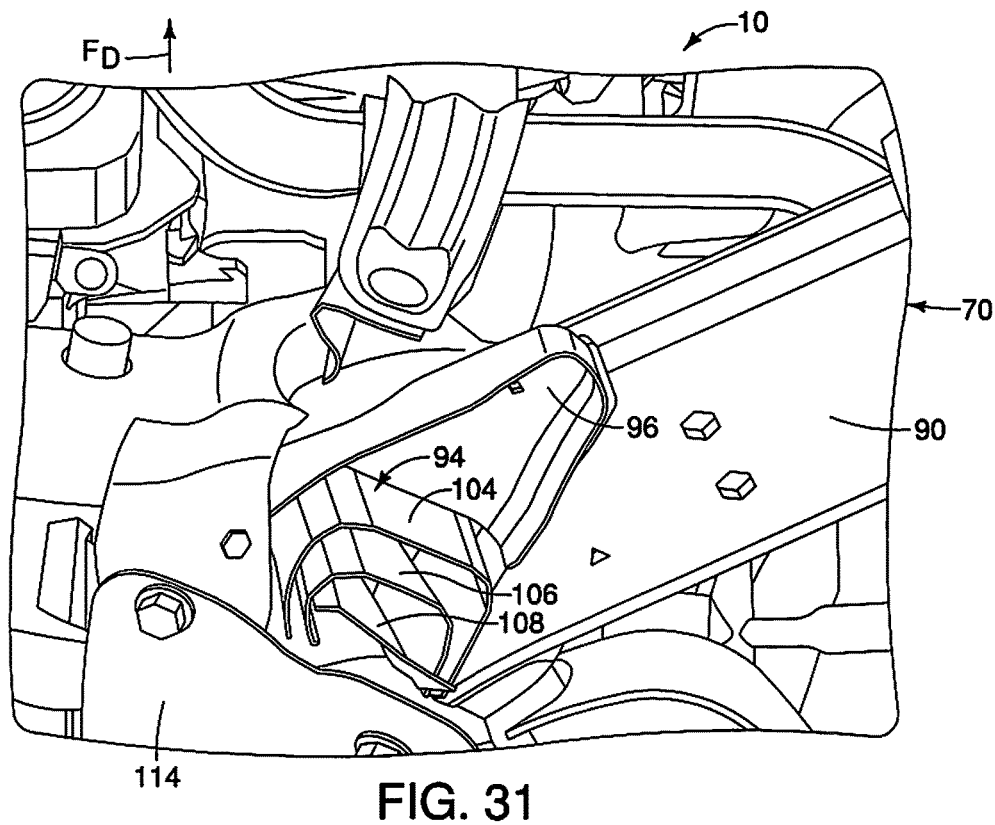
FIG. 31 is another bottom view of the front portion of the push arm assembly with the support bracket removed showing the energy absorbing structure and pivot bracket during a second stage of the impact event depicted in FIGS. 26-28, in accordance with the embodiment.
Figure 32:
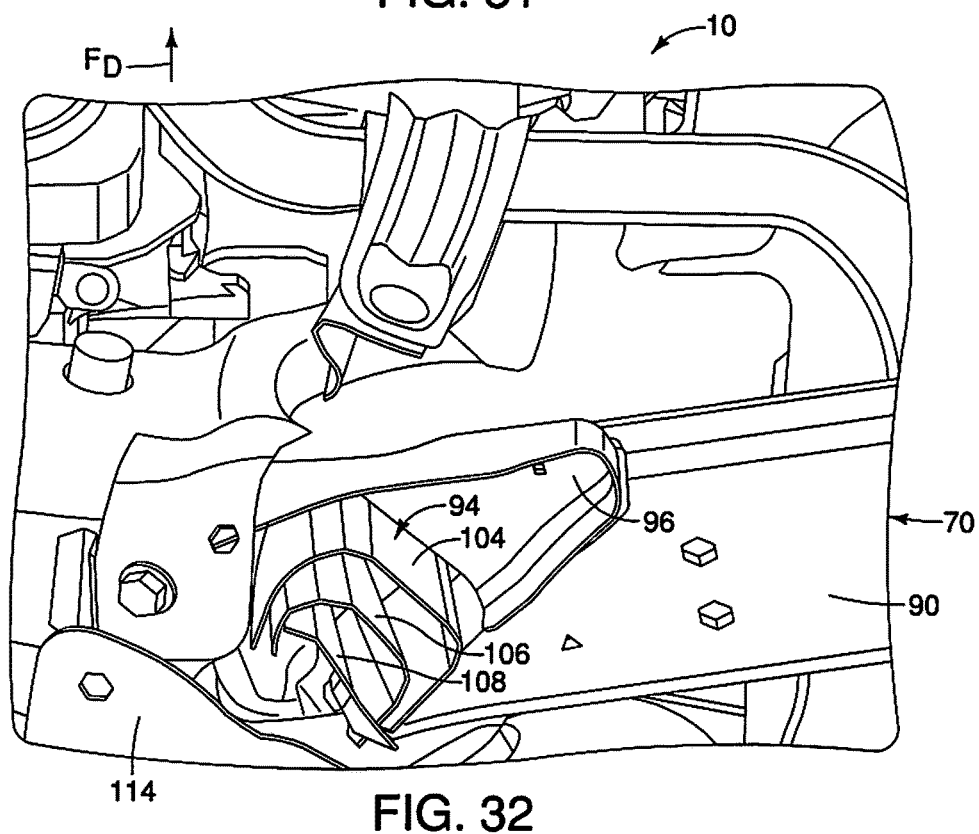
FIG. 32 is another bottom view of the front portion of the push arm assembly with the support bracket removed showing the energy absorbing structure and pivot bracket during a final stage of the impact event depicted in FIGS. 26-28, in accordance with the embodiment.

As shown in FIG. 26 the small overlap test is designed such that the vehicle 10 makes contact with the barrier B in the area of the front end plate 92 of the push arm assembly 70. Initially, impact energy is directed diagonally (rearward and laterally) from the front end plate 92 in the direction of the gap maintaining structure 78 (a cross-car direction) as indicated by the large arrow superimposed over portions of the off-center impact reinforcement structure 12 in FIG. 26. The impact energy of the small overlap test is such that the front end plate 92 transmits impact force through the main body 90 causing the main body 90 to move rearward resulting in the impact energy being directed rearward and laterally, as shown in FIG. 27. Several impact absorbing changes occur as the main body 90 moves rearward relative to the frame 22, as explained further below. As shown in FIG. 27, the main body 90 begins to rotate about the intersection 66 of the first side member 30 and the first cross-member 34. As also shown in FIG. 27, the impact force is largely directed in a vehicle lateral direction, as indicated by the large arrow superimposed over the push arm assembly 70 in FIG. 27. The rotation of the main body 90 causes at least a portion of the impact energy from the small overlap test to push the vehicle 10 laterally away from the barrier B. Further, as shown in FIG. 28, rotation of the main body 90 causes the main body 90 and the barrier B to press against a front wheel T of the vehicle 10, causing the front wheel T to contact the stop structure 80, as is described in greater detail below. As shown in FIG. 28, once the front wheel T contacts the stop structure 80, impacting force is directed rearward and laterally (another cross-car direction) as indicated by the large arrow superimposed over the front wheel T. Further, as shown in FIG. 28, in the final stages of the impact event, the push arm assembly 70, and in particular, the main body 90, has pivoted such that the main body 90 is parallel to or in alignment with the first cross-member 34.

Figure 33:
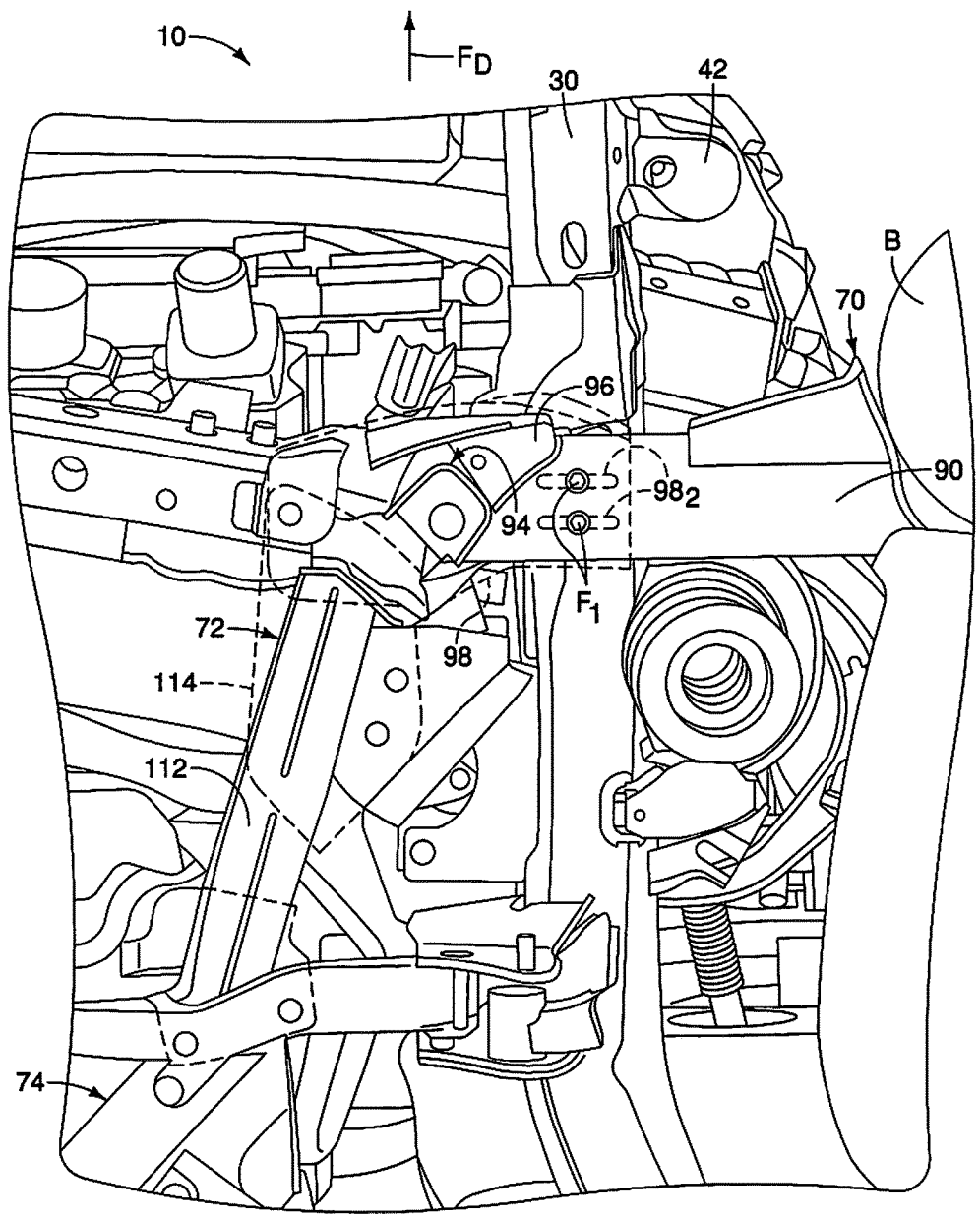
FIG. 33 is another bottom view of the front portion of the frame and the off-center impact reinforcement structure showing the push arm assembly and the first structure with the support bracket and the bracket of the first structure in phantom showing the energy absorbing structure and pivot bracket after the impact event depicted in FIGS. 26-28, in accordance with the embodiment.

As shown in FIG. 29-33, as the main body 90 is pushed rearward by contact with the barrier B, the main body 90 slides rearward relative to the support bracket 98, as shown in FIG. 33. In FIGS. 29-32 the support bracket 98 is removed to show movement of the main body 90 and compression of the energy absorbing structure 94. During the small overlap test, the support bracket 98 is installed. The support bracket 98 is shown in phantom in FIG. 33. In the initial stages of the impact event, impact force is such that the fasteners $F_1$ that attached the main body 90 to the support bracket 98, slide along the slots 98e. The slots 98e are oriented and dimension to direct the rearward movement of the main body 90 in a direction toward the intersection 66 of the first side member 30 and the first cross-member 34. Hence, in the initial moments of the impact event (the small overlap test), the main body 90 slides rearward toward the intersection 66 as directed by the orientation of the slots 98e.

As the main body 90 is urged to move toward the intersection 66, the gap $G_1$ between rear end 90b of the main body and first cross-member 34 at the intersection 66 begins to close, as shown in FIG. 30-33. As a result of the closing of the gap $G_1$, the pivot bracket 96 contacts the first cross-member 34 inboard of the intersection 66 providing the main body 90 with a pivot point about which the front end plate 92 of the main body 90 begins to rotate rearward and laterally outboard away from the first side member 30. Once the main body 90 begins to pivot about the pivot bracket 96, the energy absorbing structure 94 absorbs a portion of the impact energy and is deformed, as shown in FIGS. 30-33. The cup-shape of the first and second cup-shaped members 104 and 106 is such that contact with the bolt 54 securing the lower control arm 52 to the first side member 30 is avoided, thereby maintaining attachment between the first side member 30 and the lower control arm 52. In other words, the shape and configuration of the elements that define the energy absorbing structure 94 protect the bolt 54 and prevent the lower control arm 52 from being released from the first side member 30 during the impact event. As shown in the sequence depicted in FIGS. 30-33, the energy absorbing structure 94 is configured such that in response to the impact event of the small overlap test (the off-center impact event) against the front end plate 92 of the push arm assembly 70, the push arm assembly 70 via the main body 90 imparts impact force to the energy absorbing structure 94 pushing the energy absorbing structure 94 into contact with the front suspension structure 48 such that the energy absorbing structure 94 is deformed absorbing impact energy. The deformation of the energy absorbing structure 94 can take many forms. For example, the side walls 106a and 106b can deform and move away from one another (diverging movement) or can deform and move toward one another (converging movement). It is also possible for one of the side walls 106a and 106b to move toward the other, while the other remains unmoved. Further, one or both of the side walls 106a and 106b can be provided with a notch or score-line (not shown) that encourages a direction of deformation during the impact event.

Further, the pivot bracket 96 is configured and positioned such that in response to the off-center impact event against the push arm assembly 70, the main body 90 moves the pivot bracket 96 into contact with the first cross-member 34 and imparts impact force to the pivot bracket 96 pushing the energy absorbing structure 94 into contact with the front suspension structure 48. Further, the push arm assembly 70 pivots about the contact area between the pivot bracket 96 and the first cross-member 34 providing a pivot point about which the front surface 92a and 92b of the push arm assembly 70 pivots.

As is described further below, impact energy is further transmitted through the first cross-member 34 to the first structure 72, the second cross-member 36, through the gap maintaining structure 78 and thereafter to the second structure 76. Description of the further transmitted impact force follows the description of the second structure 76, the gap maintaining structure 78 and the bulkhead structure 80.

A description of the second structure 76, the gap maintaining structure 78 and the bulkhead structure 80 is now provided with specific reference to FIGS. 35-56. The second structure 76, the gap maintaining structure 78 and the bulkhead structure 80 are inter-related structures and therefore are describe together.

Figure 35:
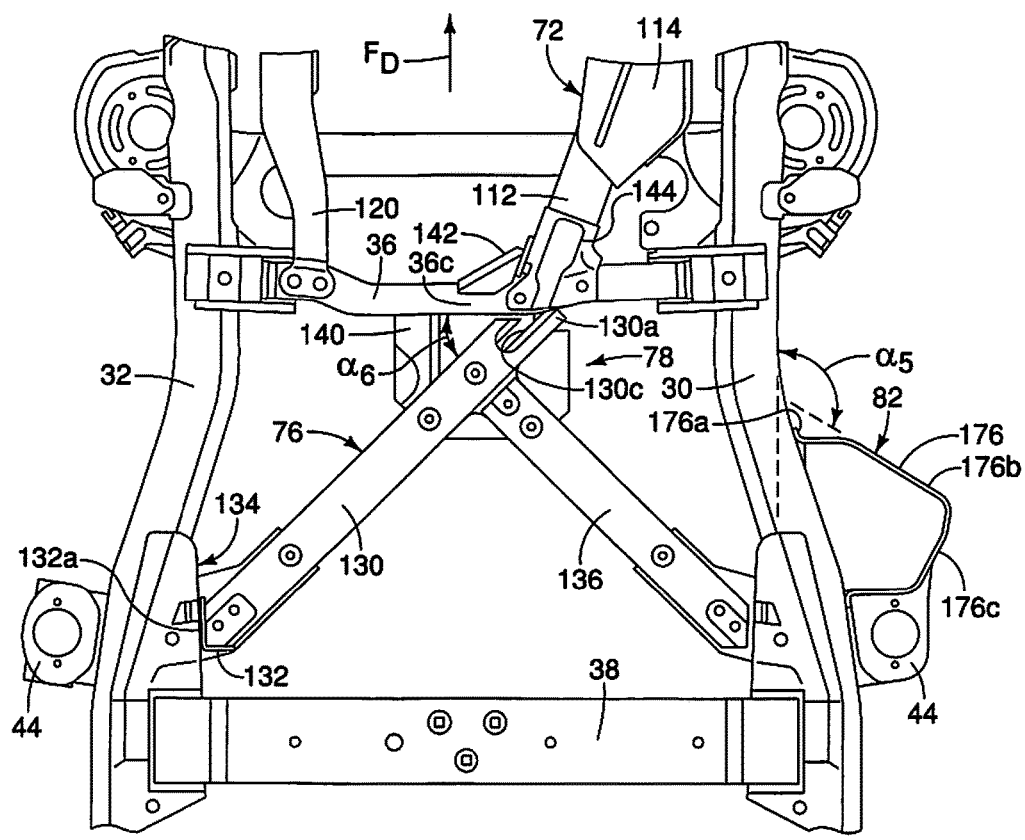
FIG. 35 is another bottom view of a mid-vehicle portion of the frame and the off-center impact reinforcement structure showing the first structure, the secondary reinforcement cross-member, the second structure, the gap maintaining structure and the stop structure in accordance with the embodiment.
Figure 37:
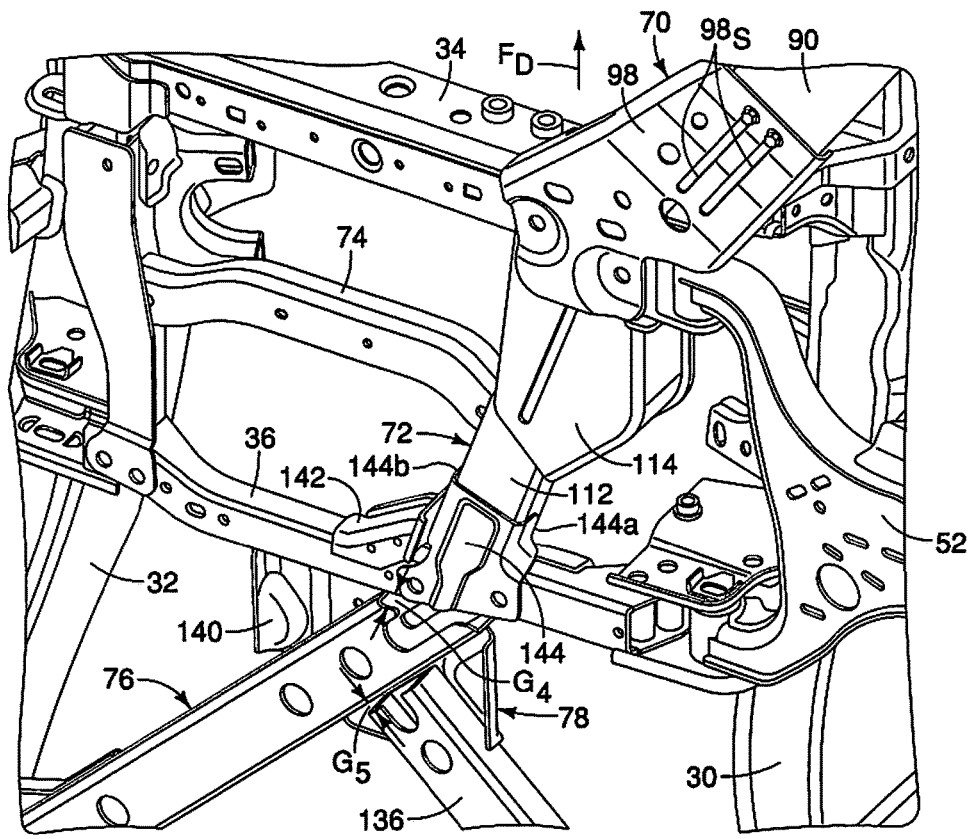
FIG. 37 is a perspective bottom view of the mid-vehicle portion of the frame and the off-center impact reinforcement structure showing the first structure, the secondary reinforcement cross-member, the second structure and the gap maintaining structure in accordance with the embodiment.

The second structure 76 is another diagonal structure that extends from the mid-portion 36c of the second cross-member 36 to a portion of the second side member 32 adjacent to the body attachment flange 44 and rearward of the second cross-member 36, as shown in FIGS. 35 and 37. The second structure 76 basically includes a beam 130 (FIGS. 39, 46, 51 and 52), an end plate 132 (FIGS. 39 and 51), a rear attachment structure 134 (FIGS. 46-50) and a secondary diagonal structure 136 (FIGS. 35 and 37).

The gap maintaining structure 78 includes an upper attachment bracket 140, a first lower attachment bracket 142 and a second lower attachment bracket 144.

The bulkhead structure 80 is defined relative to the second cross-member 34, which includes an upper portion 150 and a lower portion 152. The bulkhead structure 80 includes a first reinforcement bracket 154 and a second reinforcement bracket 156 that are installed to a hollow interior of the second cross-section member 34 between the upper portion 150 and the lower portion 152, as described below.

Figure 39:
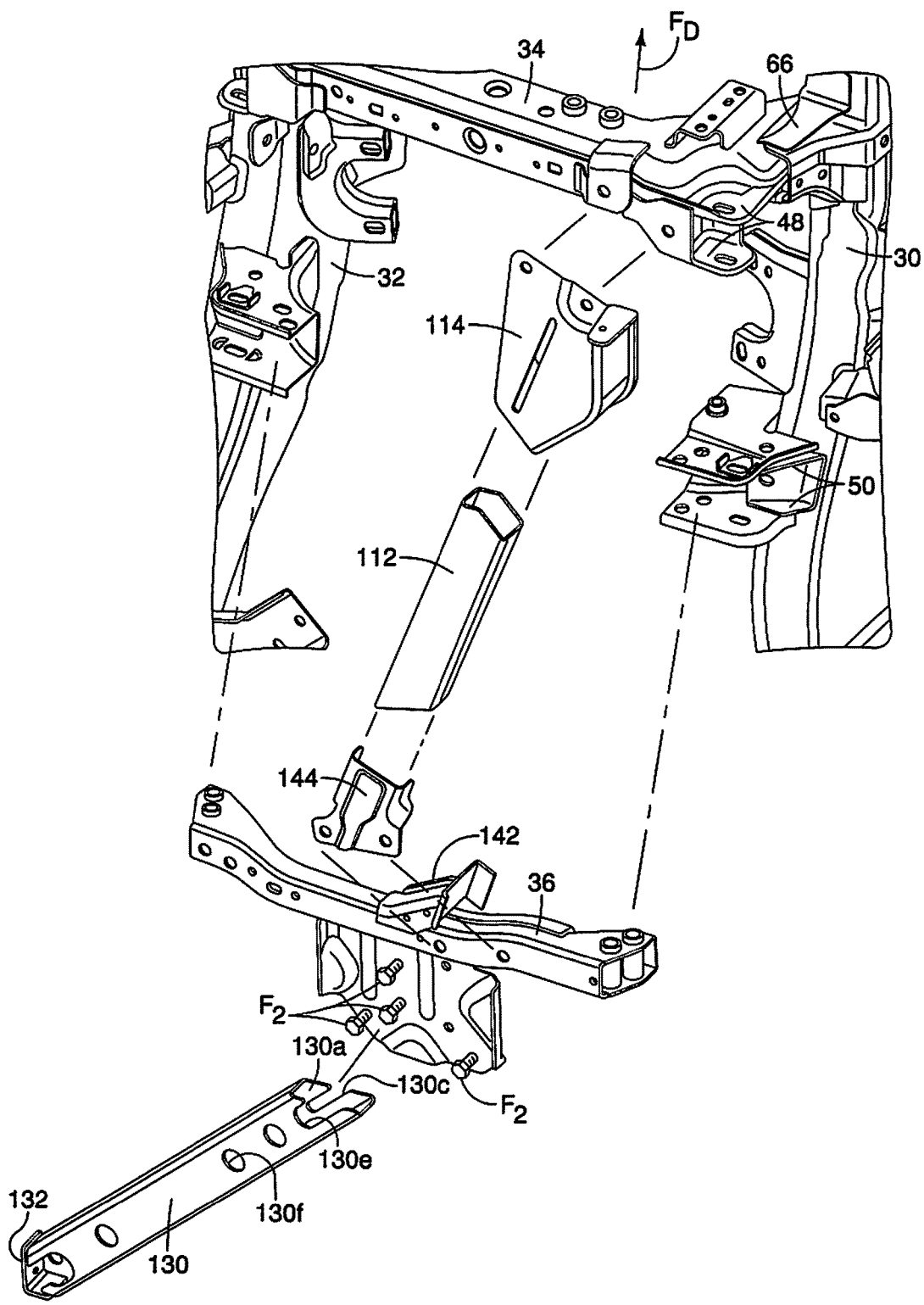
FIG. 39 is an exploded view of portions of the frame including the second cross-member, the first structure, the second structure and portions of the gap maintaining structure in accordance with the embodiment.
Figure 51:
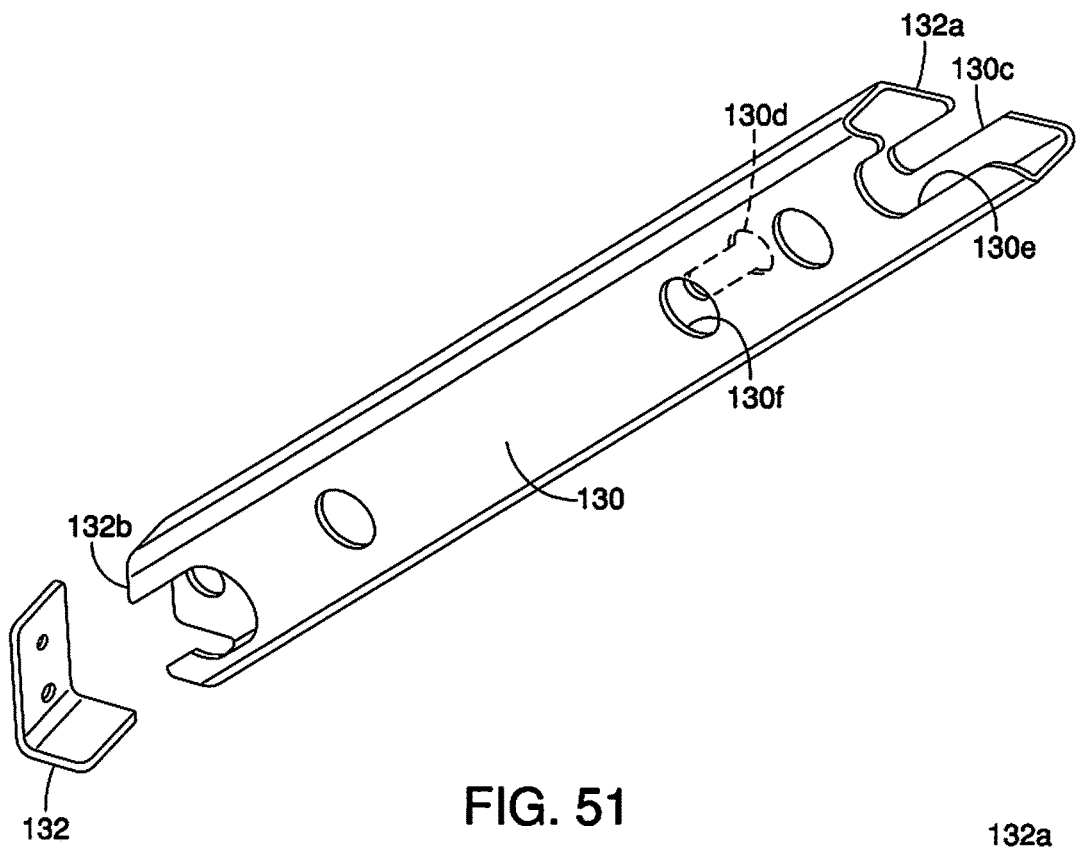
FIG. 51 is an exploded perspective view of a portion of the second structure shown removed from the second side member, showing a hollow beam and an end plate thereof in accordance with the embodiment.

As shown in FIGS. 39, 46, 51 and 52, the beam 130 of the second structure 76 has a forward end 130a and a rearward end 130b. An upper wall of the forward end 130a of the beam 130 includes a first slot 130c and a second slot 130d shown in FIG. 52. The first and second slots 130c and 130d are aligned with one another and are configured to receive mechanical fasteners extending from the upper attachment bracket 140, as is described in greater detail below. The end plate 132 is fixedly attached to the rearward end 130b of the beam 130 by, for example, welding techniques. The end plate 132, as shown in FIGS. 39 and 51, has two surfaces, with the surface 132a extending in a vehicle longitudinal direction parallel to the center line $C_L$ of the vehicle 10. A description of the end plate 132 and its relationship to the rear attachment structure 134 is provided below. A description of the secondary diagonal structure 136 is included after a description of the bulkhead structure 80, the gap maintaining structure 78 and the rear attachment structure 134.

Figure 42:
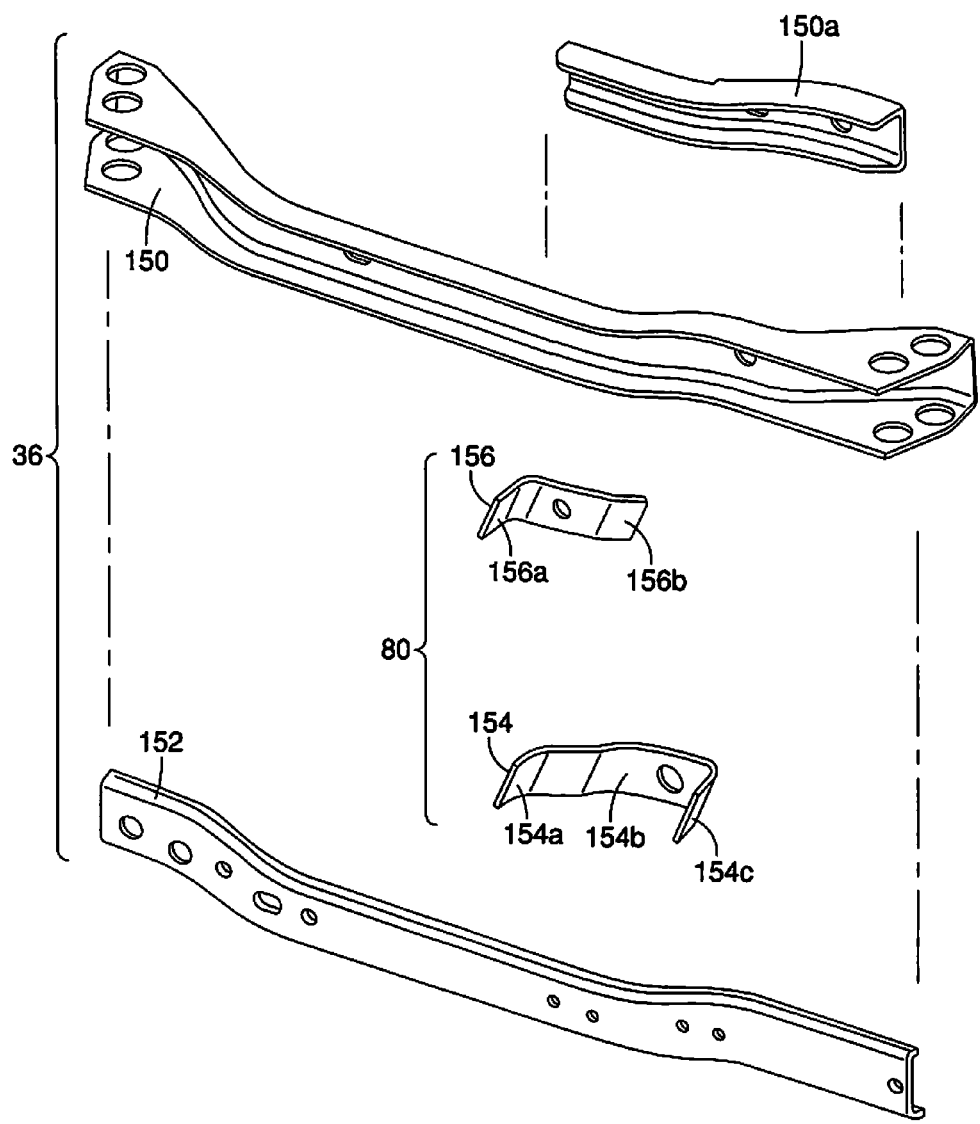
FIG. 42 is an exploded perspective view of the second cross-member showing details of a bulkhead within the second cross-member in accordance with the embodiment.
Figure 43:
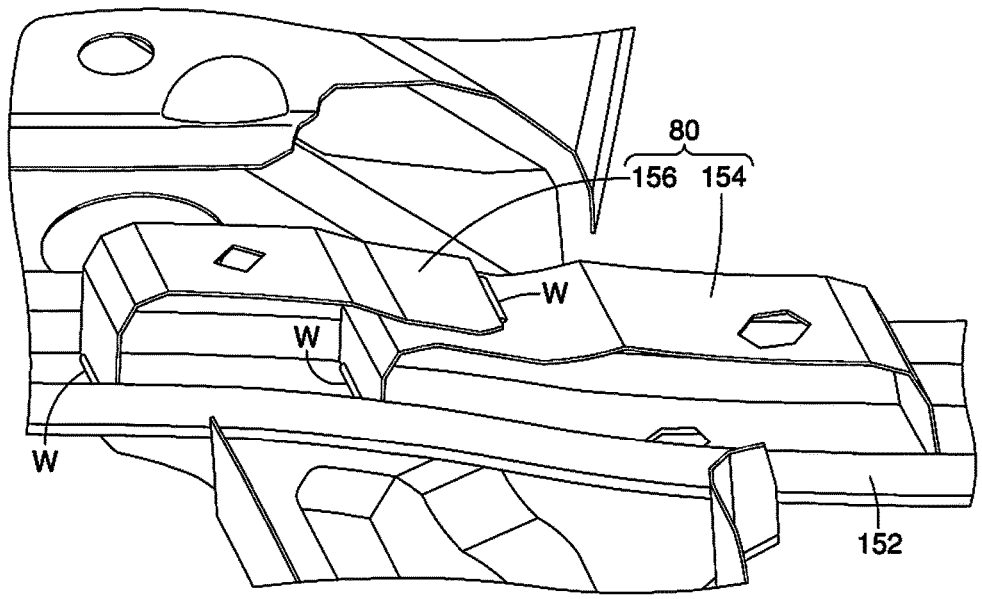
FIG. 43 is a perspective view of the second cross-member showing further details of the bulkhead within the second cross-member in accordance with the embodiment.
Figure 44:
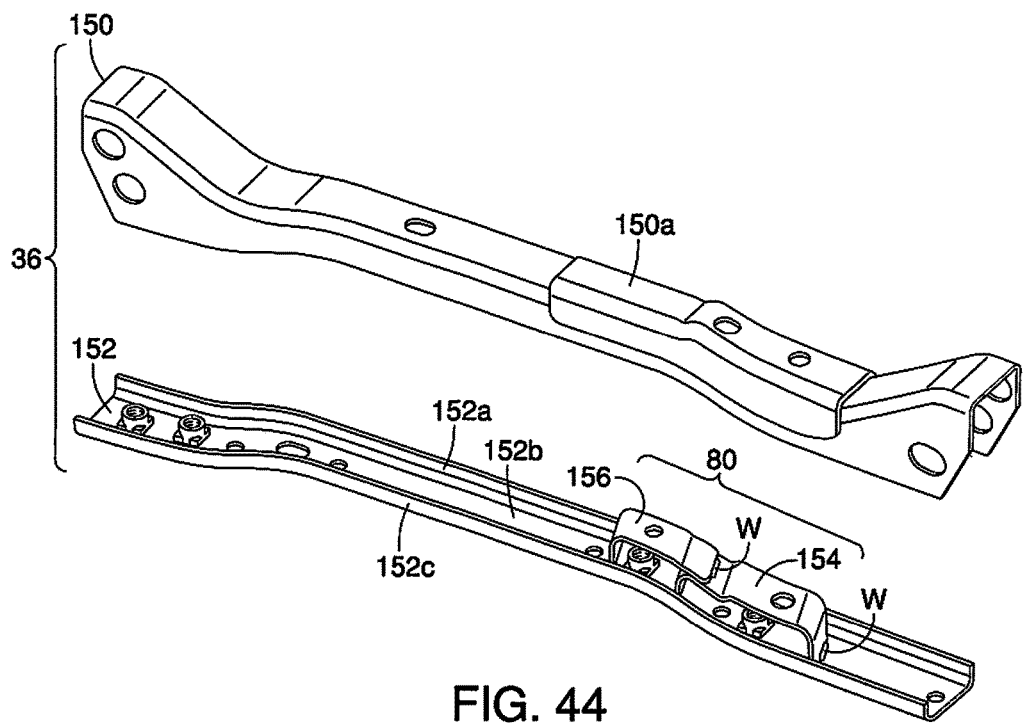
FIG. 44 is another exploded perspective view of the second cross-member showing details of the bulkhead in accordance with the embodiment.
Figure 45:
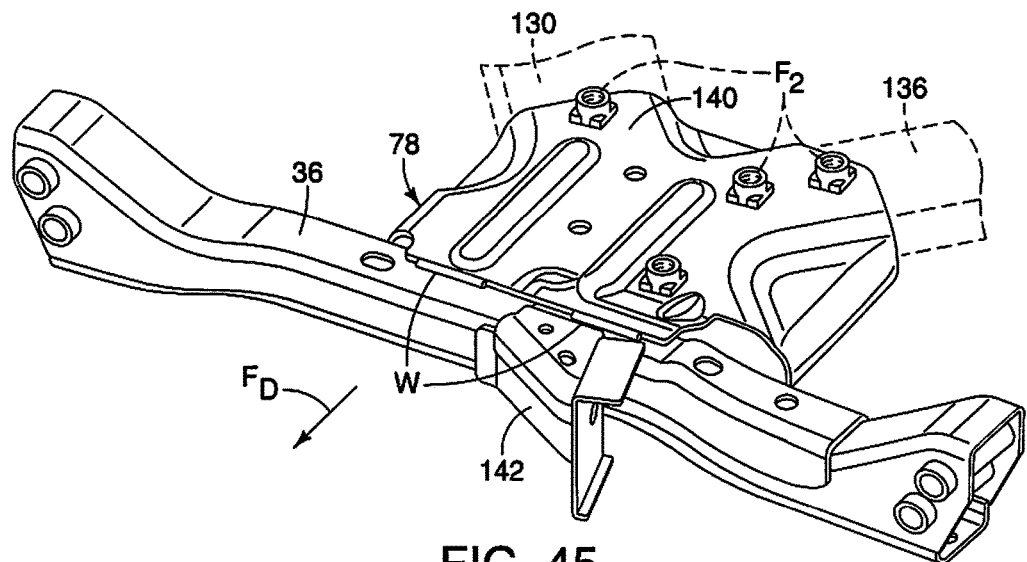
FIG. 45 is a perspective top view of the second cross-member showing an upper surface of the upper attachment bracket and the first lower attachment bracket in accordance with the embodiment.

As shown removed from the frame 22 in FIGS. 42 and 44, the second cross-member 36 includes the upper portion 150 and the lower portion 152. The upper portion 150 includes a reinforcement 150a that is welded to outer surfaces of the upper portion 150. The lower portion 152 has a first upright wall 152a, a horizontal wall 152b and a second upright wall 152c, as shown in FIG. 44. The first and second upright walls 152a and 152c are parallel to one another with a recessed area being defined between them above the horizontal wall 152b, as shown in FIG. 44.

The first reinforcement bracket 154 has a first upright portion 154a, a first horizontal portion 154b and a second upright portion 154c that together define the plurality of surface sections perpendicular to the first upright wall 152a and the second upright wall 152c. The second reinforcement bracket 156 defines a third upright portion 156a and a second horizontal portion 156b that installed within the recess or hollow area of the lower portion 152 of the second cross-member 36. The third upright portion 156a and the second horizontal portion 156b both define additional surface sections perpendicular to the first upright wall 152a and the second upright wall 152c of the second cross-member 36.

The first reinforcement bracket 154 of the bulkhead structure 80 is welded within the recessed area of the lower portion 150 via welds W. The second reinforcement bracket 156 is welded to the lower portion 152 with the recessed area and is further welded to an upper surface of the first reinforcement bracket 154. After the first and second reinforcement brackets 154 and 156 are welded in place, the upper portion 150 is welded to the lower portion 152 thereby completing the second cross-member 36. In the completed second cross-member 36, the bulkhead structure 80 is installed within a hollow interior of the second cross-member 34 between the upper portion 150 and the lower portion 152.

Thereafter, the second cross-member 36 can be installed to the first and second side member 30 and 32 and held in place by fasteners (not shown). As discussed further below, the bulkhead structure 80 reinforces the second cross-member 36 such that in response to an impact event, the second cross-member 36 resists being crushed or deforming. Impact forces on one side of second cross-member 36 in FIG. 44, will be first transmitted through reinforcement brackets 154 and 156 and then transmitted to the other side of second cross-member 36. Reinforcement brackets 154 and 156 transmit a column load from one side of second cross-member 36 to the other side of second cross-member 36 and improve the strength of second cross-member 36.

Figure 36:
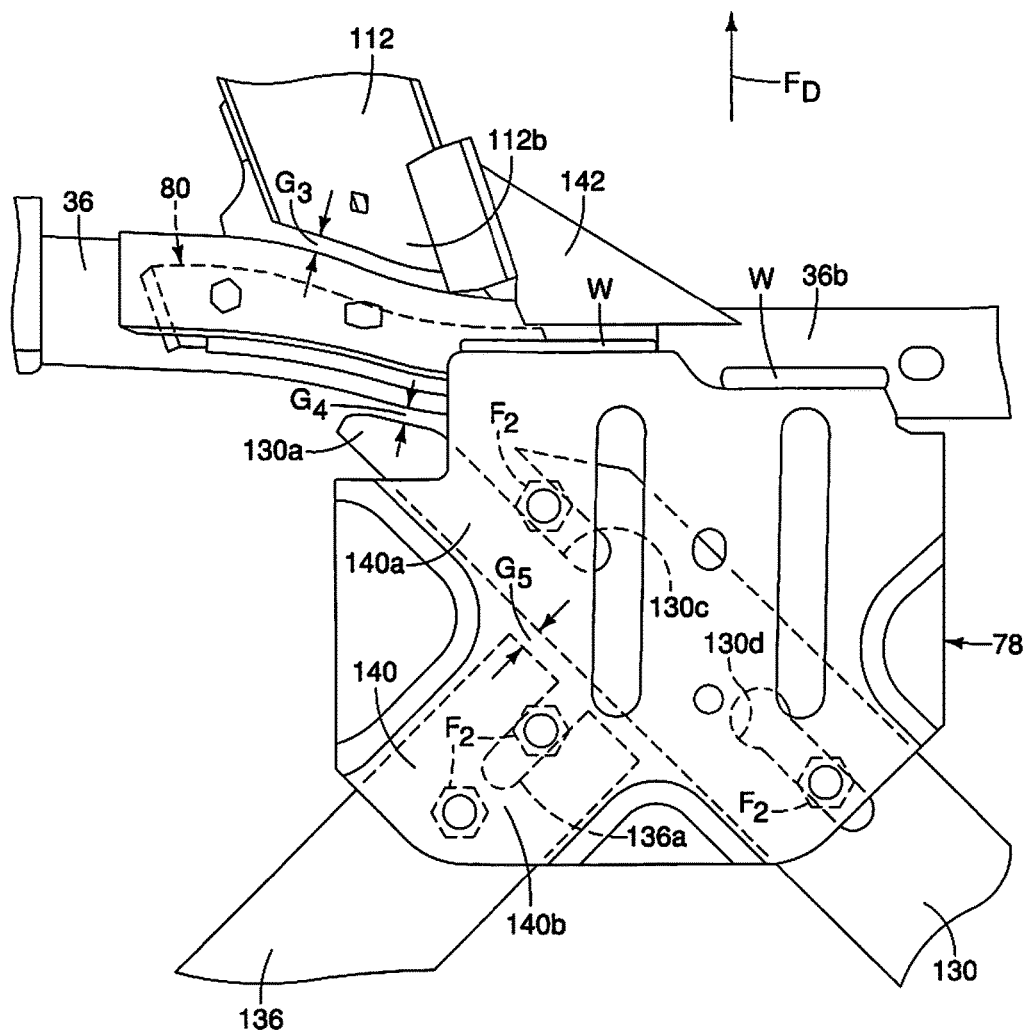
FIG. 36 is a top view of the gap maintaining structure showing details of an upper attachment bracket fixed to the second cross-member, a first lower attachment bracket and a second lower attachment bracket in accordance with the embodiment.

As shown in FIG. 36, the upper attachment bracket 140 of the gap maintaining structure 78 is welded to an upper surface 36b of the second cross-member 36. As is discussed further below, the welds W that fix the upper attachment bracket 140 to the second cross-member 36 can be tuned to have a predetermined level of strength. Specifically, during normal operating conditions of the vehicle 10, the welds W fixing the upper attachment bracket 140 to the second cross-member 36 have more than enough strength to retain the upper attachment bracket 140 in position. The upper attachment bracket 140 extends rearward away from the second cross-member 36. However, during an impact event, where impact forces acting on the first structure 72 are transmitted to the second cross-member 36 (as described further below) the welds W between the upper attachment bracket 140 to the second cross-member 36 can be tuned to release the upper attachment bracket 140 from the second cross-member 36. One method of tuning the strength of welds W is to alter the overall length of one or more of the welds W.

As shown in FIG. 36, the upper attachment bracket 140 of the gap maintaining structure 78 includes recessed areas 140a and 140b. The recessed area 140a is dimensioned and configured to receive the forward end 130a of the beam 130 of the second structure 76 and the recessed area 140b is dimensioned and configured to receive a forward end of the secondary diagonal structure 136, as described further below. It should be understood from the drawings that FIG. 36 shows an upper surface of the upper attachment bracket 140, and that the recessed areas 140a and 140b define concaved areas of an underside surface of the upper attachment bracket 140 that is not visible in FIG. 36. Rather, FIG. 36 shows convex areas corresponding to the recessed areas 140a and 140b.

Figure 52:
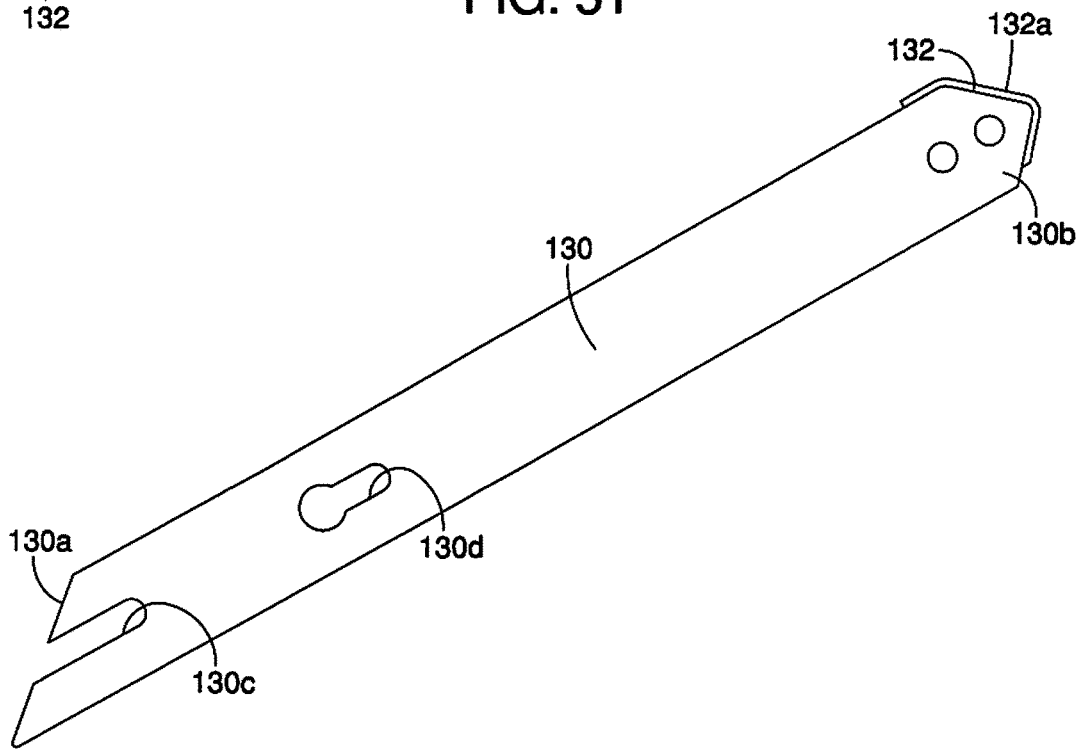
FIG. 52 is a top view of the hollow beam and the end plate depicted in FIG. 51 in accordance with the embodiment.
Figure 53:
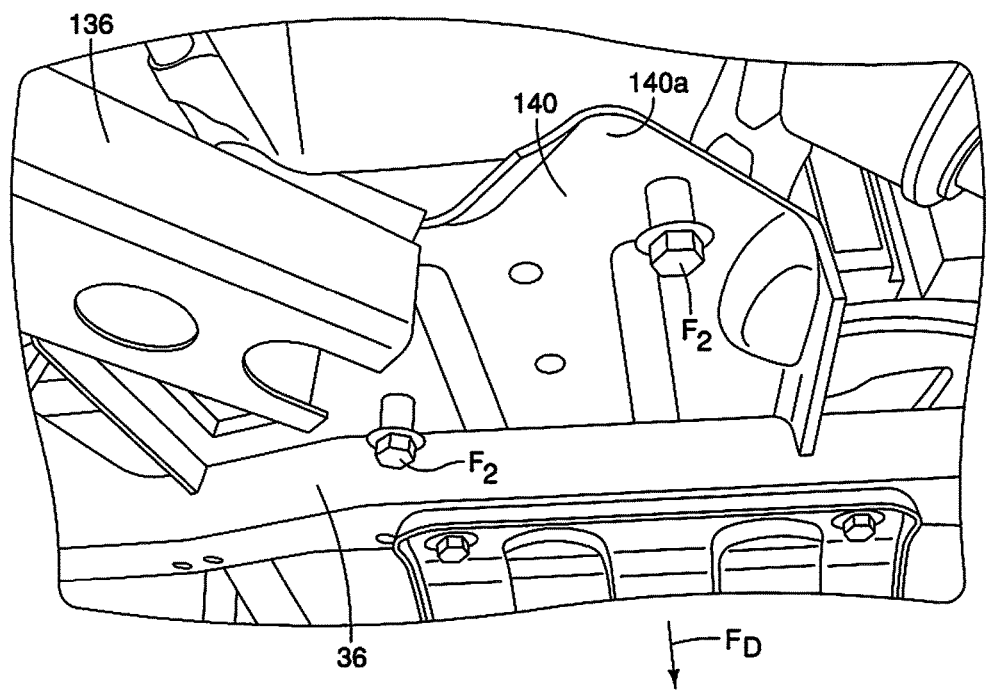
FIG. 53 is a perspective bottom view of the second cross-member and the upper attachment bracket with the hollow beam removed showing recessed areas and fasteners of the upper attachment bracket in accordance with the embodiment.

FIG. 53 shows a lower surface of the upper attachment bracket 140 extending rearward from the second cross-member 36. The secondary diagonal structure 136 is installed to the upper attachment bracket 140 within the recessed area 140b. The recessed area 140a is visible in FIG. 52. Fasteners $F_2$ are installed to threaded the upper attachment bracket 140 in order to receive the forward end 130a of the beam 130 of the second structure 76.

The welds W that fix the upper attachment bracket 140 to the second cross-member 36 are provided with a first shear strength. The mechanical fasteners $F_2$ are provided with a second shear strength stronger than the first shear strength such that in response to the off-center impact event, the welds W release the upper attachment bracket 140 from the second cross-member 36 with the upper attachment bracket 140 remaining above the second cross-member 36 supporting the second structure 76 thereby limiting vertical movement of the second structure 76 relative to the second cross-member 36.

Figure 40:
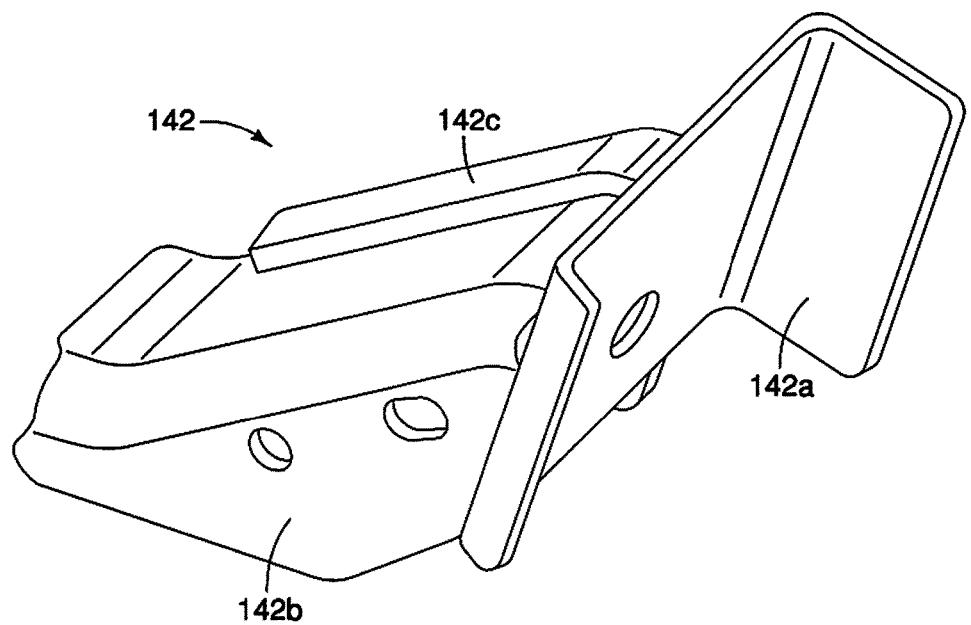
FIG. 40 is a perspective view of the first lower attachment bracket of the gap maintaining structure shown removed from the vehicle in accordance with the embodiment.
Figure 41:
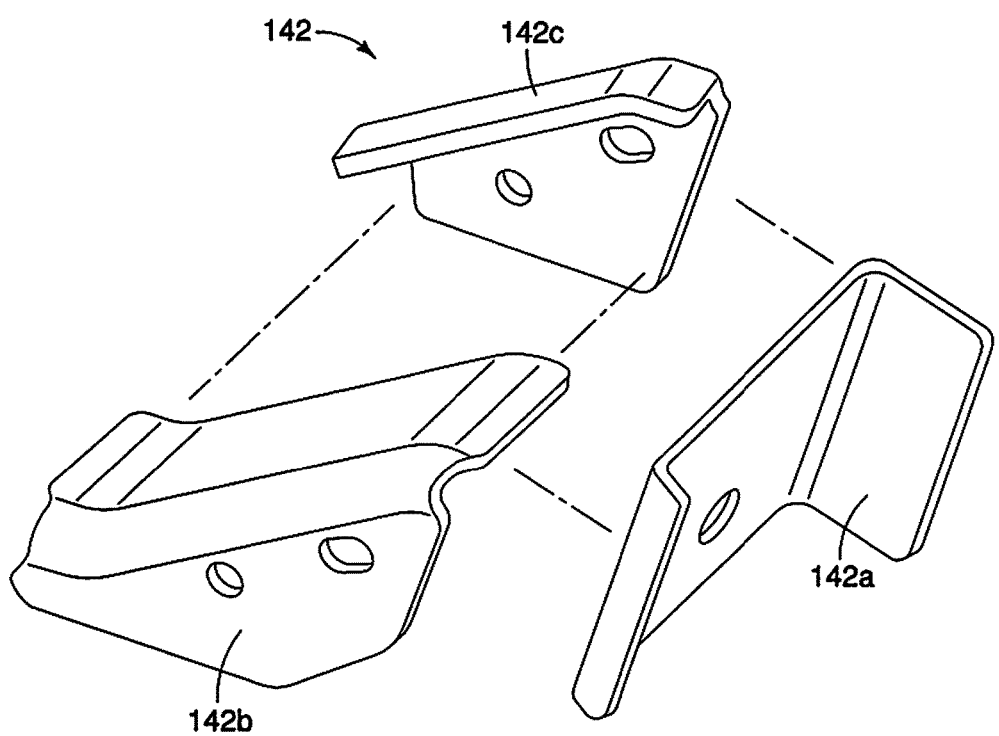
FIG. 41 is an exploded perspective view of the first lower attachment bracket of the gap maintaining structure shown removed from the vehicle in accordance with the embodiment.

The first lower attachment bracket 142 of the gap maintaining structure 78 is shown removed from the vehicle 10 in FIGS. 40 and 41. The first lower attachment bracket 142 includes a U-shaped portion 142a, a first angled portion 142b and a second angled portion 142c. As shown in FIG. 40, the U-shaped portion 142a, the first angled portion 142b and the second angled portion 142c are welded together. The U-shaped portion 142a defines a recessed area that receives the rear end 112b of the hollow beam 112, as shown in FIGS. 35 and 36.

The second lower attachment bracket 144 is attached to the mid portion 36a of the second cross-member 36 via mechanical fasteners (not shown) or welding techniques. The second lower attachment bracket 144 has side walls 144a and 144b that contact opposite lateral sides of the hollow beam 112 of the first structure 72, as shown in FIGS. 37 and 38.

With the off-center impact reinforcement structure 12 installed to the frame 22 in the non-impacted state, there are several gaps maintained between the various elements of the first structure 72, the second cross-member 36 and the second structure 74. Specifically, as shown in FIG. 36 (in phantom) a gap $G_3$ is defined between the rear end 112b and an adjacent front surface of the second cross-member 36. Further, a gap $G_4$ is defined between a rear surface of the second cross-member 36 and a forward end 130a of the beam 130 of the second structure 76. Also, a gap $G_5$ is defined between a side surface of the beam 130 of the second structure 76 and a front end of the secondary diagonal structure 136.

The gaps $G_3$, $G_4$ and $G_5$ are maintained during normal operation of the vehicle 10 in the non-impacted state by the gap maintaining structure 78. Specifically, the rear end 112b of the hollow beam 112 is restricted against lateral movement being confined between the side walls 144a and 144b of the second lower attachment bracket 144. Further, movement of the rear end 112b of the hollow beam 112 is also limited by engagement with the recessed area defined by the U-shaped portion 142a of the first lower attachment bracket 142. Thus, the gap $G_3$ is maintained between the second cross-member 36 and the rear end 112b of the hollow beam 112.

It should be understood from the drawings and the description herein that the rear end 112b of the hollow beam 112 can be welded to the second lower attachment bracket 144 or can be fixed thereto via mechanical fasteners. Alternatively, the hollow beam 112 can merely be retained in place by contact with the second lower attachment bracket and the first lower attachment bracket 142. In the depicted embodiment, the rear end 112b of the hollow beam 112 is not fixed to the first lower attachment bracket 142, but rather is configured to move relative to the first lower attachment bracket 142 during an impact event, as is described further below.

Figure 54:
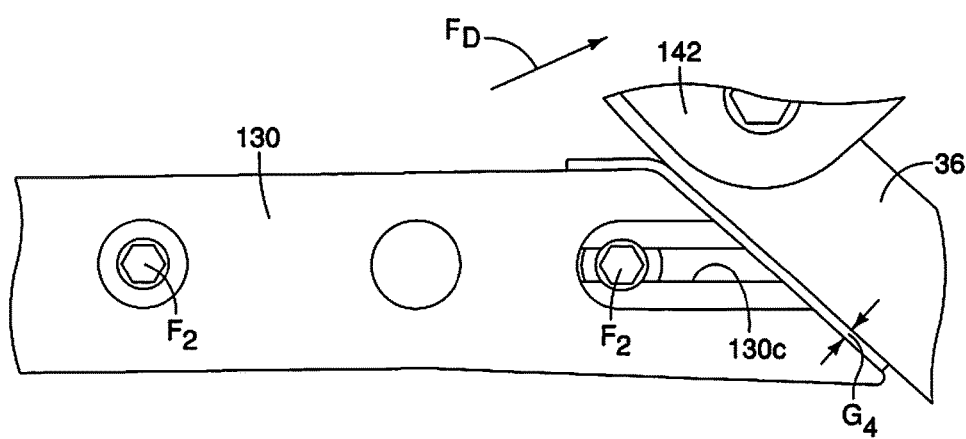
FIG. 54 is a bottom view of a portion of the second cross-section and the hollow beam of the second structure in accordance with the embodiment.

The gap $G_4$ is maintained via a connection between the upper attachment bracket 140 and the forward end 130a of the beam 130. Specifically, the slots 130c and 130d are fitted to the fasteners $F_2$ of the upper attachment bracket 140, as shown in phantom in FIG. 36. The fasteners $F_2$ of the upper attachment bracket 140 are also shown in FIGS. 39 and 53. The slots 130c and 130d are elongated, as shown in FIGS. 36 and 52. Therefore, once the beam 130 is slid on to the fasteners $F_2$, and moved to the position shown in FIG. 16, the beam 130 is able to undergo sliding movement relative to the upper attachment bracket 140. However, contact between the fasteners $F_2$, and the beam 130 prevents or limits vertical movement of the beam 130 during normal operation of the vehicle 10. As shown in FIGS. 51 and 54, the beam 130 additionally includes a large slot 130e and an aperture 130f. As shown in FIG. 54, once the beam 130 is slid on to the fasteners $F_2$, the fasteners $F_2$ can be accessed by tools via the slot 130e and the aperture 130f and tightened to secure the beam 130 to the upper attachment bracket 140.

It should be understood from the drawings and the description herein, that each of the upper attachment bracket 140, the first lower attachment bracket 142 and the second lower attachment bracket 144 includes a recess or recessed area that retains a beam member of one of the first structure 72 and the second structure 76 in the non-impacted state. Further, the recess or recessed area of each of the upper attachment bracket 140, the first lower attachment bracket 142 and the second lower attachment bracket 144 guides movement of the corresponding beam member of one of the first structure 72 and the second structure 76 in response to an impact event, as is described in further below.

Figure 55:
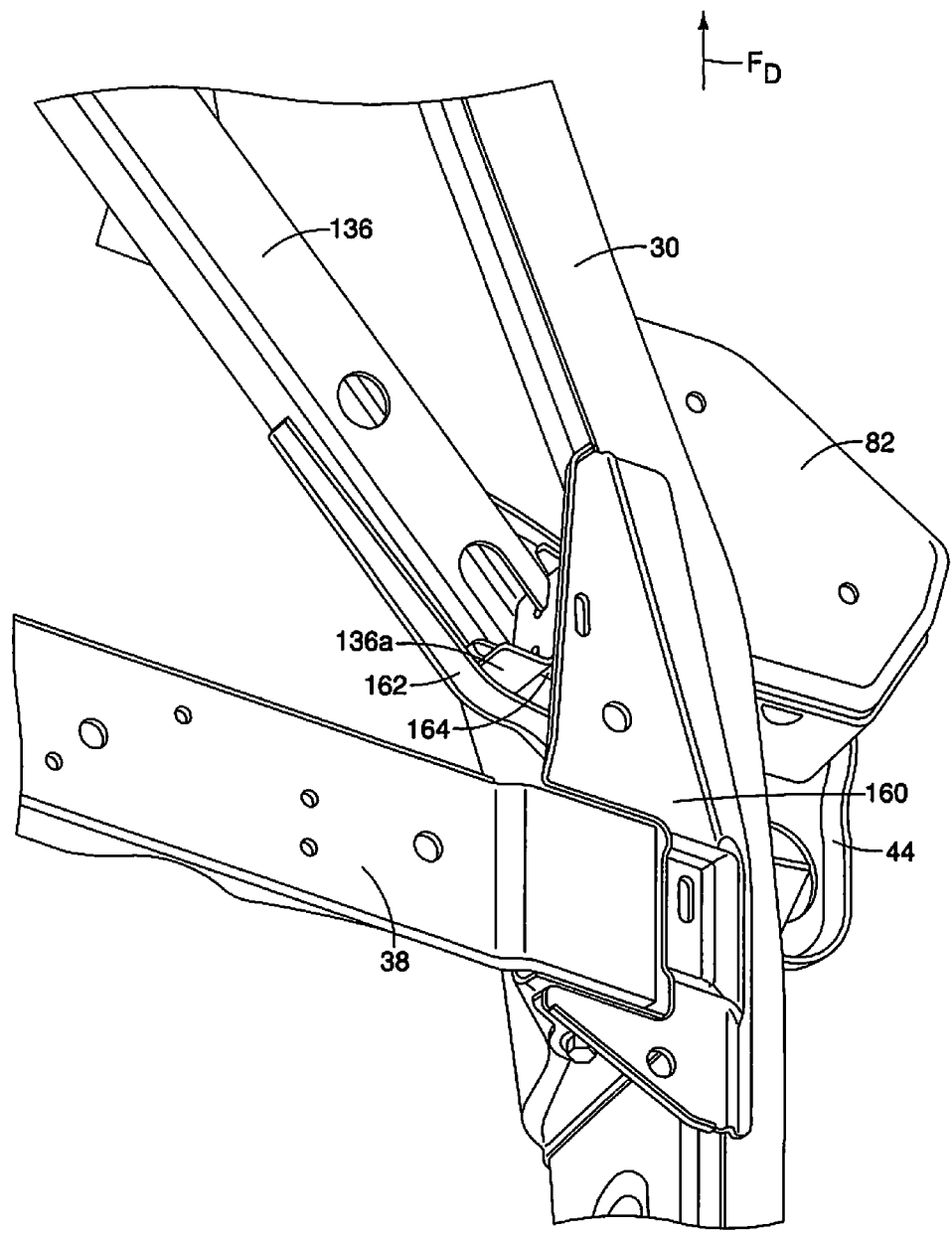
FIG. 55 is a bottom perspective view of a secondary diagonal structure and a corresponding rear attachment structure coupled to the first side member in accordance with the embodiment.

The secondary diagonal structure 136 is a hollow beam member, as shown in FIGS. 35 and 55. The forward end of the secondary diagonal structure 136 is attached to the upper attachment bracket 140 via two of the fasteners $F_2$. The rearward end of the secondary diagonal structure 136 includes and end plate 136a welded in place to the secondary diagonal structure 136. The rearward end of the secondary diagonal structure 136 is coupled to the first side member 30 in a manner consistent with the attachment of the beam 130 to the second side member 32. Description of the attachment structure fixing of the rearward end of the secondary diagonal structure 136 to the first side member 30 is provided below with a description of the rear attachment structure 134.

Figure 56:
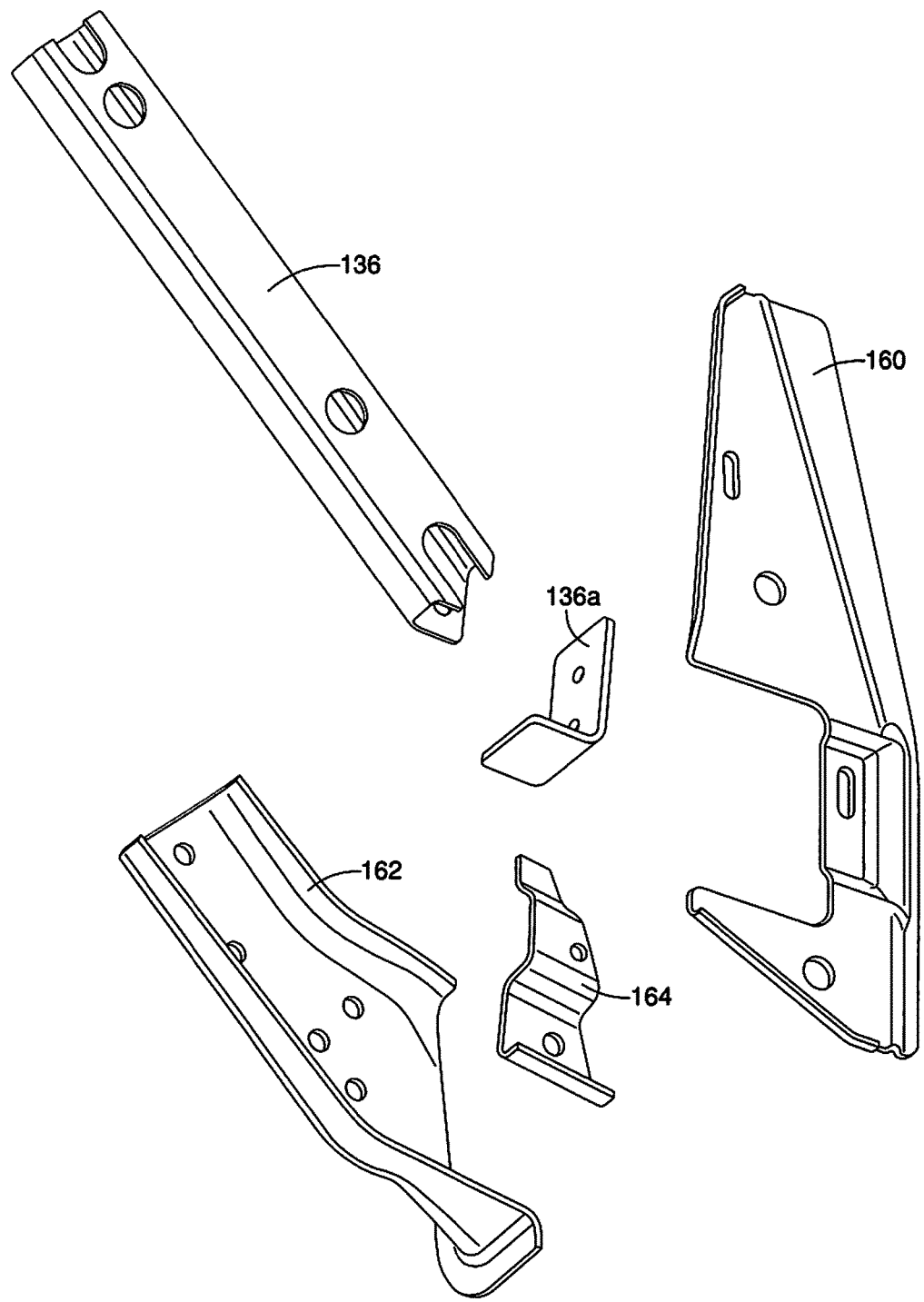
FIG. 56 an exploded perspective view of the secondary diagonal structure and the corresponding rear attachment structure depicted in FIG. 55 in accordance with the embodiment.

The rear attachment structure 134 includes structural members that couple the rearward end 130b of the beam 130 to the second side member 32. Specifically, the rear attachment structure 134 includes a first bracket 160, a second bracket 162 and a stopper bracket 164. The secondary diagonal structure 136 is coupled to the first side member 30 using structures that are identical, except that they are mirror images thereof. Therefore, the description below of the coupling between the beam 130 to the second side member 32 (FIGS. 46-50) applies equally to the coupling of the secondary diagonal structure 136 to the first side member 30 (FIGS. 55 and 56). More specifically, the shape and installation of the first bracket 160, the second bracket 162 and the stopper bracket 164 to the second side member 32 also applies to installation to the first side member 30, except that the coupling to the first side member 30 is applied to the secondary diagonal structure 136.

Figure 46:
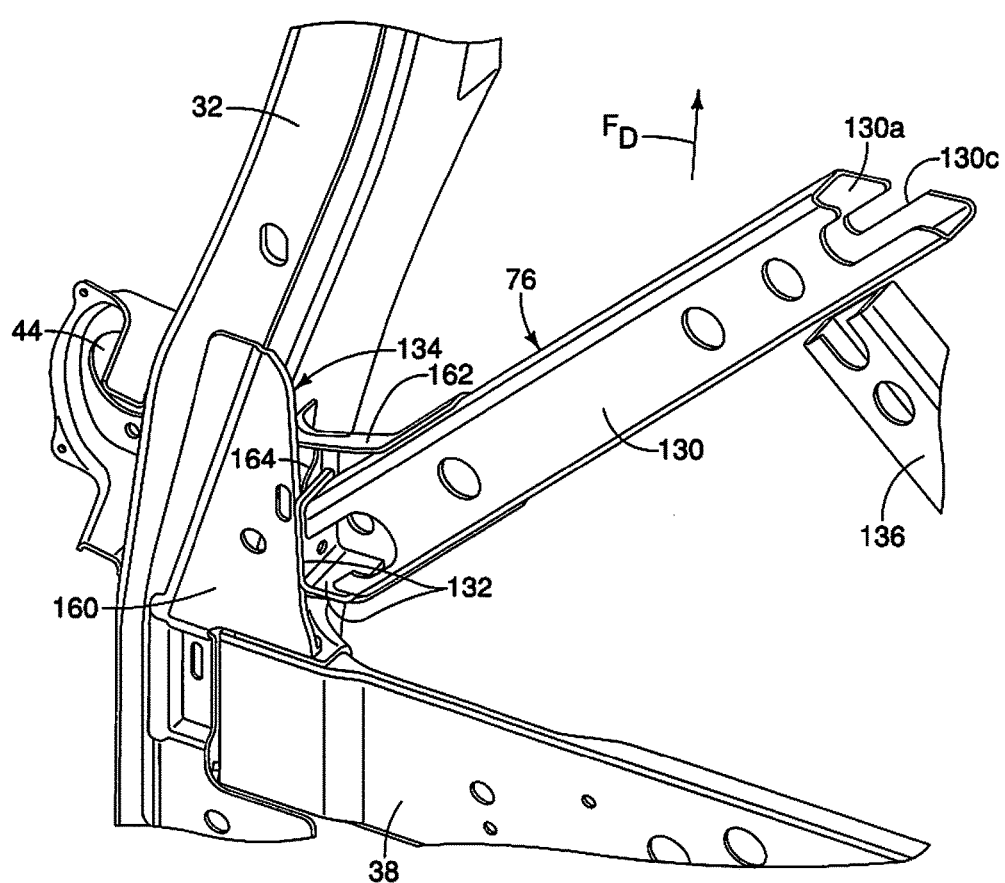
FIG. 46 is a perspective bottom view of a portion of the second side member of the frame and features of the second structure coupled thereto in accordance with the embodiment.
Figure 47:
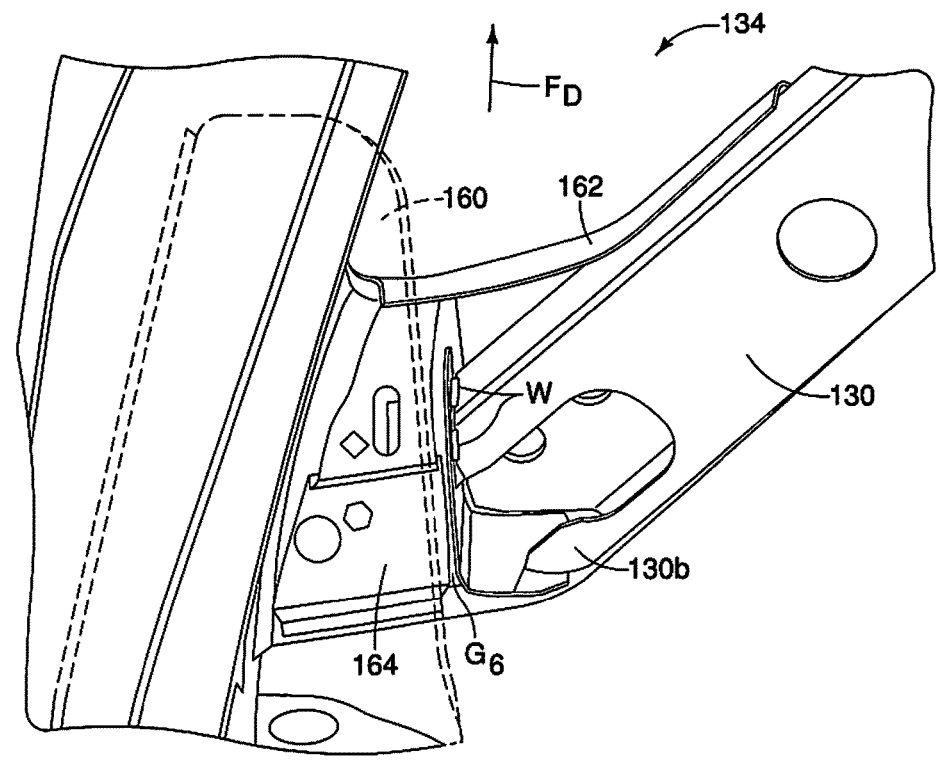
FIG. 47 is another perspective bottom view of another portion of a rear portion of the second side member of the frame and features of a rear attachment portion of the second structure with one of the brackets in phantom revealing details of a stop bracket in accordance with the embodiment.
Figure 48:
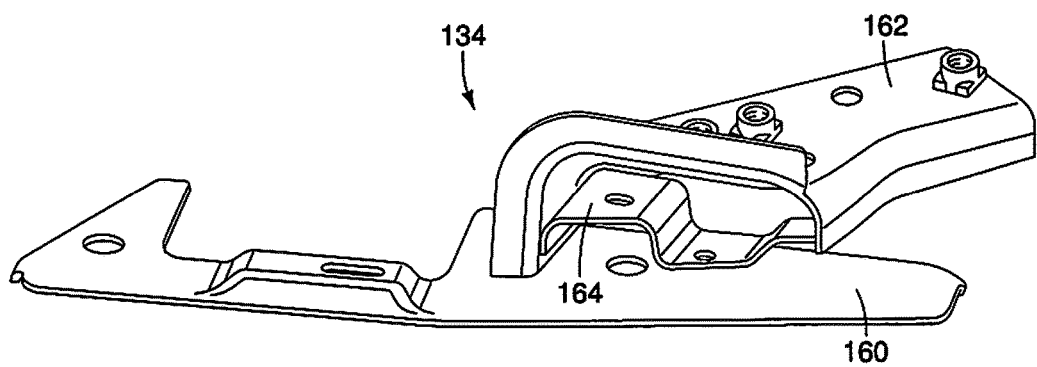
FIG. 48 is a perspective view of brackets of the rear attachment portion shown removed from the second side member and the second structure in accordance with the embodiment.
Figure 49:
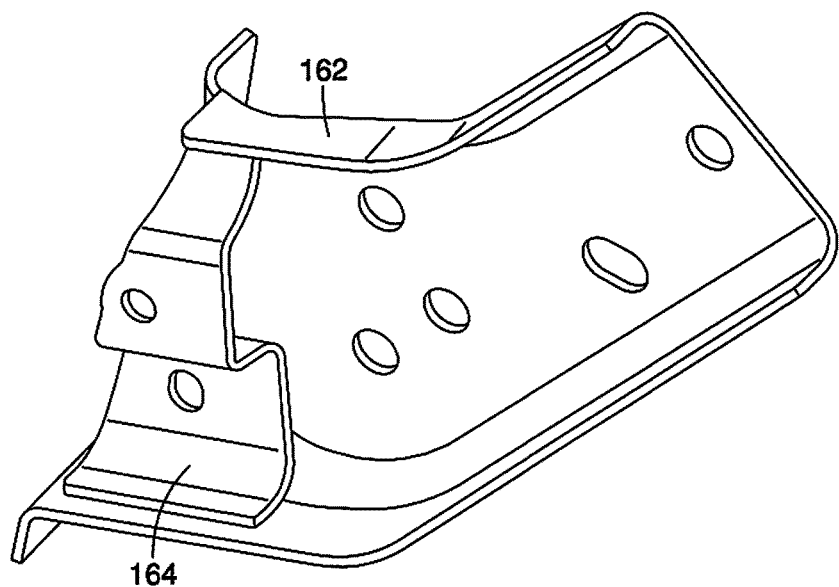
FIG. 49 is another perspective view of two of the brackets of the rear attachment portion shown removed from the second side member and the second structure in accordance with the embodiment.
Figure 50:
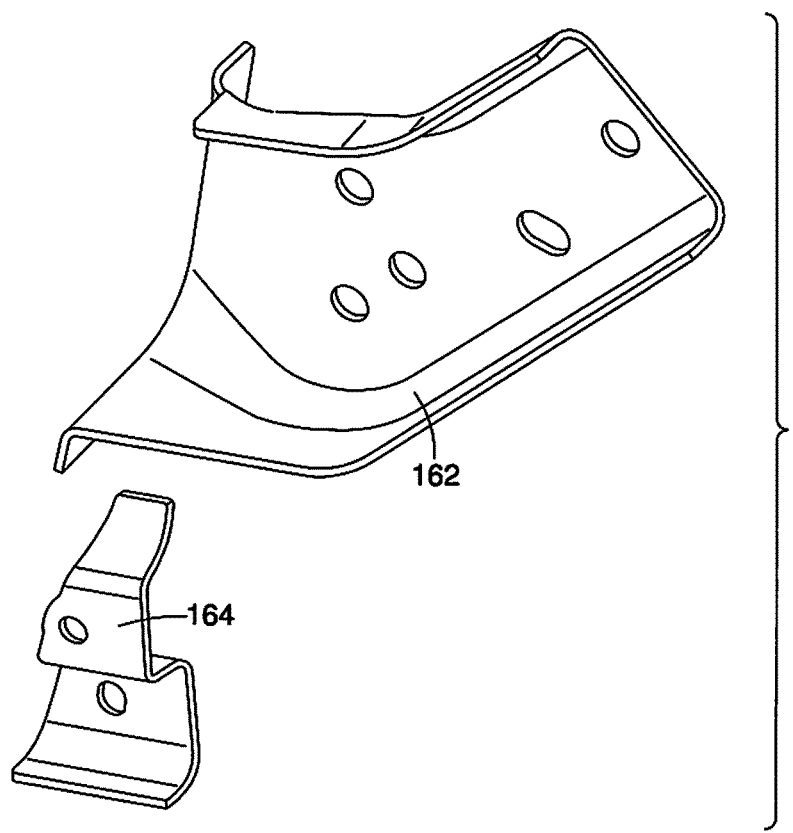
FIG. 50 is an exploded perspective view of two of the brackets of the rear attachment portion depicted in FIG. 49 in accordance with the embodiment.

As shown in FIGS. 35 and 46-50, the first bracket 160 is welded to an underside surface of the second side member 32. The second bracket 162 is welded to an inboard side surface of the second side member 32, with the stopper bracket 164 welded within a recess defined within the second bracket 162. As shown in FIGS. 46 and 47 (and FIG. 55 with respect to the secondary diagonal structure 136), the rearward end 130b of the beam 130 extends into a pocket defined between the first bracket 160 and the second bracket 162. Further, the beam 130 can be fixed to the second bracket by mechanical fasteners (not shown) or by welds (not shown) that are tuned to release the beam 130 in response to an impact event. Hence, the beam 130 is prevented from lateral, vertical and horizontal movement in the non-impacted state. A gap $G_6$ is maintained between the surface 132a of the end plate 132 of the beam 130 and the stopper bracket 164 in the non-impacted state. However, as described below, in response to an impact event, the gap $G_6$ can be closed bringing the surface 132a of end plate 132 of the beam 130 into contact with the stopper bracket 164.

As shown in FIG. 35, when fully installed in the non-impacted state, the beam 130 of the second structure 76 defines an angle $\alpha_6$ relative to the second cross-member 36 that is between 35 and 60 degrees. In the depicted embodiment, the an angle $\alpha_6$ is between 40 and 50 degrees, and is preferably approximately 45 degrees.

Figure 57:
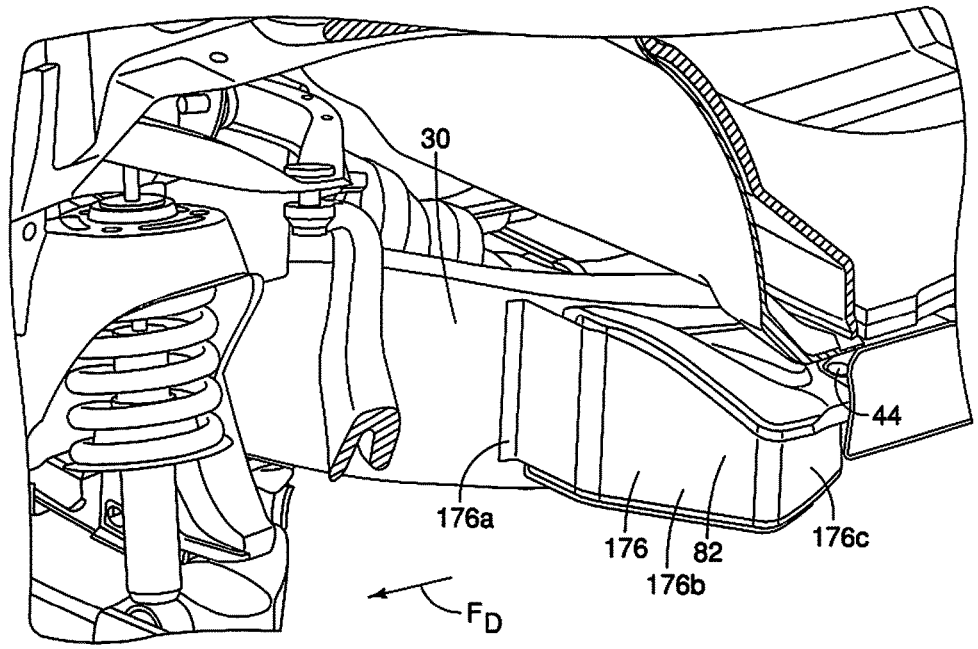
FIG. 57 is a perspective side view of the first side member of the frame showing the stop structure fixed thereto in accordance with the embodiment.

A description is now provided of the stop structure 82 with specific reference to FIGS. 35 and 57-59. As shown in FIGS. 35 and 57, the stop structure 82 is installed to the first side member 30 adjacent to (but forward of) the third cross-member 38. The stop structure 82 is also rigidly fixed to the body attachment flange 44.

Figure 58:
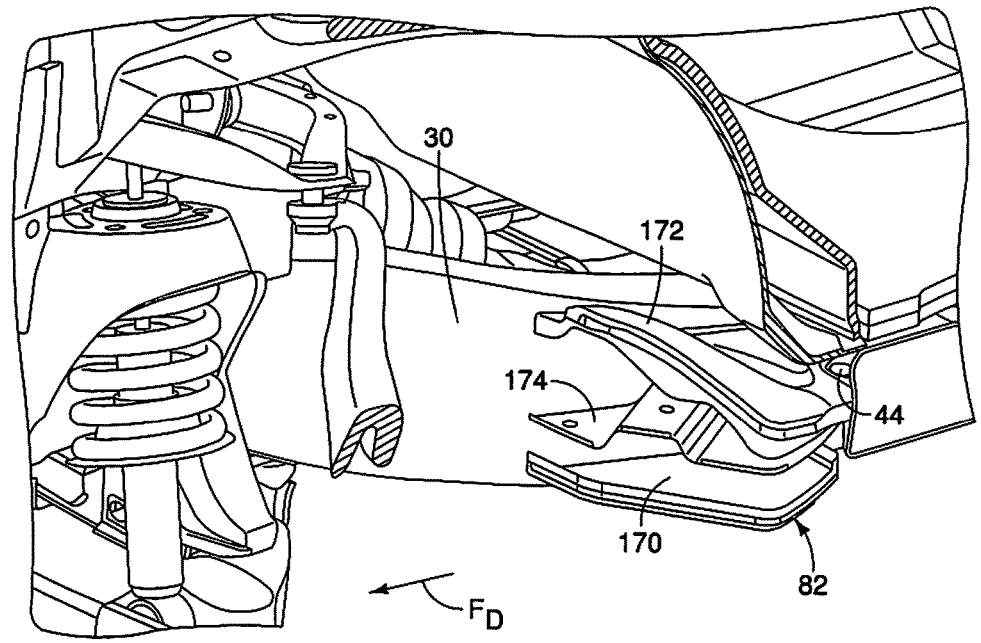
FIG. 58 is another perspective side view similar to FIG. 57, showing the stop structure with an outer plate removed showing various plate members that define the stop member in accordance with the embodiment.

As shown in FIG. 58, the stop structure 82 (a tire catcher) basically includes a lower plate 170, an upper plate 172, a reinforcement plate 174 (a mid-plate) and an outer plate 176 (a main plate). As shown in FIG. 58, the lower plate 170, the upper plate 172 and the reinforcement plate 174 are all horizontally oriented and are spaced apart from one another. The lower plate 170 defines a bottom of the stop structure 82 and the upper plate 172 defines a top of the stop structure 82.

The reinforcement plate 174 is located between the upper plate 172 and the lower plate 170.

The outer plate 176 has first section 176a attached to the first side member 30, a second section 176b defining a stop surface and a third section 176c that wraps around the lower plate 170, the upper plate 172 and the reinforcement plate 174 forming a box-like structure, with the reinforcement plate 174 being concealed by the outer plate 176 or enclosed within the outer plate 176. The outer plate 176 is vertically oriented and the lower plate 170, the upper plate 172 and the reinforcement plate 174 are generally horizontally oriented in the non-impacted state. The plates of the stop structure 82 are welded to one another and welded to the first side member 30.

As shown in FIG. 35, at least the third section 176c of the outer plate 176 is rigidly attached to the body attachment flange 44 (a cabin attachment flange) via, for example, welding techniques.

Figure 59:
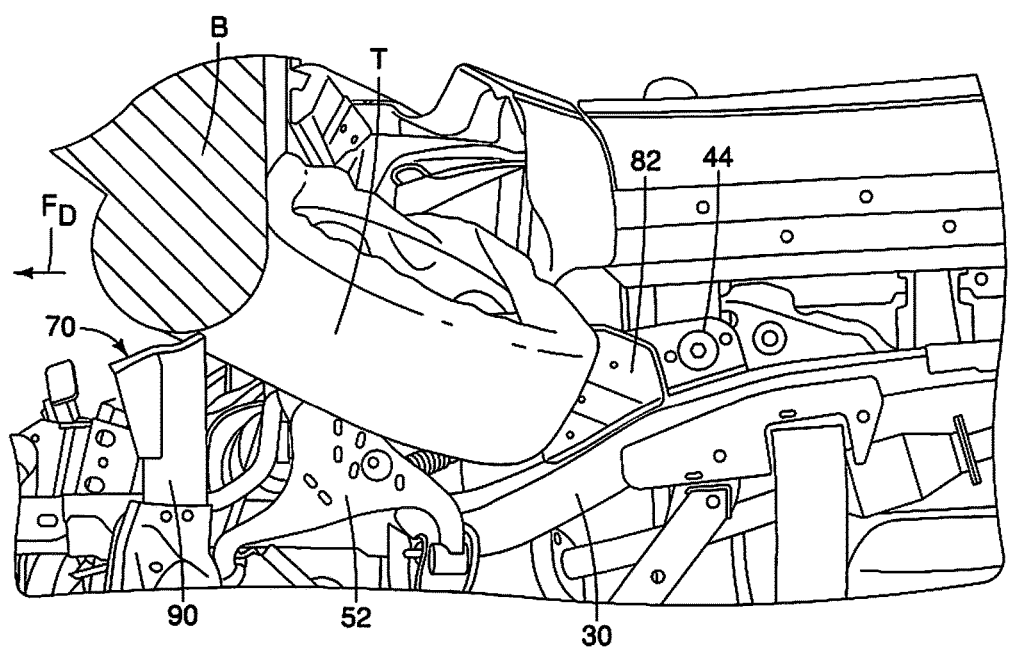
FIG. 59 is a bottom view of the frame and the off-center impact reinforcement structure during an impact event where the front wheel has moved into contact with the stop structure.

As shown in FIG. 35, the second section 176b (the stop surface) is a forward facing surface. The second section 176b (the stop surface) of the stop structure 82 defines an angle as relative to a vehicle longitudinal direction that is between 110 and 130 degrees. In the depicted embodiment, the angle as is approximately 120 degrees. The angle as is selected such that in response to an off-center impact event that directs an impacting force to a front surface area of the front wheel T, the front wheel T pivots relative to the wheel support structure 48 and moves a rear surface area of the front wheel T into contact with the second section 176 (the stop surface) with the stop structure 82 absorbing at least a portion of the impacting force restricting further pivoting movement of the front wheel T, as shown in FIG. 59.

A further description of the effects of the off-center impact event (the small overlap test) on the push arm assembly 70 of the off-center impact reinforcement structure 12 is now provided with reference to all drawings.

As the push arm assembly 70 is being impacted, the gap $G_1$ between the main body 90 of the push arm assembly 70 closes causing the pivot bracket 96 to move into contact with the first cross-member 32, and collapsing the energy absorbing structure 94. The first cross-member 32 can undergo some deformation thereby closing the gap $G_2$ between the first cross-member 32 and hollow beam 112 of the first structure 72. Impact forces transmitted through the hollow beam 112 of the first structure 72 cause the end plate 116 at the rear end 112b of the hollow beam 112 to move toward the second cross-member 36, thereby closing the gap $G_3$.

The hollow beam 112 is guided to move toward the second cross-member 36 during the impact event due to the recessed areas of the first and second lower attachment brackets 142 and 144. Specifically, the first and second lower attachment brackets 142 and 144 being rigidly fixed to the second cross-member 36 and having the U-shaped portion 142a and the side walls 144a and 144b, limit or prevent lateral in an inboard or outboard direction, and further limit or prevent vertical movement of the hollow beam 112 relative to the second cross-member 36. Therefore, impact forces close the gap $G_3$ thereby directing the impact force against the second cross-member 36.

Once the gap $G_3$ closes, the impact force is thereafter transmitted from the hollow beam 112 to the second cross-member 36. Within the second cross-member 36, the bulkhead structure 80 limits and/or prevents the second cross-member 36 from collapsing, although the second cross-member 36 can undergo limited overall bending deformation. Consequently, the second cross-member 36 bends such that force is transmitted through the second cross-member 36 via the upper attachment bracket 140.

Rearward movement of the second cross-member 36 and the upper attachment bracket 140 subsequently can do two things. First, the linearly aligned first and second slots 130c and 130d allow the beam 130 to slide relative to the fasteners $F_2$ that are fixed to the upper attachment bracket 140, thereby closing the gap $G_4$. Second, the welds W fixing the upper attachment bracket 140 to the second cross-member 36 can release the upper attachment bracket 140 from fixed attachment to the second cross-member 36. Since the upper attachment bracket 140 remains above the second cross-member 36 even after release by the welds W, the upper attachment bracket 140 can undergo some lateral movement relative to the second cross-member 36. However, the upper attachment bracket 140 prevents downward movement of the beam 130 since the fasteners $F_2$ remain fixed to the upper attachment bracket 140 and to the beam 130. Further, the gap $G_5$ defined between the beam 130 of the second structure 76 and the front end of the secondary diagonal structure 136 can also close.

Next, impact forces are transferred from the second cross-member 36 to the beam 130 and optionally to the secondary diagonal structure 136. Each of the beam 130 and the secondary diagonal structure 136 can undergo limited rearward movement due to the gap $G_6$ between the surface 132a of the end plate 132 of the beam 130 and the stopper bracket 164. Specifically, sliding movement of the beam 130 relative to the first and second brackets 160 and 162 causes the gap $G_6$ to close such that impact energy is transmitted from the beam 130 through the stopper bracket 164 and to the second side member 32. Similarly, the secondary diagonal structure 136 can transmit some of the impact energy to the first side member 30.

Further, during the impact event as impact forces from the stationary barrier B act on the push arm assembly 70, the impact forces also act on the front wheel T causing deformation of at least one of the first side member 30, the front suspension structure 48 and/or the lower control arm 52. The force acting on the front wheel T urge the front wheel T into contact with the stop structure 82.

The various movements of the components of the off-center impact reinforcement structure 12 have the effect of distributing the impact forces of the impact event throughout the frame 22 of the vehicle 10. The off-center impact reinforcement structure 12 also causes the vehicle 10 to move laterally away from the fixed barrier B during the impact event.

The various features of the vehicle 10, other than the off-center impact reinforcement structure 12 are conventional components that are well known in the art. Since such components are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle structure. Accordingly, these terms, as utilized to describe the present invention should be interpreted relative to a vehicle equipped with the vehicle structure.

The term "configured" as used herein to describe a component, section or part of a device includes structure that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle structure comprising:
    a vehicle frame having a first side member, a second side member and a first cross-member, the first side member and the second side member having respective front ends, the first side member and the second side member extending rearward from the front ends, the first cross-member extending in a vehicle lateral direction from the first side member to the second side member at a location rearward of the front ends, the first cross-member further being rigidly fixed to each of the first side member and the second side member;
    a front suspension structure coupled to the first side member adjacent to an intersection of the first side member and the first cross-member;
    a push arm coupled to the first side member proximate the intersection of the first side member and the first cross-member, the push arm having a rear surface and a front surface, the rear surface of the push arm being located adjacent to the front suspension structure and spaced apart from the front suspension structure defining a gap therebetween, the push arm extending forward and laterally outward such that the front surface of the push arm is located laterally outboard of and spaced apart from the front end of the first side member; and
    an energy absorbing structure positioned within the gap and rigidly attached to the rear surface of the push arm, the energy absorbing structure being spaced apart from the front suspension structure in a non-impacted state, the energy absorbing structure being configured such that in response to an off-center impact event against the front surface of the push arm, the push arm imparts impact force to the energy absorbing structure pushing the energy absorbing structure into contact with the front suspension structure such that the energy absorbing structure deforms absorbing impact energy.

2. The vehicle structure according to claim 1, wherein the energy absorbing structure includes at least a first cup-shaped member and a second cup-shaped member, each of the first and second cup-shaped members having two side walls and an end wall extending between the two side walls defining overall U-shapes viewed in cross-section, side walls of the first cup-shaped member being fixedly attached to the side walls of the second cup-shaped member such the end walls are spaced apart from one another and are spaced apart from the front suspension structure in the non-impacted state.

3. The vehicle structure according to claim 2, wherein the energy absorbing structure further includes a third cup-shaped member fixedly attached to the two side walls of the second cup-shaped member, the third cup-shaped member being spaced apart from the end wall of the second cup-shaped member in the non-impacted state.

4. The vehicle structure according to claim 3, wherein the first and second cup-shaped members are welded to one another and the second and third cup-shaped members are welded to one another.

5. The vehicle structure according to claim 4, wherein the energy absorbing structure further includes a pivot bracket that is welded to the rear surface of the push arm and welded to the first cup-shaped member, the pivot bracket being spaced apart from the front suspension structure in a non-impacted state.

6. The vehicle structure according to claim 5, wherein the pivot bracket is configured and positioned such that in response to the off-center impact event against the front surface of the push arm, the push arm moves the pivot bracket into contact with the first cross-member and imparts impact force to the pivot bracket pushing the energy absorbing structure into contact with the front suspension structure such that the push arm pivots about a contact area between the pivot bracket and the front suspension structure pivoting the front surface of the push arm in a rearward direction.

7. The vehicle structure according to claim 6, wherein the energy absorbing structure, the pivot bracket and the push arm are removably supported to the vehicle frame.

8. The vehicle structure according to claim 2, wherein the front suspension structure includes a pair of support gussets that extend laterally outward relative to the first side member, the pair of support gussets being configured to receive a pivot bolt that supports a control arm of a vehicle suspension assembly such that the control arm pivots about the pivot bolt, and the energy absorbing structure being spaced apart from the support gussets in the non-impacted state at least partially concealing and restricting access to the pivot bolt.

9. The vehicle structure according to claim 8, wherein the energy absorbing structure and the push arm are removably supported to the vehicle frame such that when the energy absorbing structure is removed from the vehicle frame the pivot bolt is exposed.

10. The vehicle structure according to claim 8, wherein the energy absorbing structure further includes a pivot bracket that is rigidly attached to the rear surface of the push arm and the first cup-shaped member, the pivot bracket being spaced apart from the front suspension structure in a non-impacted state.

11. The vehicle structure according to claim 10, wherein the pivot bracket is configured and positioned such that in response to the off-center impact event against the front surface of the push arm, the push arm moves the pivot bracket into contact with the first cross-member and imparts impact force to the pivot bracket pushing the energy absorbing structure into contact with the front suspension structure such that the push arm pivots about a contact area between the pivot bracket and the front suspension structure pivoting the front surface of the push arm in a rearward direction thereby causing the energy absorbing structure to deform.

12. The vehicle structure according to claim 1, wherein the front suspension structure includes a pair of support gussets that extend laterally outward relative to the first side member, the pair of support gussets being configured to receive a pivot bolt that supports a control arm of a vehicle suspension assembly such that the control arm pivots about the pivot bolt, and
the energy absorbing structure at least partially conceals and restricts access to the pivot bolt.

13. The vehicle structure according to claim 12, wherein the energy absorbing structure and the push arm are removably supported to the vehicle frame such that when the energy absorbing structure is removed from the vehicle frame the pivot bolt is exposed.

14. The vehicle structure according to claim 1, further comprising
a support bracket having a forward portion releasably attached to a rearward section of the push arm and a rearward portion releasably attached to the first cross-member of the vehicle frame.

15. The vehicle structure according to claim 14, wherein the support bracket is releasably attached to the push arm and the first cross-member of the vehicle frame via removable mechanical fasteners.

16. The vehicle structure according to claim 15, wherein the support bracket and the push arm are configured such that in response to the off-center impact event the push arm moves relative to the support bracket in a rearward direction toward the front suspension structure.

17. The vehicle structure according to claim 1, wherein the first cross-member includes a first end, a second end and a mid-section extending from the first end to the second end, the first end being rigidly attached to the first side member of the vehicle frame and the second end being rigidly attached to the second side member of the vehicle frame with at least a portion of the mid-section being located lower than the first and second side members.

18. The vehicle structure according to claim 1, wherein the push arm includes an attachment bracket that extends from a mid-section of the push arm to the first side member at a location forward of the intersection of the first side member and the first cross-member.

19. The vehicle structure according to claim 18, wherein the attachment bracket is fixedly attached to an upper surface of the push arm.

\* \* \* \* \*